United States Patent [19]
Yasohara et al.

[11] Patent Number: 5,929,576
[45] Date of Patent: Jul. 27, 1999

[54] PROTECTION APPARATUS FOR BRUSHLESS MOTOR

[75] Inventors: Masahiro Yasohara, Amagasaki; Kazuyuki Takada, Hirakata; Yoshihiro Fujisaki, Matsubara, all of Japan

[73] Assignee: Matsushita Electric Industrial Co., Ltd., Osaka, Japan

[21] Appl. No.: 08/839,741

[22] Filed: Apr. 15, 1997

[30] Foreign Application Priority Data

Apr. 15, 1996 [JP] Japan .................................. 8-092372
Jul. 18, 1996 [JP] Japan .................................. 8-189124

[51] Int. Cl.$^6$ ........................................... H02K 23/00
[52] U.S. Cl. ................... 318/254; 318/439; 318/138; 361/33; 361/86; 361/91
[58] Field of Search .................... 318/254, 439, 318/138; 361/23–33, 54–57, 78–93

[56] References Cited

U.S. PATENT DOCUMENTS

| | | | |
|---|---|---|---|
| 4,594,632 | 6/1986 | Unnewehr | 361/33 |
| 4,722,020 | 1/1988 | Nomura et al. | 361/31 |
| 4,743,815 | 5/1988 | Gee et al. | 318/254 |
| 4,879,498 | 11/1989 | Shinohara et al. | 318/254 |
| 5,291,105 | 3/1994 | Salerno et al. | 318/254 |
| 5,350,988 | 9/1994 | Le | 318/618 |
| 5,382,890 | 1/1995 | Moh et al. | 318/254 |
| 5,574,346 | 11/1996 | Chavan et al. | 318/434 |

FOREIGN PATENT DOCUMENTS 63-140688  6/1988  Japan .

Primary Examiner—David Martin
Attorney, Agent, or Firm—Stevens, Davis, Miller & Mosher, L.L.P.

[57] ABSTRACT

A protection apparatus used in a brushless motor is arranged by a brushless motor; a commutation signal detecting unit for detecting a position of a movable member of the brushless motor; a speed detecting unit for detecting a rotation speed of the movable member of the brushless motor, involving a rotation direction thereof, in response to the detection signal outputted from the commutation signal detecting unit; and a drive circuit for producing a commutation signal used to drive the movable member of the brushless motor in response to the detection signal outputted from the commutation signal detecting unit and for driving the brushless motor based upon the commutation signal. The protection apparatus is further constructed of an output voltage instructing unit for supplying to the drive circuit, an output voltage instruction signal for instructing an output voltage of the drive circuit, which constitutes a drive voltage when the brushless motor is driven; a voltage limit level setting unit for setting an upper limit value of the output voltage of the drive circuit; and a voltage limiter unit for limiting the output signal of the output voltage instructing unit based on the setting value of the voltage limit level setting unit to thereby limit an upper limit value of the output voltage of the drive circuit.

52 Claims, 18 Drawing Sheets

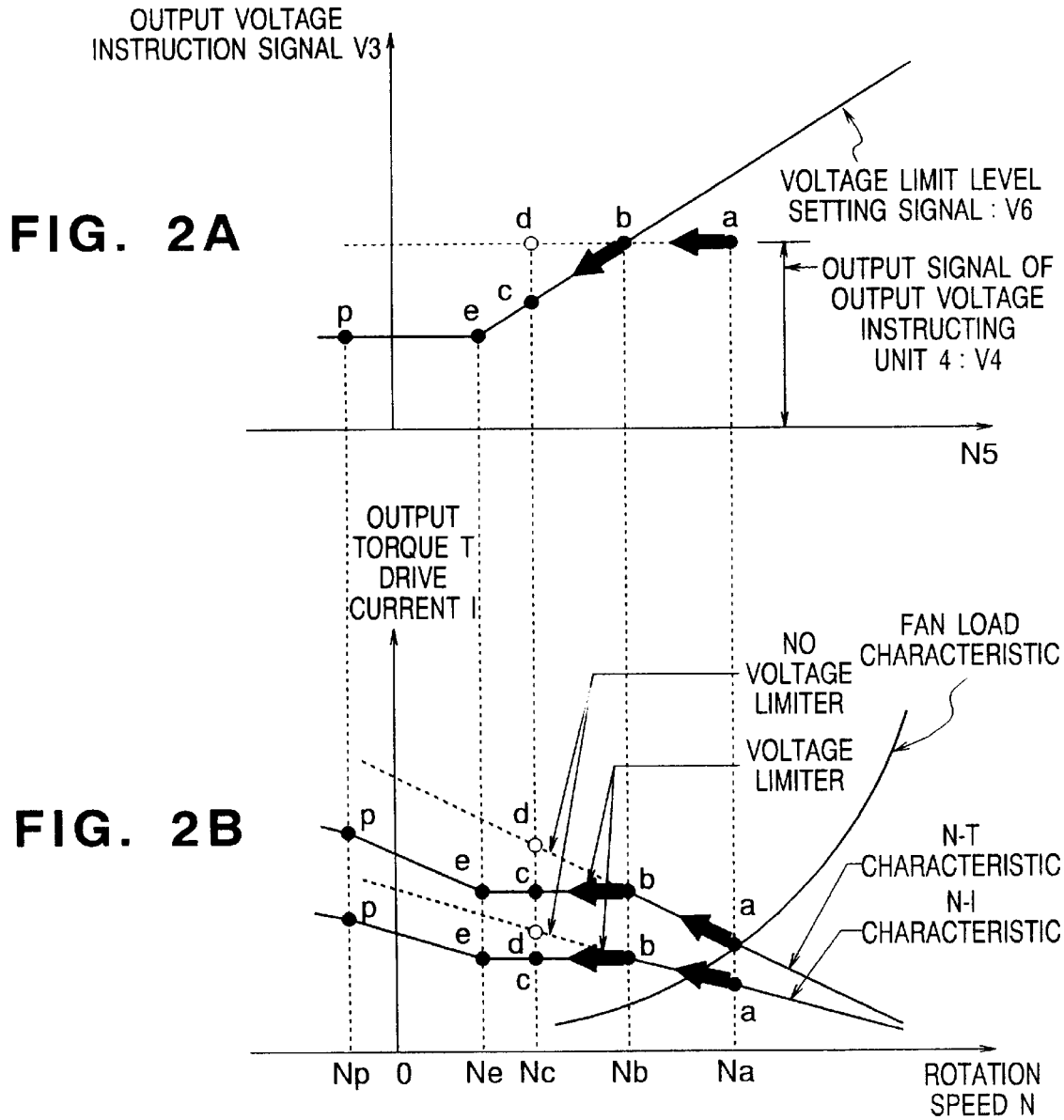

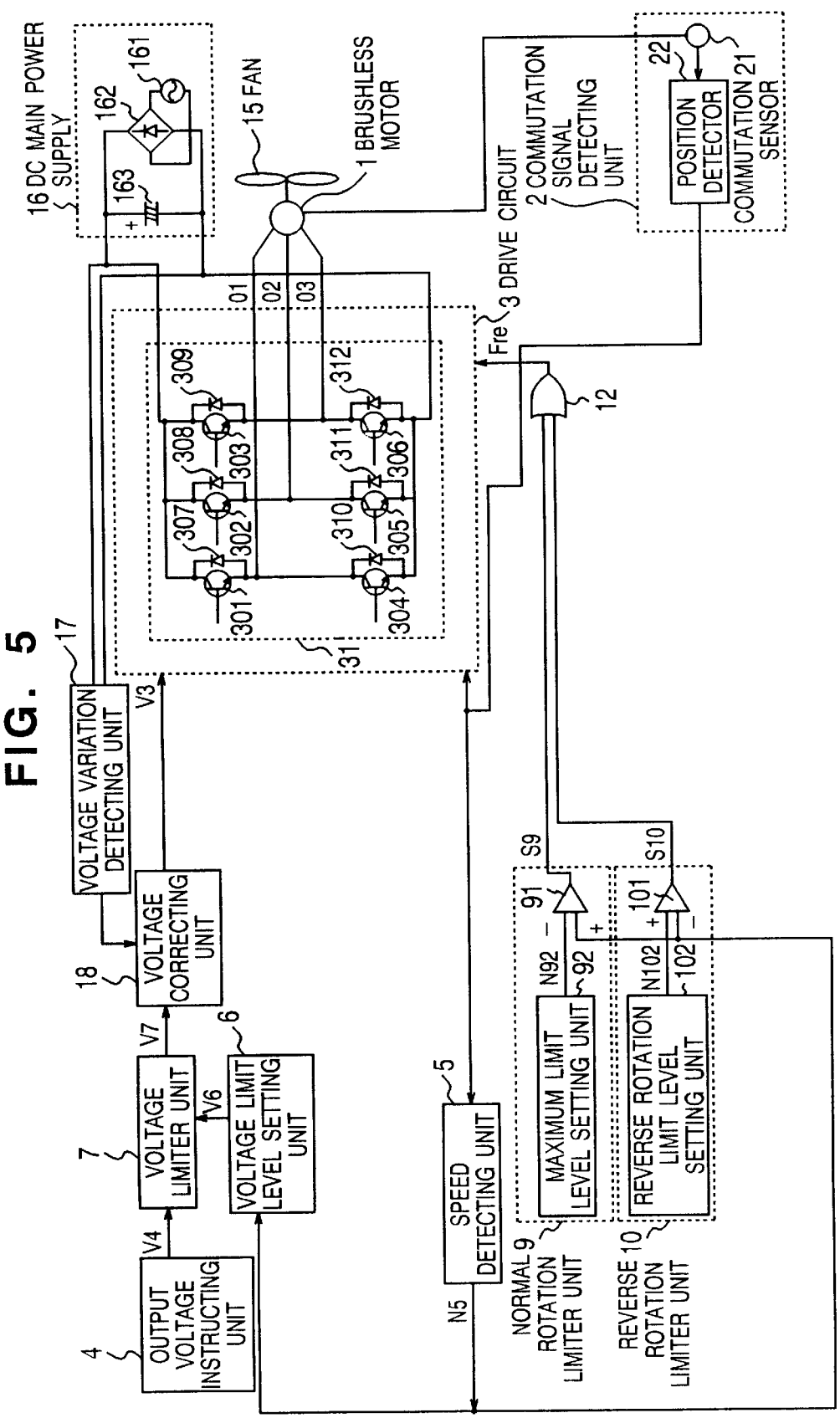

FIG. 8
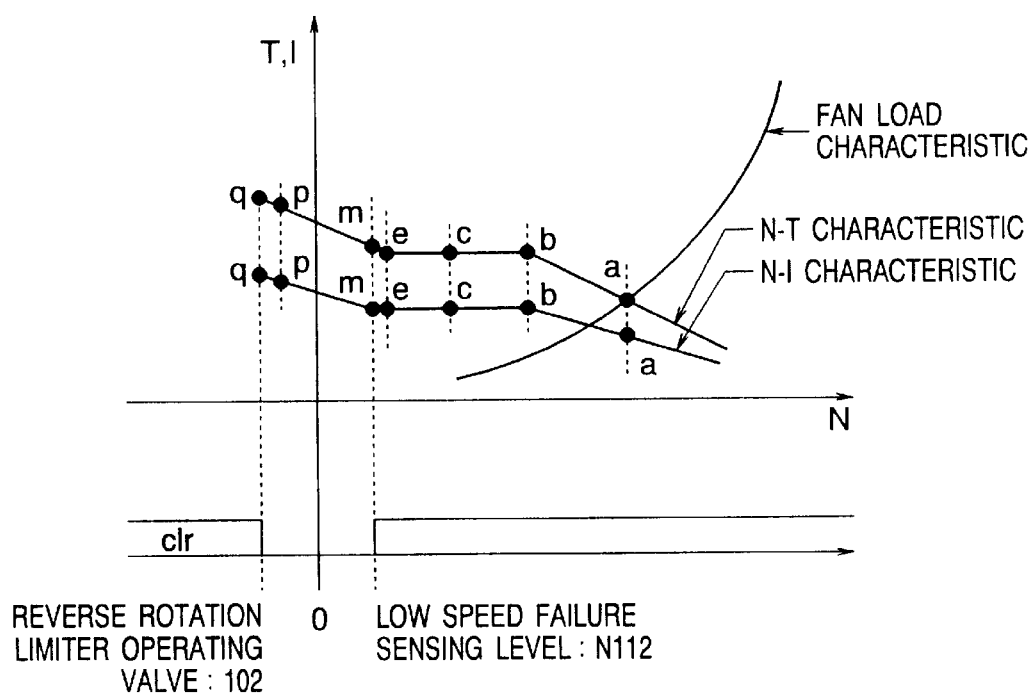
FIG. 9A  clr
FIG. 9B  S116
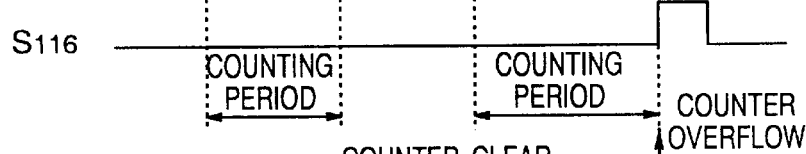
FIG. 9C  S11, Fre
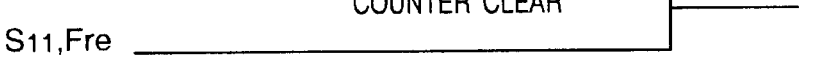

PROTECTION APPARATUS FOR BRUSHLESS MOTOR

BACKGROUND OF THE INVENTION

1. Field of the Invention

The present invention generally relates to a protection apparatus for a brushless motor, and more specifically, to such a protection apparatus used for a brushless motor in the case that the brushless motor is employed as a fan motor, for instance, a fan of an outdoor unit of an air conditioner is driven by this brushless motor.

2. Description of the Related Art

Conventionally, induction motors are widely utilized as motors for driving outdoor fans. However, very recently, brushless motors operable in high efficiencies have been gradually introduced instead of these induction motors, while a strong demand is made of air conditioners operable in high efficiencies. FIG. 19 represents one of drive apparatus such that a brushless motor is driven as a fan motor.

This drive apparatus includes a brushless motor 1001, a fan 1002, a drive circuit 1003, an output voltage instructing circuit 1004, a commutation sensor 1005, a commercial power supply 1006, a rectifying circuit 1007, and a smoothing capacitor 1008.

The commercial power supply 1006 outputs an AC voltage of 100V, or 200V. The AC voltage outputted from the commercial power supply 1006 is rectified/smoothed by the rectifying circuit 1007 and the smoothing capacitor 1008 so as to be converted into a DC voltage of 140V, or 280V. Thereafter, this converted DC voltage is entered as an output voltage of a DC main power supply into the drive circuit 1003. The fan 1002 is coupled to an output shaft of the brushless motor 1001. This brushless motor 1001 is provided with the commutation sensor 1005 for sensing a position of a movable member, or a rotor (not shown). The drive circuit 1003 produces a commutation signal used to drive the movable member of the brushless motor 1001 based upon the output signal from the commutation sensor 1005, and thus drives the brushless motor 1001. Also, the drive circuit 1003 outputs the output voltage of the DC main power supply in a ratio defined in response to the output voltage instruction signal derived from the output voltage instructing circuit 1004. In other words, the drive circuit 1003 is operated in a so-called "PWM (pulse width modulation) system" such that in response to the output voltage instruction signal, the ratio of the time during which the respective drive windings of the brushless motor 1001 are connected to the plus-sided voltage terminal (DC 140V, or DC 280V) of the DC main power supply to the time during which the respective drive windings thereof are connected to the minus-sided voltage terminal (DC 0V) of the DC main power supply is controlled so as to vary the drive voltage of the brushless motor 1001.

However, in such a case that this drive apparatus is applied to the outdoor fan of the air conditioner, when this outdoor fan is forcibly and externally driven by receiving a strong wind force such as typhoon or cyclone, the below-mentioned difficulties would occur.

That is, when such a wind (adverse, or against wind) is produced which may drive the fan 1002 along the direction opposite to the drive direction of the brushless motor 1001, this brushless motor 1001 is brought into the overload state, so that the drive current thereof is increased. Also, when the brushless motor 1001 is rotated along the reverse direction, the drive current thereof may be further increased due to the influences caused by the induced voltage from the brushless motor. When the drive current of this brushless motor 1001 is increased, the amounts of heat generations of this brushless motor 1001 and the drive circuit 1003 for supplying the power to this brushless motor 1001 are increased. In the worst case, both the brushless motor 1001 and the drive circuit 1003 would be electrically destroyed. To avoid the above-explained heat generations and electrical destroy of the brushless motor 1001 and the drive circuit 1003, the following tripping method has been proposed in which either the overheat or the overcurrent of the brushless motor 1001 and the drive circuit 1003 is detected to interrupt the supply of power. Therefore, these circuit elements are not self-recovered. However, for example, such a fan motor which is frequently tripped to be stopped every time typhoon approaches could not be employed as an outdoor fan motor of an air conditioner.

On the other hand, in the case that such a wind (fair, or following wind) is produced which may drive the fan 1002 along the same direction as the drive direction of the brushless motor 1001, the brushless motor 1001 is forcibly accelerated, and thus while the rotation speed is increased, the induced voltage internally produced in the brushless motor 1001 is also increased, so that the brushless motor 1001 will produce the regenerative voltage. The generation of this regenerative voltage is determined based on such a relationship between the induced voltage internally produced from the brushless motor 1001 and the output voltage outputted from the drive circuit 1003 as the drive voltage for this brushless motor 1001. If this induced voltage becomes higher than this output voltage, then the regenerative voltage is produced. As a consequence, the regenerative voltage is produced when the above-described induced voltage becomes higher than the above-mentioned output voltage irrelevant to the magnitudes of the voltage values of the output voltages derived from the drive circuit 1003, which is determined based on the output voltage instruction signal supplied from the output voltage instructing circuit 1004. When the regenerative voltage of the brushless motor 1001 is produced, the regenerative power thereof is supplied to the drive circuit 1003. As a result, this regenerative power could increase the voltage across the terminals of the smoothing capacitor 1008. When the voltage across the terminals of the smoothing capacitor 1008 is increased, both the smoothing capacitor 1008 and the drive circuit 1003 are brought into the overvoltage states. Accordingly, there is a risk that these smoothing capacitor and drive circuit are electrically destroyed.

SUMMARY OF THE INVENTION

An object of the present invention is to provide a protection apparatus of a brushless motor, capable of preventing occurrences of overloads and overcurrents even when either a strong adverse wind or a strong fair wind such as typhoon, or cyclone is produced, and which cannot be readily tripped without producing a regenerative voltage from the brushless motor.

To achieve the above-described object, a protection apparatus of a brushless motor, according to a first aspect of the present invention, is featured by comprising: a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal; output voltage instructing means for supplying to the drive circuit, an output voltage instruction signal for instructing an output voltage of the drive circuit, which constitutes a drive voltage when the brushless motor is driven; voltage limit level setting means for setting an upper limit value of the output voltage of the drive circuit; and voltage limiter means for limiting the output signal of the output voltage instructing means based on the setting value of the voltage limit level setting means to thereby limit an upper limit value of the output voltage of the drive circuit; wherein: the setting value of the voltage limit level setting means is set in accordance with the detecting signal outputted from the speed detecting means in such a manner that the higher the rotation speed of the movable member of the brushless motor, the setting value becomes a large value; the lower the rotation speed of the movable member of the brushless motor, the setting value becomes a small value; and when the rotation speed becomes near zero and the rotation direction is reversed, the setting value becomes a preset constant value.

Also, a protection apparatus of a brushless motor, according to a second aspect of the present invention, is featured by comprising: a DC (direct current) main power supply; a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal, the drive circuit outputting the output voltage of the DC main power supply in a ratio responding to an output voltage instruction signal as a drive voltage used when the brushless motor is driven; output voltage instructing means for supplying the output voltage instruction signal to the drive circuit; voltage limit level setting means for setting an upper limit value of the output voltage of the drive circuit, the setting value of the voltage limit level setting means being set in accordance with the detecting signal outputted from the speed detecting means in such a manner that the higher the rotation speed of the movable member of said brushless motor, the setting value becomes a large value; the lower the rotation speed of the movable member of the brushless motor, the setting value becomes a small value; and when the rotation speed becomes near zero and the rotation direction is reversed, the setting value becomes a preset constant value; voltage limiter means for limiting the output signal of the output voltage instructing means based on the setting value of the voltage limit level setting means to thereby supply the limited output signal to the drive circuit and limit an upper limit value of the output voltage of the drive circuit; voltage variation detecting means for detecting a variation contained in the output voltage of the DC main power supply in a direct manner, or based upon any one of an output current of the DC main power supply or a drive current of the brushless motor; and voltage correcting means for applying the output voltage instruction signal to the drive circuit by conversely changing the output signal of the voltage limiter means in order to compensate for the variation contained in the output voltage of the DC main power supply based upon the detection output from the voltage variation detecting means.

Also, a protection apparatus of a brushless motor, according to a third aspect of the present invention, is featured by comprising: a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal; output voltage instructing means for supplying to the drive circuit, an output voltage instruction signal for instructing an output voltage of the drive circuit, which constitutes a drive voltage when the brushless motor is driven; voltage limit level setting means for setting an upper limit value of the output voltage of the drive circuit; and voltage limiter means for limiting the output signal of the output voltage instructing means based on the setting value of the voltage limit level setting means to thereby limit an upper limit value of the output voltage of the drive circuit; normal rotation limiter means for detecting as to whether or not the rotation speed of the brushless motor reaches a preset maximum limit level based upon the detection signal of the speed detecting means, and for outputting a first power supply interrupting signal when the rotation speed reaches the preset maximum limit level; and reverse rotation limiter means for detecting as to whether or not a reverse rotation speed of the brushless motor reaches a preset reverse rotation limit level based upon the detection signal of the speed detecting means, and for outputting a second power supply interrupting signal when the reverse rotation speed reaches the preset reverse rotation limit level; wherein: the setting value of the voltage limit level setting means is set in accordance with the detecting signal outputted from the speed detecting means in such a manner that the higher the rotation speed of the movable member of the brushless motor, the setting value becomes a large value; the lower the rotation speed of the movable member of the brushless motor, the setting value becomes a small value; and when the rotation speed becomes near zero and the rotation direction is reversed, the setting value becomes a preset constant value; and when the first power supply interrupting signal outputted from the normal rotation limiter means or the second power supply interrupting signal outputted from the reverse rotation limiter means is produced, the drive circuit is electrically opened from the brushless motor.

Also, a protection apparatus of a brushless motor, according to a fourth aspect of the present invention, is featured by comprising: a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal; output voltage instructing means for supplying to the drive circuit, an output voltage instruction signal for instructing an output voltage of the drive circuit, which constitutes a drive voltage when the brushless motor is driven; voltage limit level setting means for setting an upper limit value of the output voltage of the drive circuit; voltage limiter means for limiting the output signal of the output voltage instructing means based on the setting value of the voltage limit level setting means to thereby limit an upper limit value of the output voltage of the drive circuit; normal rotation limiter means for detecting as to whether or not the rotation speed of the brushless motor reaches a preset maximum limit level based upon the detection signal of the speed detecting means, and for outputting a first power supply interrupting signal when the rotation speed reaches the preset maximum limit level; reverse rotation limiter means for detecting as to whether or not a reverse rotation speed of the brushless motor reaches a preset reverse rotation limit level based upon the detection signal of the speed detecting means, and for outputting a second power supply interrupting signal when the reverse rotation speed reaches the preset reverse rotation limit level; low speed failure detecting means for detecting as to whether or not the rotation speed of the brushless motor becomes below a preset low speed failure sensing level, and for outputting a low speed failure signal when the rotation speed becomes below the preset low speed failure sensing level; and low speed overload detecting means containing the low speed failure sensing means, for latch-processing a third power supply interrupting signal to thereby output the latch-processed third power supply interrupting signal in the case that such a condition that the low speed failure signal is outputted from the low speed failure sensing means and also the second power supply interrupting signal is not outputted from the reverse rotation limiter means is continued for a predetermined time period; wherein: the setting value of the voltage limit level setting means is set in accordance with the detecting signal outputted from the speed detecting means in such a manner that the higher the rotation speed of the movable member of the brushless motor, the setting value becomes a large value; the lower the rotation speed of the movable member of the brushless motor, the setting value becomes a small value; and when the rotation speed becomes near zero and the rotation direction is reversed, the setting value becomes a preset constant value; and when the first power supply interrupting signal outputted from the normal rotation limiter means, the second power supply interrupting signal outputted from the reverse rotation limiter means, or the third power supply interrupting signal outputted from the low speed overload detecting means is produced, the drive circuit is electrically opened from the brushless motor.

Also, a protection apparatus of a brushless motor, according to a fifth aspect of the present invention, is featured by comprising: a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal; output voltage instructing means for supplying to the drive circuit, an output voltage instruction signal for instructing an output voltage of the drive circuit, which constitutes a drive voltage when the brushless motor is driven; voltage limit level setting means for setting an upper limit value of the output voltage of the drive circuit; voltage lower limit level setting means for setting a lower limit value of the output voltage of the drive circuit; voltage limiter means for limiting the output signal of the output voltage instructing means based on the setting value of the voltage limit level setting means to thereby limit an upper limit value of the output voltage of the drive circuit, and also for limiting the output signal of the output voltage instructing means based upon the setting value of the voltage lower limit level setting means to thereby limit the lower limit value of the output voltage of the drive circuit; and reverse rotation limiter means for detecting as to whether or not a reverse rotation speed of the brushless motor reaches a preset reverse rotation limit level based upon the detection signal of the speed detecting means, and for outputting a second power supply interrupting signal when the reverse rotation speed reaches the preset reverse rotation limit level, wherein: when the second power supply interrupting signal outputted from the reverse rotation limiter means is produced, the connection between the drive circuit and the brushless motor is electrically opened, and also the setting value of the voltage limit level setting means is set in accordance with the detecting signal outputted from the speed detecting means in such a manner that the higher the rotation speed of the movable member of the brushless motor, the setting value becomes a large value; the lower the rotation speed of the movable member of the brushless motor, the setting value becomes a small value; and when the rotation speed becomes near zero and the rotation direction is reversed, the setting value becomes a preset constant value and further the setting value of the voltage lower limit level setting means is set in response to the output signal of the speed detecting means in such a manner that the setting value is such a value lower than the setting value of the voltage limit level setting means, and also such a value higher than a value corresponding to an induced voltage internally produced from the brushless motor.

Also, a protection apparatus of a brushless motor, according to a sixth aspect of the present invention, is featured by comprising: a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal; output voltage instructing means for supplying to the drive circuit, an output voltage instruction signal for instructing an output voltage of the drive circuit, which constitutes a drive voltage when the brushless motor is driven; voltage limit level setting means for setting an upper limit value of the output voltage of the drive circuit; voltage lower level setting means for setting a lower limit value of the output voltage of the drive circuit; voltage limiter means for limiting the output signal of the output voltage instructing means based on the setting value of the voltage limit level setting means to thereby limit an upper limit value of the output voltage of the drive circuit; and reverse rotation limiter means for detecting as to whether or not a reverse rotation speed of the brushless motor reaches a preset reverse rotation limit level based upon the detection signal of the speed detecting means, and for outputting a second power supply interrupting signal when the reverse rotation speed reaches the preset reverse rotation limit level, wherein: when the second power supply interrupting signal outputted from the reverse rotation limiter means is produced, the connection between the drive circuit and the brushless motor is electrically opened, the setting value of the voltage limit level setting means is set in accordance with the detecting signal outputted from the speed detecting means in such a manner that the higher the rotation speed of the movable member of the brushless motor, the setting value becomes a large value; the lower the rotation speed of the movable member of the brushless motor, the setting value becomes a small value; and when the rotation speed becomes near zero and the rotation direction is reversed, the setting value becomes a preset constant value, and the setting value of the voltage lower limit level setting means is set in response to the output signal of the speed detecting means in such a manner that the setting value is such a value lower than the setting value of the voltage limit level setting means, and also such a value higher than a value corresponding to an induced voltage internally produced from the brushless motor, when the output voltage of the output voltage instructing means reaches the setting value of the voltage lower level setting means, the connection between the drive circuit and the brushless motor is electrically opened.

Also, a protection apparatus of a brushless motor, according to a seventh aspect of the present invention, is featured by comprising: a brushless motor; commutation signal detecting means for detecting a position of a movable member of the brushless motor; speed detecting means for detecting a rotation speed of the movable member of the brushless motor, involving a rotation direction thereof, in response to the detection signal outputted from the commutation signal detecting means; a drive circuit for producing a commutation signal used to drive the movable member of the brushless motor in response to the detection signal outputted from the commutation signal detecting means and for driving the brushless motor based upon the commutation signal; output voltage instructing means for supplying to the drive circuit, an output voltage instruction signal for instructing an output voltage of the drive circuit, which constitutes a drive voltage when the brushless motor is driven; voltage limit level setting means for setting an upper limit value of the output voltage of the drive circuit; speed upper limit level setting means for setting an upper limit value of the rotation speed of the brushless motor; voltage limiter means for limiting the output signal of the output voltage instructing means based on the setting value of the voltage limit level setting means to thereby limit an upper limit value of the output voltage of the drive circuit; and reverse rotation limiter means for detecting as to whether or not a reverse rotation speed of the brushless motor reaches a preset reverse rotation limit level based upon the detection signal of the speed detecting means, and for outputting a second power supply interrupting signal when the reverse rotation speed reaches the preset reverse rotation limit level; wherein: when the second power supply interrupting signal outputted by the reverse rotation limiter means is produced, the connection between the drive circuit and the brushless motor is electrically interrupted; the setting value of the voltage limit level setting means is set in accordance with the detecting signal outputted from the speed detecting means in such a manner that the higher the rotation speed of the movable member of the brushless motor, the setting value becomes a large value; the lower the rotation speed of the movable member of the brushless motor, the setting value becomes a small value; and when the rotation speed becomes near zero and the rotation direction is reversed, the setting value becomes a preset constant value; and the setting value of said speed upper limit level setting means is set in response to the output signal of the output voltage instructing means, equal to a value corresponding to a maximum rotation speed of the brushless motor in which the induced voltage internally produced by the brushless motor can become lower than the output voltage of the drive circuit when the output signal of the output voltage instructing means is supplied as the output voltage instruction signal to said drive circuit, and when the output signal of the speed detecting means reaches the setting value of the speed upper limit level setting means, the connection between the drive circuit and the brushless motor is electrically opened.

Also, a protection apparatus of a brushless motor, according to an eighth aspect of the present invention, is featured by that: the setting value of the voltage limit level setting means is corrected in such a manner that both a fluctuation and a variation contained in the induced voltage internally produced from the brushless motor, or a variation contained in the output voltage of the DC main power supply is grasped based upon either the output current of the DC main power supply or the drive current of the brushless motor in order to compensate for the fluctuation and the variation contained in the induced voltage of the brushless motor, or the variation contained in the output voltage of the DC main power supply.

Further, a protection apparatus of a brushless motor, according to a ninth aspect of the present invention, is featured by that: either one or both the setting value of the voltage limit level setting means and the setting value of the voltage lower limit level setting means is corrected in such a manner that a fluctuation and a variation contained in the induced voltage internally produced from the brushless motor, or a variation contained in the output voltage of the DC main power supply is grasped based upon either the output current of the DC main power supply or the drive current of the brushless motor to compensate for the fluctuation and the variation contained in the induced voltage of the brushless motor or the variation contained in the output voltage of the DC main power supply.

Moreover, a protection apparatus of a brushless motor, according to a tenth aspect of the present invention, is featured by that: either one or both the setting value of the voltage limit level setting means and the setting value of the voltage lower limit level setting means is corrected in such a manner that both a fluctuation and a variation contained in the induced voltage internally produced from the brushless motor, or a variation contained in the output voltage of the DC main power supply is grasped based upon either the output current of the DC main power supply, or the drive current of said brushless motor in order to compensate for the fluctuation and the variation contained in the induced voltage of the brushless motor, or the variation contained in the output voltage of the DC main power supply.

Since the above-described arrangement is employed, it is possible to realize such a compact, safety, and low-cost protection apparatus for a brushless motor. This brushless motor protection apparatus is capable of previously preventing the overload and the overcurrent, and further capable of preventing the regenerative power from being produced even when the strong adverse or fair wind is generated by typhoon. Also, this brushless motor protection apparatus is not readily tripped, but is suitable to drive the outdoor fan of the air conditioner.

BRIEF DESCRIPTION OF THE DRAWINGS

The invention may be accomplished by reading a detailed description in conjunction with the accompanying drawings, in which:

FIG. 2A and FIG. 2B are explanatory diagrams for explaining operations of the protection apparatus for the brushless motor indicated in FIG. 1;

FIG. 5 is a circuit diagram for showing a protection apparatus for a brushless motor according to a third embodiment mode of the present invention;

FIG. 8 is an explanatory diagram for explaining operations of the protection apparatus for the brushless motor denoted in FIG. 7;

FIG. 9A to FIG. 9C are explanatory diagrams for explanating operations of the protection apparatus for the brushless motor indicated in FIG. 7;

DESCRIPTION OF THE PREFERRED EMBODIMENTS

(FIRST EMBODIMENT MODE)

Figure 1:
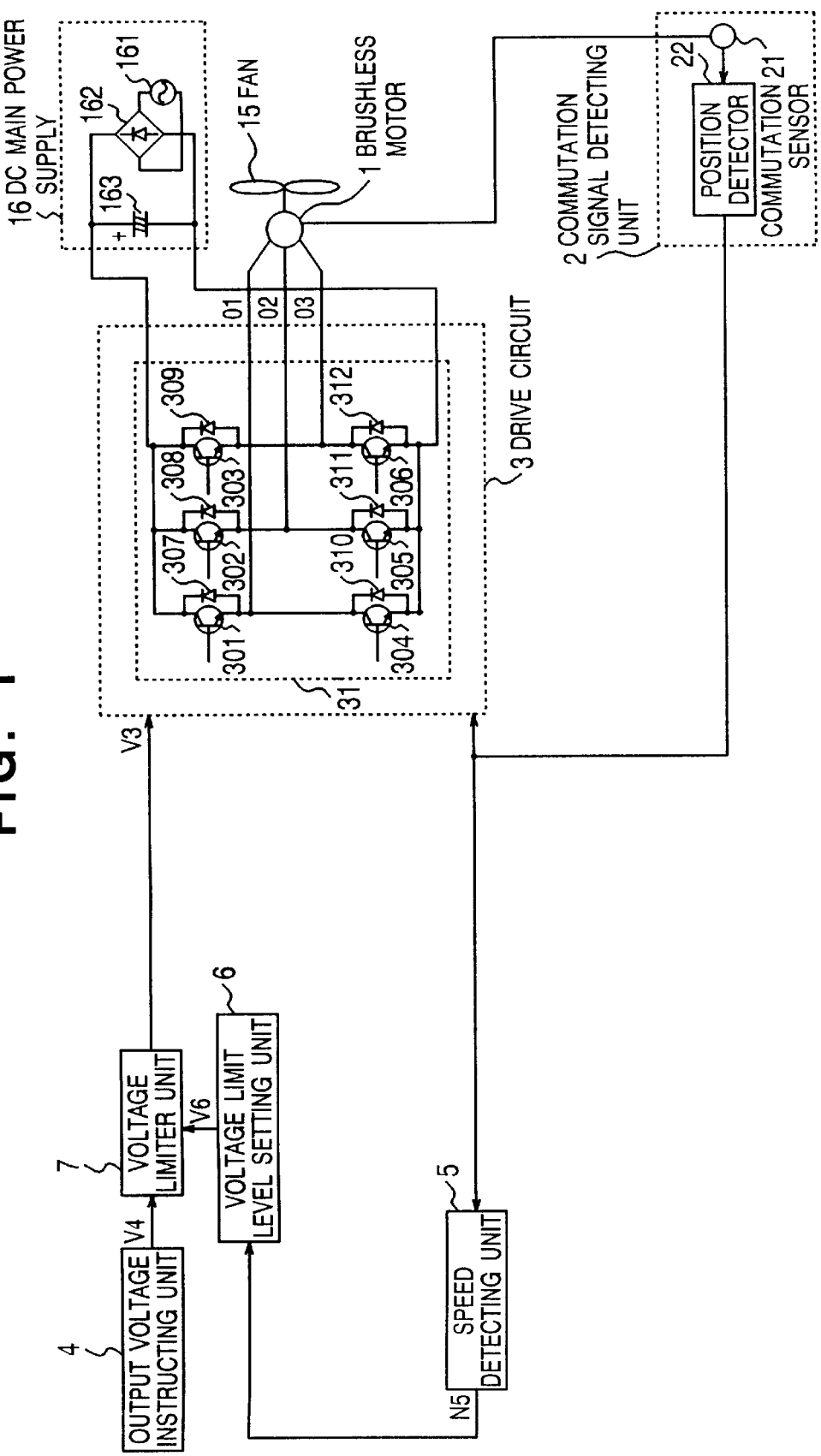
FIG. 1 is a circuit diagram for representing a protection apparatus for a brushless motor according to a first embodiment mode of the present invention.

A protection apparatus for a brushless motor according to a first embodiment mode of the present invention, as shown in FIG. 1, contains a brushless motor 1, a commutation signal detecting unit 2, a drive circuit 3, an output voltage instructing unit 4, a speed detecting unit 5, a voltage limit level setting unit 6, a voltage limiter unit 7, a fan 15, and a DC (direct current) main power supply 16.

The fan 15 is directly coupled to an output shaft of the brushless motor 1. The commutation signal detecting unit 2 contains a commutation sensor 21 for detecting a position of a movable member, or a rotor (not shown in detail) of the brushless motor 1, and a position detector 22 for processing the output signal of the commutation sensor 21. The speed detecting unit 5 detects the rotation speed of the movable member of the brushless motor 1 in combination with the rotation direction based upon the output signal of the commutation signal detecting unit 2 to thereby output an output signal N5. The output signal N5 from the speed detecting unit 5 owns a positive value directly proportional to the rotation speed when the brushless motor 1 is rotated along the normal rotation direction, and also owns a negative value directly proportional to the rotation speed when the brushless motor 1 is rotated along the reverse rotation direction. The output signal N5 of the speed detecting unit 5 is inputted into the voltage limit level setting unit 6. In the voltage limit level setting unit 6, a limit value setting signal V6 to be supplied to the voltage limiter unit 7 is produced based on the output signal N5. An output signal V4 from the output voltage instructing unit 4 is limited by the voltage limiter unit 7 to produce an output voltage instruction signal V3 which will then be entered into the drive circuit 3. In other words, when the output signal V4 of the output voltage instructing unit 4 is lower than, or equal to the limit value setting signal V6 from the voltage limit level setting unit 6, the voltage limiter unit 7 outputs the output signal V4 as the output voltage instruction signal V3. On the other hand, when the output signal V4 is higher than the limit value setting signal V6, the voltage limiter unit 7 outputs the limit value setting value V6 as the output voltage instruction signal V3.

The DC main power supply 16 produces a DC voltage of 140V or 280V by rectifying/smoothing an AC voltage (100V, or 200V) outputted from a commercial power supply 161 by a rectifying circuit 162 and a smoothing capacitor 163. The DC voltage outputted from the DC main power supply 16 is applied to the drive circuit 3.

The drive circuit 3 produces a commutation signal used to drive the movable member of the brushless motor 1 in response to the output signal of the commutation signal detecting unit 2. Also, the drive circuit 3 controls such a ratio by way of a so-called "PWM (pulse width modulation) system" in response to the output voltage instruction signal V3 derived from the voltage limiter unit 7. This ratio is defined by such a ratio of time during which the output voltages thereof O1, O2, O3 become plus-sided voltages of the DC main power supply 16 to time during which the output voltages thereof O1, O2, O3 become minus-sided voltages of the DC main power supply 16. As a result, this drive circuit 3 outputs the output voltages of the DC main power supply 16 as the output voltages O1, O2, O3 of the ratio in accordance with the output voltage instruction signal V3. The output voltages O1, O2, O3 of the drive circuit 3 are applied to drive windings of the respective phases of the brushless motor 1, respectively. As a consequence, the output voltages O1, O2, O3 of the drive circuit 3 may function as drive voltages of the brushless motor 1. Now, for instance, in the case that the output voltages O1, O2, O3 of the drive circuit 3 drive the brushless motor 1 in a sinusoidal wave mode, these output voltages may be formed as 3-phase sine wave voltages, the phase differences of which are 120 degrees in an electrical angle, and the output peak voltages of which correspond to the output voltage instruction signal V3. Also, in the case that the output voltages O1, O2, O3 of the drive circuit 3 drive the brushless motor 1 in a rectangular wave mode, these output voltages may be formed as the following voltages whose phase differences are 120 degrees in an electrical angle. That is, these voltages own positive voltage values corresponding to the output voltage instruction signal V3 during a time period of 120 degrees in an electrical angle. In the subsequent time period of 60 degrees in an electrical angle, the applications of the voltages to the drive windings are rest. In the subsequent time period of 120 degrees in an electrical angle, the output voltages own negative voltage values corresponding to the output voltage instruction signal V3. In the subsequent time period of 60 degrees in an electrical angle, the applications of the voltages to the drive windings are rest. Subsequently, this voltage variation is repeatedly carried out.

Referring now to FIG. 2A and FIG. 2B, operations of the protection apparatus of the brushless motor with the above-described circuit arrangement, according to this first embodiment mode, will be explained.

FIG. 2A and FIG. 2B graphically represent a relationship between the output signal N5 of the speed detecting unit 5 and the output voltage instruction signal V3 supplied to the drive circuit 3 in the case that the output signal V4 is outputted from the output voltage instructing unit 4, and a rotation speed-to-output torque characteristic (N-T characteristic), a rotation speed-to-drive current characteristic (N-I characteristic), and also a fan load characteristic of the fan 15.

As indicated in the drawings, the fan load owns such a characteristic that when the rotation speed is increased, this fan load is increased. When the fan 15 is driven by the brushless motor 1, the fan 15 is operated in such a manner that the rotation speed becomes stable at a balancing point "a" where the output torque of the brushless motor 1 is balanced with the fan load torque of the fan 15.

In such a case that the rotation speed is under stable condition at the point "a" as described above, when a strong wind (adverse, or against wind) such as typhoon or cyclone is blown on the fan 15 so that drive torque along the reverse direction is forcibly applied to the brushless motor 1, the rotation speed of the brushless motor 1 is lowered in accordance with the N-T characteristics thereof and the N-I characteristics thereof, and also the drive current is increased. Thereafter, the operating point will be transferred from the point "a" to the point "b". If a further strong adverse wind is blown on the fan 15 after the operating point has been transferred to the point "b", the rotation speed of the brushless motor 1 is further lowered. At this time, if the output signal V4 of the output voltage instructing unit 4 is inputted without any limitation as the output voltage instruction signal V3 of the drive circuit 3, then the operating point is transferred from the point "b" to the point "d", the rotation speed is lowered, and also the drive current of the brushless motor 1 is further increased. When the drive current is increased, the following difficulties will occur similar to the prior art. That is, there is a risk that the amounts of heat generations in the brushless motor 1 and the drive circuit 3 are increased and therefore are electrically destroyed. Otherwise, to avoid the electrical destroy, the power semiconductor components having the large power capacities and also the large sizes, which constitute the drive circuit 3, are necessarily required. Alternatively, in the case that the brushless motor is tripped for protection purposes during overcurrent, the brushless motor is frequently stopped every time strong winds are blown thereon, which can be hardly used as the outdoor fan motor of the air conditioner.

In order to avoid such difficulties, both the voltage limit level setting unit 6 and the voltage limiter unit 7 are provided in this embodiment mode.

A description will now be made of operations of the voltage limit level setting unit 6 and the voltage limiter unit 7. It should be understood that the following description describes such an example that the brushless motor 1 is driven in the sinusoidal wave mode. Accordingly, the output voltages O1, O2, O3 from the drive circuit 3 are three-phase sine wave voltages having phase differences of 120 degrees from each other in an electrical angle, and the peak (crest) value of the output voltage corresponds to the output voltage instruction signal V3.

The voltage limit level setting unit 6 is operated so as to output as the output signal V6 to the voltage limiter unit 7, a setting signal for setting upper limit values of voltage peak values of the 3-phase sine wave voltages O1, O2, O3 corresponding to the output voltages of the drive circuit 3. Concretely speaking, the output signal V6 is variable in response to the output signal N5 of the speed detecting unit 5, and is reduced (or increased) in connection with the decrease (or increase) of the output signal N5.

The voltage limiter unit 7 is operated in such a manner that the output signal V4 of the output voltage instructing unit 4 is limited in response to the output signal V6 of the voltage limit level setting unit 6, and the upper limit values of the voltage peak values of the 3-phase sine wave voltages O1, O2, O3 corresponding to the output voltages of the drive circuit 3 are limited. Concretely speaking, in the case that the output signal V4 of the output voltage instructing unit 4 is lower than, or equal to the output voltage V6 of the voltage limit level setting unit 6, the output signal V4 is outputted as the output voltage instruction signal V3 from the voltage limiter unit 7 to the drive circuit 3, and then the brushless motor 1 is driven in response to the output signal V4 of the output voltage instructing unit 4. Also, in the case that the output signal V4 of the output voltage instructing unit 4 exceeds the output voltage V6 of the voltage limit level setting unit 6, the output signal V6 is outputted as the output voltage instruction signal V3 from the voltage limiter unit 7 to the drive circuit 3, and then the brushless motor 1 is driven in response to the output signal V6 of the voltage limit level setting unit 6. In other words, when the output signal V4 exceeds the output signal V6, the output voltage instruction signal V3 of the drive circuit 3 is decreased (or increased) in connection with the decrease (or increase) of the output signal N5 of the speed detecting unit 5.

Referring now to FIG. 2A and FIG. 2B, the following operations of the brushless motor protection apparatus equipped with the above-described voltage limit level setting unit 6 and the voltage limiter unit 7 according to this embodiment mode will be described, under such a condition that a strong wind (adverse wind) such as typhoon is blown to the fan 15, and thus the drive torque is forcibly applied to the brushless motor 1 along the reverse direction.

Figure 3A:
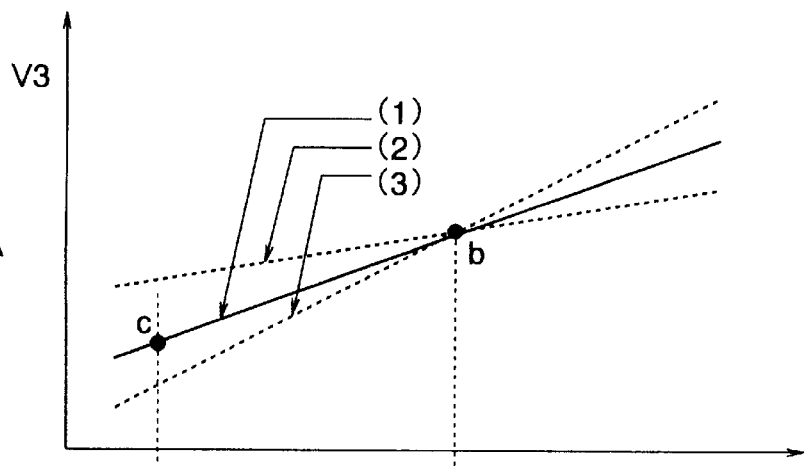
FIG. 3A and FIG. 3B are explanatory diagrams for explaining operations of the protection apparatus for the brushless motor indicated in FIG. 1.

At the operating point "a" indicated in FIG. 2A and FIG. 3A, the output signal V4 of the output voltage instructing unit 4 is lower than, or equal to the output signal V6 of the voltage limit level setting unit 6, the brushless motor 1 is driven in response to the output signal V4, and as previously explained, the rotation speed is brought into the stable condition, i.e., "Na" in such a way that the output torque of the brushless motor 1 is balanced with the fan load torque of the fan 15.

When the strong adverse (against) wind is blown to the fan 15 under such a condition of the operating point "a", the rotation speed of the brushless motor 1 is lowered. Thereafter, the operating condition reaches the operating point "b" at which the rotation speed becomes "Nb". When a further strong adverse wind is blown, the rotation speed of the brushless motor 1 is further decreased to become "Nc". When the rotation speed of the brushless motor 1 is reduced to "Nc", the output signal N5 of the speed detecting unit 5 is also decreased in response to the rotation speed. In connection with this decrease, the output signal V6 of the voltage limit level setting unit 6 is decreased. At this time, the output signal V4 of the output voltage instructing unit 4 is brought into such a condition that this output signal V4 exceeds the output signal V6, and then the output signal V6 of the voltage limit level setting unit 6 is applied as the output voltage instruction signal V3 of the drive circuit 3. As a consequence, the voltage peak values of the 3-phase sine wave voltages O1, O2, O3 corresponding to the drive voltage of the brushless motor 1 are suppressed, and thus the increase of the drive current can be suppressed, as represented in the operating point "c" of FIG. 2A and FIG. 2B.

Next, the rotation speed is further reduced up to near zero, i.e., "Ne". As previously described, the voltage limit level setting unit 6 is arranged by that the output signal V6 thereof is outputted in response to the output signal N5 of the speed detecting unit 5. There is a risk that while the rotation speed of the brushless motor 1 is lowered, the speed detecting precision of the speed detecting unit 5 is lowered and thus the output signal N5 thereof becomes unstable. As a consequence, when the rotation speed is approximated to 0, there is a risk that the output signal V6 of the voltage limit level setting unit 6 is brought into the unstable condition. This is because the speed detecting unit 5 detects the speeds of the brushless motor 1 based on the output signal of the commutation signal detecting unit 2. In other words, generally speaking, only such a positional signal constituted by several pulses (for instance, 6 pulses) per 1 rotation is outputted from the commutation sensor 21. Therefore, it is practically impossible to detect the rotation speed near 0 from this positional signal under stable condition in high precision. It should be noted although an encoder capable of outputting a high pulse may be employed as the commutation sensor 21, this encoder is very expensive and therefore is not properly utilized as a fan motor drive purpose of an air conditioner.

As previously explained, when the rotation speed is reduced to near zero, i.e., "Ne", the speed detecting unit 5 can hardly output the output signal N5 under stable condition in high precision, so that the output signal V6 from the voltage limit level setting unit 6 becomes unstable. To avoid this unstable condition, in the rotation speed lower than, or equal to "Ne", the output signal of the voltage limit level setting unit 6 may be set to a constant value irrelevant to the output signal N5 of the speed detecting unit 5, involving the reverse rotation of the brushless motor 1.

Accordingly, when a further strong wind is blown from such a condition of the operating point "e" that the rotation speed becomes "Ne", the voltage peak values of the 3-phase sine wave voltages O1, O2, O3 corresponding to the drive voltages of the brushless motor 1 become constant, and then the drive current starts to be increased, as indicated at an operating point "p".

At this time, the drive current is sufficiently suppressed by the voltage limit level setting unit 6 and the voltage limiter unit 7 until the rotation speed of the brushless motor 1 reaches "Ne". Although this level is not equal to such a level that the tripping problem will occur in response to the over-current, the output signal V6 when the rotation speed becomes below "Ne" should be preferably set to a constant minimum value as low as possible in order to suppress the increased level. However, if this output signal V6 is excessively reduced to the small value, then the output torque would be lowered. As a result, since there is a risk that the brushless motor 1 cannot be initiated although the fan 15 is rotated along the reverse direction by receiving a weak wind, a special care should be taken thereto.

As described above, according to this embodiment mode, since both the voltage limit level setting unit 6 and the voltage limiter unit 7 are employed, even when the strong wind (adverse wind) such as typhoon would blow to forcibly and externally drive the brushless motor 1, increasing of the drive current can be suppressed. As a consequence, the amounts of heat generations of the brushless motor 1 and the drive circuit 3 are low, and also the compact electronic components with the small power capacity can be used in the power semiconductor components for constituting the drive circuit 3. Further, it is possible to realize the protection apparatus for the brushless motor suitable to drive the outdoor fan of the air conditioner, while this outdoor fan is not stopped by the overcurrent trip every time the strong winds blow.

Figure 3B:
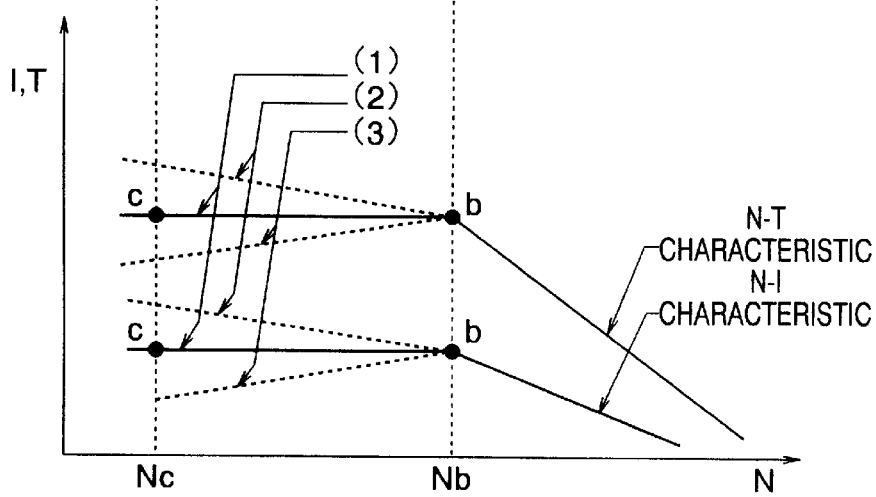

As to such a portion that the brushless motor 1 is driven based upon the output signal V6 of the voltage limit level setting unit 6, namely, such a portion that the rotation speed becomes lower than the operating point "b" shown in FIG. 2A and FIG. 2B, the N-T characteristic and the N-I characteristic of the brushless motor 1 may be varied based on the set value of the voltage limit level setting unit 6. In other words, as shown in FIG. 3A and FIG. 3B, the ratio of the change in the output signal V6 of the voltage limit level setting unit 6 to the output signal N5 of the speed detecting unit 5 is varied as straight lines (1), (2), (3), so that the N-T characteristic and the N-I characteristic of the brushless motor 1 may be freely varied as the straight lines (1), (2), (3). As a consequence, the characteristics of the brushless motor can be electrically adjusted, so that the same brushless motor may be easily and electrically applied under various use conditions.

It should be understood that as apparent from the foregoing description, the operating point "b" or the operating point "e" indicated in FIGS. 2A, 2B or FIGS. 3A, 3B may be arbitrarily set by, for instance, changing the content of the set value of the voltage limit level setting unit 6.

Also, the content (N5-V6 characteristic) of the set value of the voltage limit level setting unit 6 is not required to be such a linear characteristic as shown in FIGS. 2A, 2B or FIGS. 3A, 3B. Alternatively, this characteristic may be mode as an arbitrary curve, and an arbitrary straight line or an arbitrary curve containing a discontinuity point.

The output voltages O1, O2, O3 of the drive circuit 3 are the 3-phase sine wave voltages in the above-embodiment made. Alternatively, there is no problem even when these output voltages may be selected from 3-phase rectangular voltages, and other waveform voltages suitable to drive the brushless motor 1.

(SECOND EMBODIMENT MODE)

Figure 4:
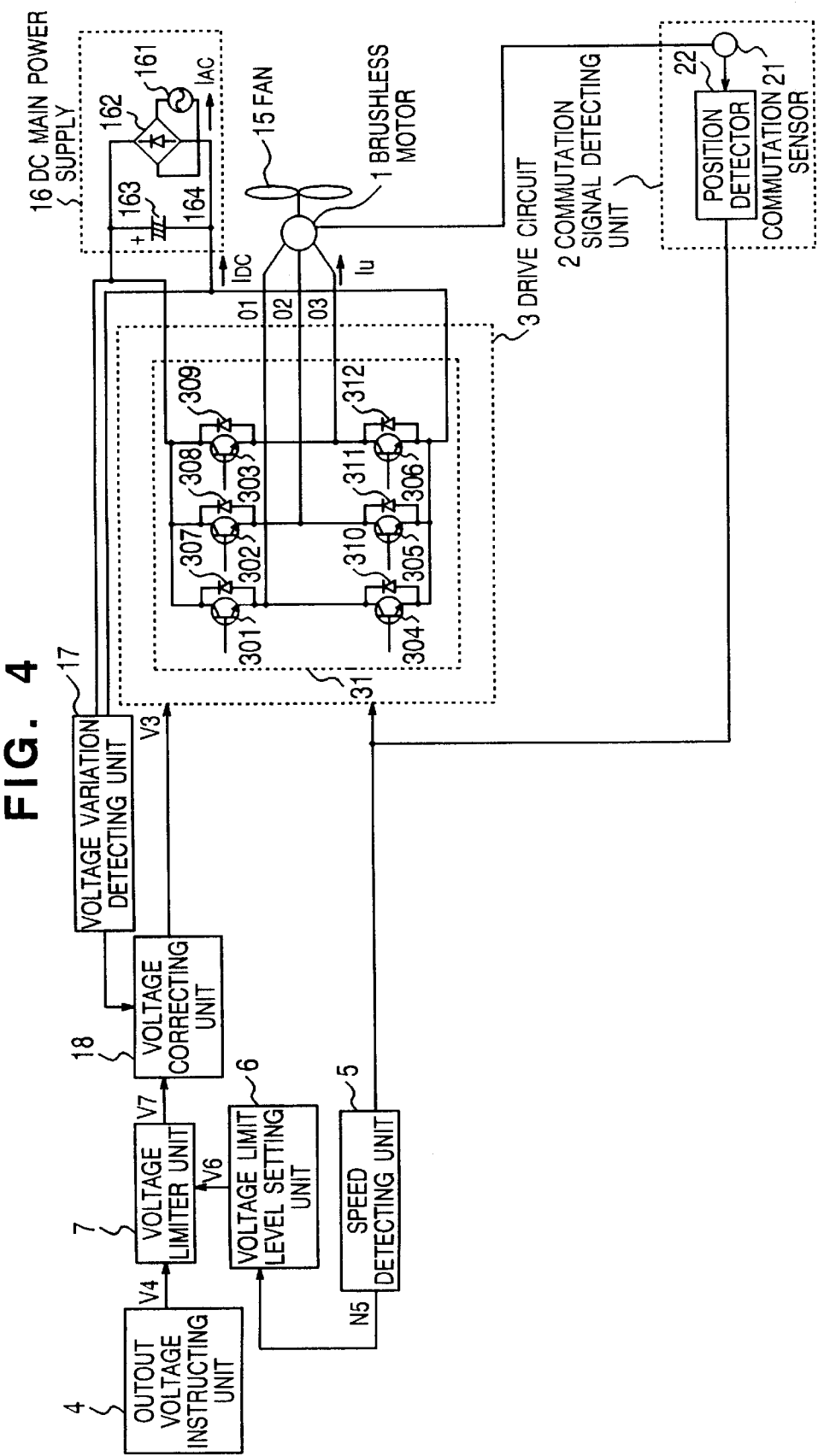
FIG. 4 is a circuit diagram for showing a protection apparatus for a brushless motor according to a second embodiment mode of the present invention.

As represented in FIG. 4, a protection apparatus for a brushless motor, according to a second embodiment mode of the present invention, owns a different structure, as compared with the protection apparatus for the brushless motor according to the first embodiment mode of the present invention as shown in FIG. 1. That is, this protection apparatus includes a voltage correcting unit 18 provided between the voltage limiter unit 7 and the drive circuit 3, and a voltage variation detecting unit 17 provided between the DC main power supply 16 and the voltage correcting unit 18. The voltage variation detecting unit 17 detects a variation contained in the DC voltage outputted from the DC main power supply 16. The voltage correcting unit 18 changes the output voltage V7 of the voltage limiter unit 7 in the opposite sense based upon the output signal of the voltage variation detecting unit 17 in such a manner that the variation in the DC voltage outputted from the DC main power supply 16 can be compensated, so that an output voltage instruction signal V3 is supplied to the drive circuit 3.

Operations of the protection apparatus for the brushless motor with employment of the above-described circuit arrangement according to the second embodiment will now be explained. It should be noted that since the operations of the structural portions other than the voltage variation detecting unit 17 and the voltage correcting unit 18 are similar to those of the protection apparatus shown in FIG. 1, explanations thereof are omitted.

The protection apparatus for the brushless motor according to this second embodiment has the same effect as that of the first embodiment. That is, even when the brushless motor 1 is forcibly and externally driven by receiving the strong wind (adverse wind) such as typhoon, increasing of the drive current can be suppressed by the voltage limit level setting unit 6 and the voltage limiter unit 7, as shown in FIG. 2A and FIG. 2B. However, in such a case that the output voltage of the DC main power supply 16 is varied, since the drive circuit 3 is arranged in such a manner that the output voltage from the DC main power supply 16 is outputted in the ratio responding to the output voltage instruction signal V3, the output voltages O1, O2, O3 of the drive circuit 3 are also varied in connection with the variation in the output voltages from the DC main power supply 16.

When the output voltages O1, O2, O3 of the drive circuit 3 are varied, the following difficulties will occur.

First, considering such a case that the output voltages of the DC main power supply 16 is varied along the increase direction. In this case, if there is no change in the output voltage instruction signal V3 supplied to the drive circuit 3, then the output voltages O1, O2, O3 of the drive circuit 3 are similarly increased only by the ratio of the increased output voltage of the DC main power supply 16. As a consequence, the drive voltage of the brushless motor 1 is increased, and thus the drive current is also increased. This phenomenon will be emphasized when the output voltage of the DC main power supply 16 is greatly varied. In the worst case, there are the above-described risks that the brushless motor is tripped due to the overcurrent.

Next, considering such a case that the output voltage of the DC main power supply 16 is varied along the decrease direction. In this case, if there is no change in the output voltage instruction signal V3 supplied to the drive circuit 3, then the output voltages O1, O2, O3 of the drive circuit 3 are similarly decreased only by the ratio of the decreased output voltage of the DC main power supply 16. As a result, the drive voltage of the brushless motor 1 is decreased, and the output torque thereof is decreased, so that the fan drive capability is lowered to thereby reduce the air capacity. Furthermore, when the output voltages O1, O2, O3 become lower than the induced voltage internally produced from the brushless motor 1, the brushless motor 1 produces the regenerative power, so that the drive circuit 3 and the like are brought into the overvoltage conditions. In the worst case, there are risks that these circuit elements are electrically destroyed.

When a strong wind (adverse wind) such as typhoon is blown to the fan 15, and then the output voltage of the DC main power supply 16 is increased while the voltage limit level setting unit 6 and the voltage limiter unit 7 are operated to suppress increasing of the drive current of the brushless motor 1, this suppression level is also adversely influenced.

To avoid the above-described difficulty, in accordance with this second embodiment mode, both the voltage variation detecting unit 17 and the voltage correcting unit 18 are employed.

That is, the voltage variation detecting unit 17 may be so arranged that the output voltage variation of the DC main power supply 16 is directly detected from the output voltage of the DC main power supply 16, and otherwise, this output voltage variation is detected from the currents flowing through the drive windings, equal to the drive current of the brushless motor 1. In this embodiment, the output voltage variation of the DC main power supply 16 is directly detected from the output voltage of the DC main power supply 16.

In general, the DC main power supply 16 is constructed of a commercial power supply 161 of AC 100V, or AC 200V; a rectifying circuit 162 such as a diode bridge for rectifying the output voltage of this commercial power supply 161; a smoothing capacitor 163 for smoothing the output voltage of this rectifying circuit 162; and an impedance element such as a reactor 164 to improve a power factor of the power supply. In the case that the output current derived from the DC main power supply 16 is high, time required to supply the electric charges into the smoothing capacitor 163 is prolonged due to the influence caused by the reactor 164, so that the output voltage is largely varied. This implies that the variation contained in this output voltage can be detected based on the output current IDC of the DC main power supply 16. Also, this implies that the variation contained in the output voltage of the DC main power supply 16 can be detected based on the drive current of the brushless motor 1 driven by supplying the current from the DC main power supply 16 thereto, namely, the current IM flowing through the drive winding. Furthermore, as apparent from the foregoing description, the output voltage variation of the DC main power supply 16 can be detected based on the AC output current IAC of the commercial power supply 161 for constituting the DC main power supply 16.

As described above, when the output voltage variation of the DC main power supply 16 is detected by the voltage variation detecting unit 17, the output signal V7 of the voltage limiter unit 7 is varied by the voltage correcting unit 18 based on this detection signal in such a manner that the output voltage variation of the DC main power supply 16 is canceled. Then, the output signal corrected by the voltage correcting unit 18 can be supplied as the output voltage instruction signal V3 to the drive circuit 3. As a result, there is no adverse influence caused by the variation contained in the output voltage from the DC main power supply 16, and therefore, all of the problems related to this factor can be solved.

As previously described, in accordance with this second embodiment mode, since the voltage variation detecting unit 17 and the voltage correcting unit 18 are employed in addition to the voltage limit level setting unit 6 and the voltage limiter unit 7, even when the strong wind (adverse wind) such as typhoon would blow to forcibly and externally drive the brushless motor 1, it is possible to suppress the increase of the drive current without receiving the adverse influences by the DC main power supply, and in combination therewith, possible to prevent lowering of the fan drive capability and generation of the regenerative power of the brushless motor 1 in response to the output voltage variation of the DC main power supply 16. As a consequence, the amounts of heat generations of the brushless motor 1 and the drive circuit 3 are low, and also the compact electronic components with the small power capacity can be used in the power semiconductor components for constituting the drive circuit 3. Further, it is possible to realize the safety protection apparatus for the brushless motor suitable to drive the outdoor fan of the air conditioner, while this outdoor fan is not stopped by the overcurrent trip, but also the regenerative power is not produced even when the strong wind and the DC main power supply voltage are varied.

Also, very recently, to simplify an entire appliance of an air conditioner, there is a certain possibility that an outdoor fan motor and a compressor motor are driven in a parallel manner by introducing the same DC main power supply. A drive current of a compressor motor is greatly higher than that of an outdoor fan motor. Moreover, the rotation speed of this compressor motor is varied in response to indoor and outdoor temperatures, while selecting optimum rotation speeds. Also, there are large variations in this drive current of the compressor motor. As a result, when the brushless motor 1 functioning as the outdoor fan motor, and the compressor motor are driven in the parallel manner by the output voltage of the DC main power supply 16, the variation contained in the output voltage from the DC main power supply 16 is extremely increased. Accordingly, the above-explained various problems caused by this large output variation of the DC main power supply 16 would become more serious.

Even in such a case, the second embodiment mode can provide the more effective advantages. It should be noted that the output voltage variation of the DC main power supply 16 can be detected from the drive currents flowing through the drive windings of the compressor motor driven by supplying thereto the current from the DC main power supply 16.

(THIRD EMBODIMENT MODE)

As indicated in FIG. 5, a protection apparatus for a brushless motor, according to a third embodiment mode of the present invention, mainly owns the following different circuit arrangement from that of the protection apparatus for the brushless motor according to the second embodiment mode of the present invention. That is, this protection apparatus for the brushless motor according to the third embodiment includes a normal rotation limiter unit 9, a reverse rotation limiter unit 10, and an OR gate circuit 12 for OR-gating a first power supply interrupting signal S9 outputted from the normal rotation limiter unit 9, and a second power supply interrupting signal S10 outputted from the reverse rotation limiter unit 10.

In this embodiment, the normal rotation limiter unit 9 contains a maximum limit level setting unit 92 and a comparator 91 having a hysteresis characteristic and for comparing an output signal N92 derived from the maximum limit level setting unit 92 with the output signal N5 from the speed detecting unit 5. When the output signal N5 of the speed detecting unit 5 is larger than the output signal N92 of the maximum limit level setting unit 92, a signal with a high level outputted from the comparator 91 having the hysteresis characteristic is outputted as the first power supply interrupting signal S9. The reverse rotation limiter unit 10 includes a reverse rotation limit level setting unit 102, and another comparator 101 for comparing an output signal N102 of the reverse limit level setting unit 102 with the output signal N5 of the speed detecting unit 5. When the output signal N5 of the speed detecting unit 5 is smaller than an output signal N102 of the reverse rotation limit level setting unit 102, a signal with a high level outputted from the comparator 101 is outputted as the second power supply interrupting signal S10. In the case that any one of the first power supply interrupting signal S9 and the second power supply interrupting signal S10 is at a high level, a free run signal Fre with a high level is outputted to the drive circuit 3.

The drive circuit 3 is capable of electrically opening/closing the connections with the brushless motor 1 based on the free run signal Fre. When the free run signal Fre is at a low level, the drive circuit 3 is electrically connected with the brushless motor 1, so that the output voltages O1, O2, O3 of the drive circuit 3 according to the output voltage instruction signal V3 are applied to the brushless motor 1. When the free run signal Fre is at a high level, all of the power transistors 301–306, which are provided in the drive circuit 3, are turned OFF, so that the drive circuit 3 is electrically opened from the brushless motor 1, so that the output voltages O1, O2, O3 of the drive circuit 3 are not supplied to the brushless motor 1.

A description will now be made of operations of the protection apparatus for the brushless motor with employment of the above-described circuit arrangement according to the third embodiment. It should be noted that since the operations of the structural circuit portions other than the normal rotation limiter unit 9, the reverse rotation limiter unit 10, the OR gate circuit 12, and the drive circuit 3 are similar to those of the second embodiment shown in FIG. 4, explanations thereof are omitted.

The protection apparatus for the brushless motor according to this third embodiment has the same effect as that of the second embodiment. That is, even when the brushless motor 1 is forcibly and externally driven by receiving the strong wind (adverse wind) such as typhoon, increasing of the drive current can be suppressed by the voltage limit level setting unit 6 and the voltage limiter unit 7. Moreover, in such a case that the output voltage of the DC main power supply 16 is varied, the voltage variation detecting unit 17 and the voltage correcting unit 18 can prevent increasing of the drive current of the brushless motor 1 and lowering of the fan drive capability, and also can avoid the occurrence of the regenerative power.

Figure 6A:
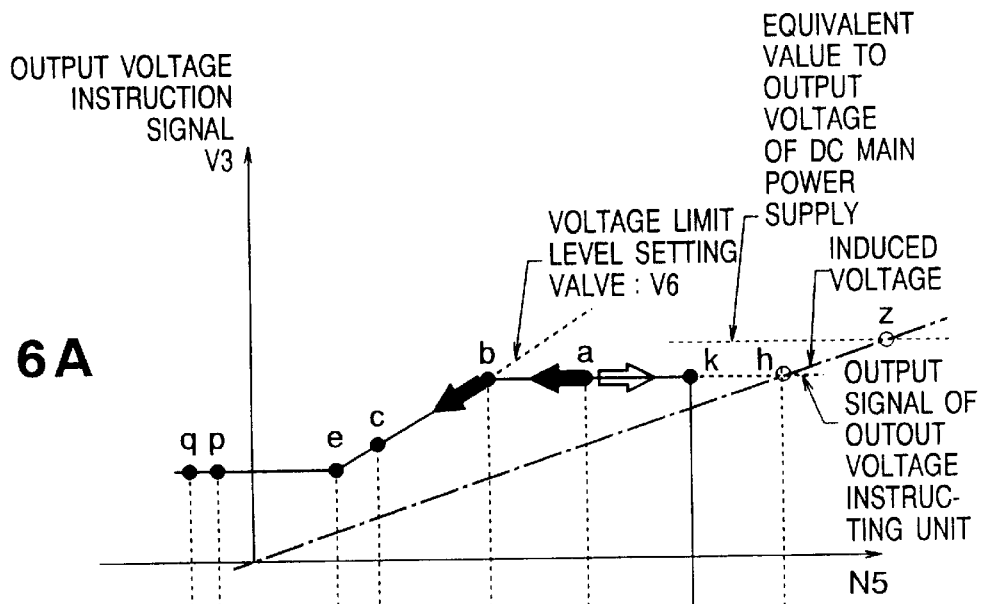
FIG. 6A and FIG. 6B are explanatory diagrams for explanating operations of the protection apparatus for the brushless motor indicated in FIG. 5.
Figure 6B:
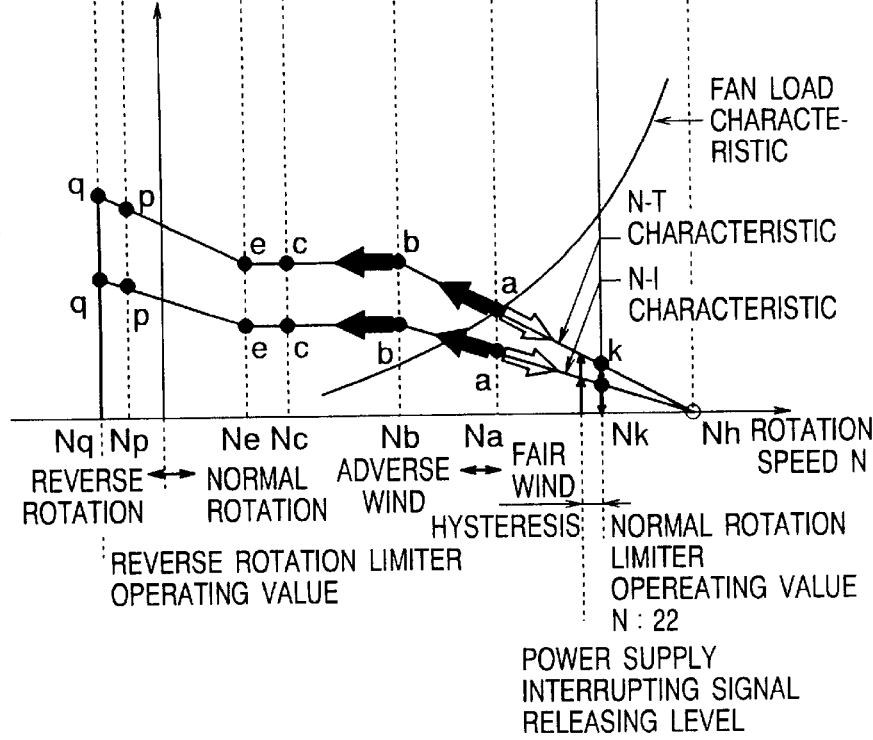

FIG. 6A and FIG. 6B graphically show operations when the brushless motor 1 is driven in the third embodiment of FIG. 5. In the operation diagrams shown in FIG. 6A and FIG. 6B, operations defined at the operating points "a", "b", "c", "e", and "p" are similar to those defined at the respective operating points indicated in FIG. 2A and FIG. 2B. In other words, the operating point "a" is such a condition that the output signal V4 of the output voltage instructing unit 4 is inputted as the output voltage instruction signal V3 into the drive circuit 3, and the brushless motor 1 is driven in response to the output signal V4. At the operating point "b", the rotation speed of the brushless motor 1 is lowered by receiving the strong wind (adverse wind), and then both the voltage limit level setting unit 6 and the voltage limiter unit 7 start to be operated. When the rotation speed of the brushless motor 1 is further lowered from this rotation speed, the output voltage instruction signal V3 of the drive circuit 3 is inputted based on the output signal V6 of the voltage limit level setting unit 6, as indicated in the operating point "c", so that increasing of the drive current of the brushless motor 1 is suppressed. Also, the operating point "e" shown in FIG. 6 is such an operating point that when the rotation speed of the brushless motor 1 is further lowered by receiving the strong adverse wind, the output signal V6 of the voltage limit level setting unit 6 is made as a constant value so as to avoid the difficulty, namely, lowering of the speed detection precision of the output signal N5 from the speed detecting unit 5. If the rotation speed is further lowered than this rotation speed, then the output voltage instruction signal V3 of the drive circuit 3 is fixed to a constant value and then the brushless motor 1 is driven, as indicated in the operating point "p".

As a consequence, even when such a strong adverse wind is produced by which the brushless motor 1 is forcibly rotated along the reverse direction, the increase of the drive current can be suppressed. Since the brushless motor 1 is driven in response to the constant output voltage instruction signal V3 in the lower rotation speed region than the operating point "e", when a further strong adverse wind is produced, the speed of the reverse rotation is increased, so that the drive current would be necessarily increased. When the drive current of the brushless motor 1 is increased, the following difficulties will occur. That is, there is a risk that the amounts of heat generation in the brushless motor 1 and the drive circuit 3 are increased and therefore are electrically destroyed. Otherwise, to avoid the electrical destroy, the power semiconductor components having the large power capacities and also the large sizes, which constitute the drive circuit 3, are necessarily required. Alternatively, in the case that the brushless motor is tripped for protection purposes during overcurrent, the brushless motor is frequently stopped every time strong winds are blown thereon, which can be hardly used as the outdoor fan motor of the air conditioner.

In order to avoid such difficulties, the reverse rotation limiter unit 10 is provided in this embodiment mode.

The reverse rotation limiter unit 10 is operated in such a manner that a signal with a high level is outputted as the second power supply interrupting signal S10 when the output signal N5 of the speed detecting unit 5 becomes lower than a reverse rotation limiter operating value N102 set in a reverse rotation region by the reverse rotation limit level setting unit 102.

The operations of this third embodiment mode with employment of the reverse rotation limiter unit 10 operable in the above-described manner will now be explained with reference to FIGS. 6A and 6B.

As previously described, in the range of the rotation speed lower than the operating point "e", since the brushless motor 1 is driven in response to the constant output voltage instruction signal V3, the drive current is increased in conjunction with the decrease of the rotation speed. Then, in the case that an extremely strong adverse influence is produced, the brushless motor 1 is forcibly driven in the reverse rotation direction, so that the drive current is further increased. When the reverse rotation speed of the brushless motor 1 reaches an operating point "q" equal to the reverse rotation limiter operating value N102 set by the reverse rotation limit level setting unit 102, the reverse rotation limiter unit 10 outputs the second power supply interrupting signal S10 with a high level. The second power supply interrupting signal S10 with the high level causes the free run instruction signal Fre to become a high level, and this free run instruction signal is supplied via the OR gate circuit 12 to the drive circuit 3. As a result, the brushless motor 1 is electrically opened from the output of the drive circuit 3, and thus the supply of power is interrupted. Therefore, it is possible to prevent the drive current from being increased.

After the supply of power is interrupted, the brushless motor 1 is forcibly driven at a further large reverse rotation speed until blowing of the adverse wind stops. However, if the supply of power is interrupted, then the drive current becomes zero, resulting in no problem.

When blowing of such strong adverse winds as typhoon is stopped, the brushless motor 1 under no power supply is continuously rotated for the time being due to the force of inertia of the fan 15. Soon, the reverse rotation speed will be lowered up to the reverse rotation limiter operating value N102. When this reverse rotation speed is reduced to the reverse rotation limiter operating value N102, the level of the second power supply interrupting signal S10 outputted from the reverse rotation limiter unit 10 become a low level. Then, the supply of power to the brushless motor 1 is again commenced in order that driving of this brushless motor 1 is automatically returned.

As previously explained, in the above-explained operations, the strong adverse wind such as typhoon gives the effects to the drive direction of the brushless motor 1 along the reverse direction. On the other hand, in the below-mentioned operations, the strong fair (following) wind will give effects to the drive direction of the brushless motor 1 along the forward direction.

In FIGS. 6A and 6B, the following case will now be considered. That is, a strong fair wind is blown to the fan 15 under state of the operating point "a", and the brushless motor 1 is forcibly accelerated by receiving the external force along the same direction as the drive direction of this brushless motor 1.

Under the condition defined at the operating point "a" where no external force is normally applied to the brushless motor 1, the output voltages O1, O2, O3 of the drive circuit 3 outputted in response to the output voltage instruction signal V3 become larger values than the induced voltage internally produced from the brushless motor 1, which causes no problem. However, when the brushless motor 1 is forcibly accelerated by receiving the strong fair wind, the induced voltage internally produced from the brushless motor 1 is increased. Soon, when the induced voltage exceeds the output voltages O1, O2, O3 of the drive circuit 3 outputted in response to the output voltage instruction signal V3, the regenerative power is produced.

In FIGS. 6A and 6B, in the case that the output voltage V4 of the output voltage instructing unit 4 is supplied as the output voltage instruction signal V3 to the drive circuit 3, an operating point "h" corresponds to such a point that the above-described regenerative power starts to be generated. If the brushless motor 1 is forcibly accelerated by the fair wind from this operating point "h", then the regenerative power is produced. When the brushless motor 1 produces the regenerative power, power is conversely supplied to the drive circuit 3 which originally supplies the power to the brushless motor 1. As a consequence, there is a problem that either the drive circuit 3 or the DC main power supply 16 is electrically destroyed by the overvoltage or the overcurrent. To avoid such a problem, the normal rotation limiter unit 9 is employed according to this third embodiment.

That is, the normal rotation limiter unit 9 is operated in such a manner that when the output signal N5 of the speed detecting unit 5 exceeds a normal rotation limiter operating value N92 set by a maximum limit level setting unit 92, a signal with a high level is outputted as the first power supply interrupting signal S9.

Referring now to FIGS. 6A and 6B, operations of the brushless motor protection apparatus with employment of the normal rotation limiter unit 9 according to the third embodiment will be explained.

In FIGS. 6A and 6B, at the operating point "a", a strong fair wind is not yet produced, and therefore, the brushless motor 1 is stably driven at a rotation speed of "Na" under such a condition that the output torque of the brushless motor 1 is balanced with the fan load of the fan 15.

When a strong fair wind is produced under such a balanced condition and thus the brushless motor 1 is forcibly accelerated, the rotation speed of the brushless motor 1 will reach a rotation speed "Nk", as indicated by an operating point "k", which corresponds to the normal rotation limiter operating value N92 set by the maximum limit level setting unit 92. When the rotation speed of the brushless motor 1 reaches "Nk", the normal rotation limiter unit 9 outputs the first power supply interrupting signal S9 with a high level. The first power supply interrupting signal S9 with the high level causes the free run instruction signal Fre of the drive circuit 3 to become a high level via the OR gate circuit 12. As a result, the brushless motor 1 is electrically released from the output of the drive circuit 3, and then the supply of power is interrupted. When the supply of power to the brushless motor 1 is interrupted, the drive current becomes zero, so that there is no risk that the semiconductor components for constituting the drive circuit 3 are electrically destroyed due to the overcurrent.

On the other hand, as to the induced voltage internally produced from the brushless motor 1, this induced voltage is applied to the output voltages O1, O2, O3 of the drive circuit 3 unless the brushless motor 1 is mechanically opened from the drive circuit 3 by employing an expensive and large-sized relay switch. In accordance with this third embodiment, the brushless motor 1 is opened from the drive circuit 3 only in the electrical manner, but both components are mechanically connected to each other. As a consequence, the induced voltage internally produced from the brushless motor 1 is applied to the output voltages O1, O2, O3 of the drive circuit 3. When all of semiconductor switching elements 31 such as power transistors 301 to 306 which constitute the drive circuit 3 are turned OFF so as to be electrically opened, it is possible to produce the regenerative power until an operating point "z" where a voltage peak value of this induced voltage exceeds the output voltage of the DC main power supply 16 to thereby conduct flywheel diodes 307 to 312, because of effects of these flywheel diodes 307 to 312. Normally, these flywheel diodes 307 to 312 are parallel-connected to the semiconductor switching elements such as power transistors 301 to 306 along the direction opposite to the conducting direction of the semiconductor switching elements.

In this case, the normal rotation limit level operating value N92 is set in such a manner that the rotation speed "Nk" corresponding thereto of the brushless motor 1 does not exceed another rotation speed "Nh" corresponding to an operating point "h" where the regenerative power starts to be produced when the output signal V4 is supplied as the output instruction signal V3 to the drive circuit 3. As a consequence, the supply of power to the brushless motor 1 is interrupted before the rotation speed of the brushless motor 1 reaches such a rotation speed at which the regenerative power is generated. Even when the rotation speed exceeds the operating point "h", the regenerative power is not immediately produced, but also the generation of this regenerative power can be prevented until at least the operating point "z".

When the brushless motor 1 is forcibly driven at a higher rotation speed than the operating point "z", the brushless motor 1 produces the regenerative power. At this time, the supply of power is already interrupted, no excessive current will flow through the drive circuit 3 and the brushless motor 1. Thus, there is no risk that both the drive circuit 3 and the brushless motor 1 are not electrictically destroyed by the overcurrent.

After the supply of power is interrupted, the brushless motor 1 is forcibly driven only by the strongly blowing fair winds, and then no power is supplied from the drive circuit 3, as compared with the operations before the supply of power is interrupted. Then, the rotation speed of the brushless motor 1 is lowered by the lost output torque.

In the case that the rotation speed of the brushless motor 1 reaches the rotation speed "Nk" to thereby interrupt the supply of power, since the rotation speed is lowered as explained above, the supply of power is again commenced. Then, the rotation speed of the brushless motor 1 reaches the rotation speed Nk, so that the supply of power is interrupted. There are certain possibilities such that the above-explained operation is repeated. When such an operation is repeatedly performed, the starting operation and the stopping operation of the brushless motor 1 are repeated until blowing of the strong wind such as typhoon stops, so that a large starting current is interruptedly produced, which may cause heat and noise generations from the brushless motor 1 and the drive circuit 3. To avoid this problem, the normal rotation limiter unit 9 is arranged by employing the comparator 91 with the hysteresis characteristic. In other words, the above-explained repetition operation can be avoided by such a way that when the supply of power to the brushless motor 1 is interrupted, the rotation speed of this brushless motor 1 is lowered from the rotation speed "Nk" by such a rotation speed corresponding to the hysteresis width of the comparator 9 having the hysteresis characteristic, and the supply of power is not restarted until the level reaches a power supply interrupting signal releasing level.

Also, when typhoon has passed to thereby stop the strong fair wind, the brushless motor 1 to which no power is supplied is continuously rotated due to the force of inertia of the fan 15. Gradually, when this rotation speed of the brushless motor is reduced to the rotation speed corresponding to the power supply interrupting signal releasing level, the first power supply interrupt signal S9 outputted from the normal rotation limiter unit 9 becomes a low level. Then, the supply of power to the brushless motor 1 is again commenced, and therefore, driving of this brushless motor 1 is automatically recovered.

As previously described in detail, in accordance with this third embodiment mode, since the reverse rotation limiter unit 10 is employed, in such a case that the brushless motor 1 is forcibly and externally driven by receiving the strong wind (adverse wind) such as typhoon, and in particular, the set value of the voltage limit level setting unit 6 becomes constant, and also the further strong adverse wind is blown even after the output voltage instruction signal V3 is fixed to a constant value, the supply of power to the brushless motor 1 is interrupted, so that the increase of this drive current can be prevented. Then, when blowing of the strong adverse wind stops, the supply of power to the brushless motor 1 is restarted. As a consequence, the amounts of heat generations of the brushless motor 1 and the drive circuit 3 are low, and also the compact electronic components with the small power capacity can be used in the power semiconductor components for constituting the drive circuit 3. Further, it is possible to realize the protection apparatus for the brushless motor suitable to drive the outdoor fan of the air conditioner, while this outdoor fan is not stopped by the overcurrent trip, every time the strong wind is blown to the fan of the brushless motor 1.

Also, since the normal rotation limiter unit 9 is employed, it is possible to prevent the regenerative power from being produced from the brushless motor 1 by interrupting the supply of power to the brushless motor 1 before the induced voltage internally produced from the brushless motor 1 exceeds the output voltages O1, O2, O3 of the drive circuit 3 even in such a case that the brushless motor 1 is forcibly and externally driven by receiving the strong wind (fair wind) such as typhoon to thereby be excessively accelerated. Thus, it is also possible to realize the protection apparatus of the brushless motor capable of preventing the occurrence of overcurrent, or overvoltage which is caused by supplying the power to the drive circuit 3 and the DC main power supply 16 along the reverse direction.

Furthermore, since the comparator 91 having the hysteresis characteristic is employed as the comparator for constituting the normal limiter unit 9, there is no possibility that starting and stopping operations of the brushless motor 1 are not repeated even when the normal rotation limiter unit 9 is operated to thereby interrupt the supply of power to the brushless motor 1 and thus the rotation speed is lowered. Accordingly, the starting current is not interruptedly produced, and such a protection apparatus of the brushless motor can be realized which can avoid the heat generations of the brushless motor 1 and the drive circuit 3 and also the occurrence of noise, and further can stably interrupt the supply of power.

When blowing of such a strong wind stops, since the supply of power to the brushless motor 1 is restarted, it is possible to realize the protection apparatus for the brushless motor suitable to drive the outdoor fan of the air conditioner without such a problem that the brushless motor is tripped to stop every time the strong wind is blown to this fan.

It should be noted that, as previously described, the reverse rotation limiter unit 10 is employed so as to prevent the drive current of the brushless motor 1 from being increased when the adverse wind blows. There is such a trend that when the brushless motor 1 is forcibly accelerated along the reverse direction under such a condition that the output voltage instruction signal V3 is a constant voltage, the induced voltage internally generated from the brushless motor 1 is increased. On the other hand, the internal impedance (namely, impedance caused by inductance of winding) of the brushless motor 1 is increased in connection with the increase of the reverse rotation speed, so that this drive current is not increased higher than a certain level. In such a case, if the increase of the drive current is slightly stopped, then the above-explained protection apparatus for the brushless motor may be alternatively arranged by eliminating the reverse rotation limiter unit 10 therefrom.

(FOURTH EMBODIMENT MODE)

Figure 7:
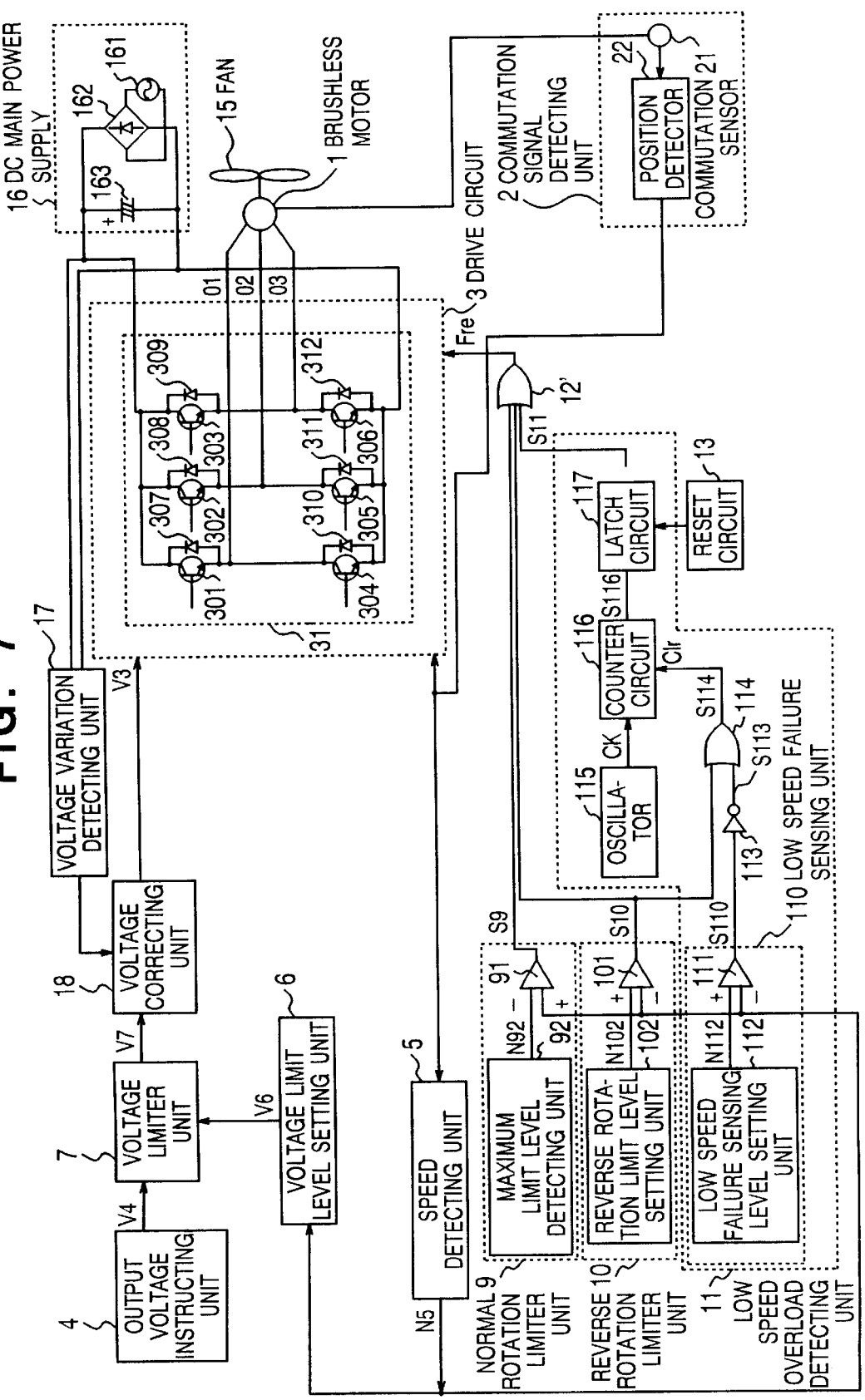
FIG. 7 is a circuit diagram for indicating a protection apparatus of a brushless motor according to a fourth embodiment mode of the present invention.

As represented in FIG. 7, a protection apparatus for a brushless motor, according to a fourth embodiment mode of the present invention, owns a different structure, as compared with the protection apparatus for the brushless motor according to the third embodiment mode of the present invention as shown in FIG. 5. That is, this protection apparatus includes a low speed overload detecting unit 11 and a reset circuit 13, and further an OR gate circuit 12' for OR-gating a first power supply interrupting signal S9 derived from a normal rotation limiter unit 9, a second power supply interrupting signal S10 derived from a reverse potation limiter unit 10, and a third power supply interrupting signal S11 derived from the low speed overload detecting unit 11.

In this case, the low speed overload detecting unit 11 contains a low speed failure sensing unit 110, an inverting circuit 113 for inverting a polarity of a low speed failure signal S110 outputted from the low speed failure sensing unit 110, and an OR gate circuit 114 for OR-gating an output signal S113 from the inverting circuit 113 and the second power supply interrupting signal S10 outputted from the reverse rotation limiter unit 10. This low speed overload detecting unit 11 further contains an oscillator 115 for producing a clock signal ck, a counter circuit 116 for counting the clock signal ck outputted from the oscillator 115 and also having a clear terminal clr into which an output signal S114 of the OR gate circuit 114 is inputted, and also a latch circuit 117 which is set in response to an output signal S116 derived from the counter circuit 116, and which is reset in response to an output signal derived from the reset circuit 13. The low speed failure sensing unit 110 contains a low speed failure sensing level setting unit 112, and a comparator 111 for comparing an output signal N112 from the low speed failure sensing level setting unit 112 with an output signal N5 of a speed detecting unit 5. When the output signal N5 of the speed detecting unit 5 becomes smaller than the output signal N112 of the low speed failure sensing level setting unit 112, this low speed failure sensing unit 110 outputs the low speed failure signal S110 having a high level. Also, the third power supply interrupting signal S11 is outputted from the latch circuit 117.

Referring now to FIG. 8 and FIG. 9A to FIG. 9C, operations of the protection apparatus for the brushless motor, according to this fourth embodiment mode, constructed in the above-described manner will be explained. Since the operations of the structural portions other than the low speed overload detecting unit 11, the reset circuit 13, and the OR gate circuit 12' are similar to those of the protection apparatus shown in FIG. 5, explanations thereof are omitted.

FIG. 8 is an explanatory diagram for explaining operations of the protection apparatus according to this fourth embodiment shown in FIG. 7. It should be understood that since operations at the respective operating points "a", "b", "c", "e", "p", and "q" shown in FIG. 8 are completely identical to those at the corresponding operating points previously indicated in FIG. 6A and FIG. 6B, detailed descriptions thereof are omitted.

In FIG. 8, when a strong wind (adverse wind) such as typhoon is blown onto the fan 15 and therefore the brushless motor 1 is forcibly driven, the operation starts from the operating point "a" and then reaches the operating point "e" via the operating points "b" and "c". When the operation reaches the operating point "e", while using a constant setting value outputted from the voltage limit level setting unit 6 as the output voltage instruction signal V3, since the drive circuit 3 drives the brushless motor 1 by the constant output voltage, if a further strong adverse wind is blown onto the fan 15, as previously explained, the drive current starts to be increased. However, in such a case that the adverse wind blowing onto the fan 15 is not so strong by which the reverse rotation limiter means 10 is operated to thereby interrupt the supply of power to the brushless motor 1, or in the case that the movable member of the brushless motor 1 is forcibly locked, there are certain possibilities that the brushless motor 1 is continuously driven by a relatively large drive current in a rotation speed region lower than the vicinity of the operating point "e". When such a condition is continued for long time, there is a risk that both the brushless motor 1 and the drive circuit 3 are brought into overheat conditions. To avoid such an overheat condition, according to this fourth embodiment mode, there is provided the low speed overload detecting unit 11.

As a preprocessing operation, the low speed overload detecting unit 11 is operated as follows. When the output signal N5 of the speed detecting unit 5 becomes lower than the output signal N112 of the low speed failure sensing level setting unit 112, both the low speed failure signal S110 with a high level outputted from the low speed failure sensing unit 110, and the second power supply interrupting signal S10 outputted from the reverse rotation limiter unit 10 are processed by the logic circuits (namely, inverting circuit 113 and OR gate circuit 114). Then, the output signal S114 whose level becomes a low level is outputted from the OR gate circuit 114, while the rotation speed of the brushless motor 1 becomes lower than such a rotation speed corresponding to the output signal N112 of the low speed failure sensing level setting unit 112, and also doe not reach a rotation speed corresponding to a reverse rotation limiter operating value N102 at which the reverse rotation limiter unit 10 is operated. In other words, when the brushless motor 1 is driven by a relatively large drive current in such a rotation speed region lower than the rotation speed corresponding to a signal N112 set in the vicinity of the operating point "e" indicated in FIG. 8, the output signal S114 becomes a low-level signal. Then, this output signal S114 is inputted to the clear terminal "clr" of the counter circuit 116.

Figure 19:
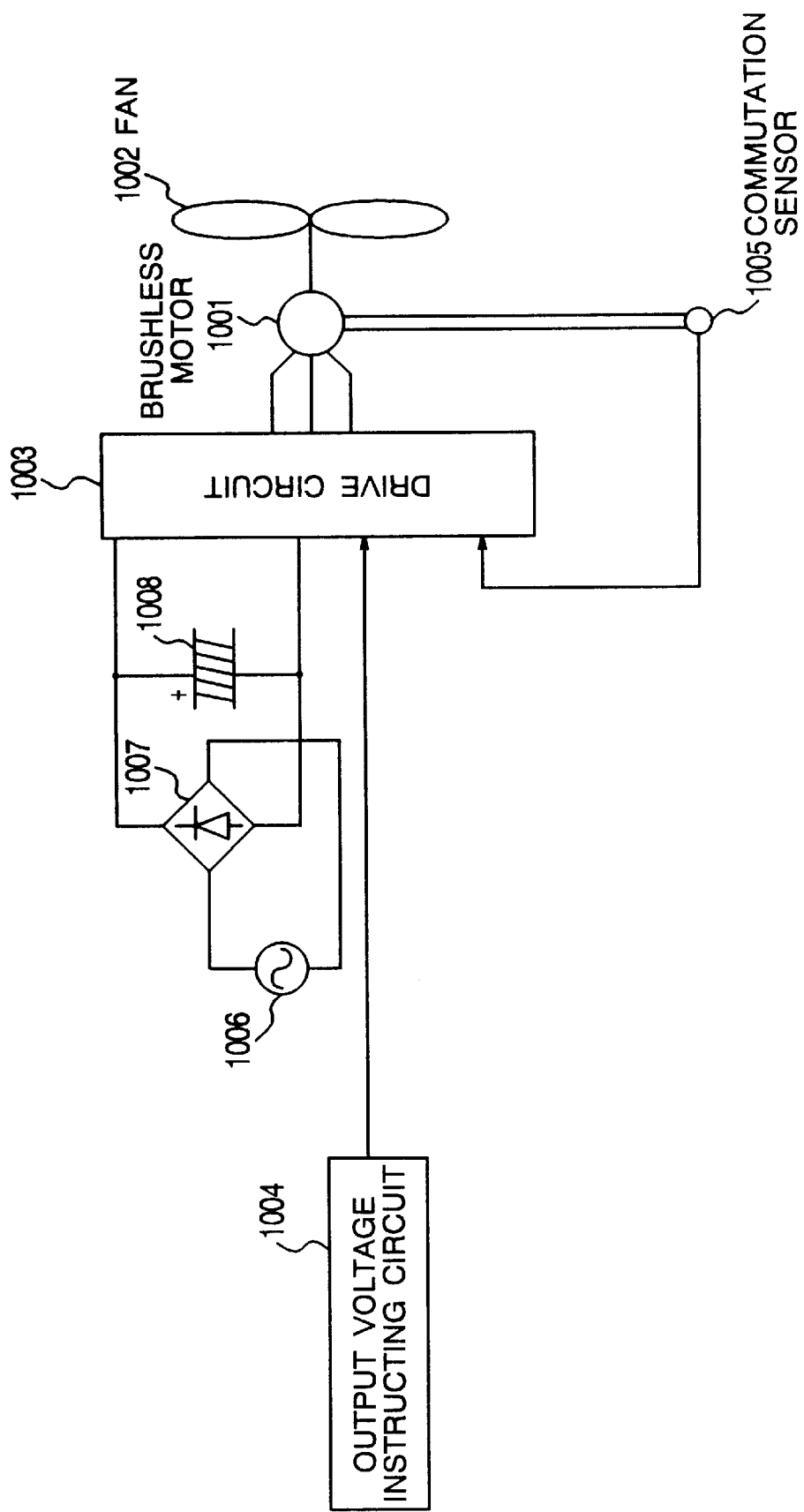
FIG. 19 is the circuit diagram for representing the drive apparatus of the conventional brushless motor.

FIG. 19 is an explanatory diagram for explaining post-processing operations of the low speed overload detecting unit 11. Now, a description will be made of the post-processing operations of the low speed overload detecting unit 11.

The counter circuit 116 is operated in such a manner that while the output signal S114 entered into the clear terminal clr thereof is at a low level, the counter circuit 116 counts the clock signal ck outputted from the oscillator 115, and when the output signal S114 inputted into this clear terminal clr becomes a high level, the counted content of the clock signal ck is cleared and then the counter circuit 116 again starts its counting operation from zero. As a result of counting of the clock signal ck by the counter circuit 116, when an overflow occurs, the output signal S116 with a high level is outputted from this counter circuit 116.

When the counter circuit 116 is brought into the overflow state and thus the output signal S116 becomes a high level, the latch circuit 117 is set and the output signal S117 is caused to become a high level. The output signal S117 with the high level signal derived from the latch circuit 117 is outputted as the third power supply interrupting signal S11 of the low speed overload detecting unit 11.

As previously explained, the low speed overload detecting unit 11 is operated as follows in combination with the pre-processing operation and the post-processing operation. That is, in such a case that such a condition that the brushless motor 1 is driven by a relatively high drive current is continued for a long time period, e.g., the counter circuit 116 is brought into the overflow condition, in the rotation speed region lower than the rotation speed corresponding to the signal N112 set in the vicinity of the operating point "e" shown in FIG. 8, the low speed overload detecting unit 11 outputs the third power supply interrupting signal S11 with a high level. If the signal level of the third power supply interrupting signal S11 once becomes a high level, then the high level is latched by the latch circuit 117, and maintains the high level until the reset signal is outputted from the reset circuit 13.

Now, the operations of the brushless motor protection apparatus with employment of the above-described low speed overload detecting unit 11, according to this fourth embodiment, will be explained.

When the brushless motor 1 is driven by receiving a strong wind in such a low rotation speed region lower than the rotation speed corresponding to the output signal N112 of the low speed failure sensing level setting unit 112 and the operating point reaches a point near the operating point "e" shown in FIG. 8, the counter circuit 116 commences its counting operation of the clock signal ck. Thereafter, when the counter circuit 116 is brought into the overflow state, the low speed overload detecting unit 11 outputs the third power supply interrupting signal S11 with a high level. This third power supply interrupting signal S11 with a high level causes the free run instruction signal Fre to be a high level, which is supplied via the OR gate circuit 12' to the drive circuit 3. This free run instruction signal Fre is latch-processed by the latch circuit 117, and this latching state is maintained until the reset circuit 13 outputs the reset signal when the power supply is again turned ON, or an instruction is issued from a controller of an appliance main body (for instance, outdoor unit of air conditioner) on which the brushless motor 1 is mounted.

As a result, the brushless motor 1 is electrically opened from the output from the drive circuit 3 to thereby interrupt the supply of power until the reset signal is outputted from the reset circuit 13, so that it is possible to prevent both the brushless motor 1 and the drive circuit 3 from being brought into the overheat conditions. In this case, the time when the counter circuit 116 is brought into the overflow condition may be freely set by selecting the stage number of the flip-flop circuits which constitute the counter circuit 116, and by selecting the output frequency of the oscillator 115. Preferably, this time is set to, for example, on the order of 10 seconds to 30 seconds, namely such time during which the brushless motor 1 is not frequently stopped when the brushless motor 1 is initiated, or the load is changed by the outer disturbance such as an instantaneous adverse wind.

As represented in FIG. 8, in accordance with this fourth embodiment mode, the low speed failure sensing level N112 is set to be within the rotation speed region lower than the operating point "e". Alternatively, this low speed failure sensing level N112 may be coincident with the operating point "e", may be set to be within the rotation speed region higher than the operating point "e", and furthermore, may be set to be within the reverse rotation speed region in such a range that this low speed failure sensing level N112 does not reach the reverse rotation limiter operating point N102. In other words, the output signal N112 of the low speed failure sensing level setting unit 112 may be set in such a way that the increase of the drive current of the brushless motor 1 can be suppressed to such an extent that the brushless motor 1, the drive circuit 3, and further the entire appliance (for instance, outdoor unit of air conditioner) containing these elements are not brought into the overheat conditions.

It should be understood that when the rotation speed of the brushless motor 1 has passed the region where the low speed overload detecting unit 11 is actuated, namely the low speed region lower than the vicinity of the operating point "e" while the counter circuit 116 is not brought into the overflow state, the counter circuit 116 is cleared in response to the output signal S114 inputted into the clear terminal clr at the time when the rotation speed of the brushless motor 1 has passed. As a result, there is no risk that the supply of power to the brushless motor 1 by the low speed overload detecting unit 11 is not interrupted. For example, as previously described in the third embodiment mode, when the rotation speed of the brushless motor 1 has quickly passed the above region and then reaches such a region where the reverse rotation limiter unit 10 is operated, the supply of power to the brushless motor 1 is interrupted by the reverse rotation limiter unit 10, and if blowing of the strong against wind is stopped, then the brushless motor 1 may be automatically recovered.

As previously described in detail, in accordance with this fourth embodiment mode, since the low speed overload detecting unit 11 is employed in the brushless motor protection apparatus, it is possible to realize such a brushless motor protection apparatus capable of avoiding the following difficulties in the case that the adverse wind flowing onto the fan 15 is not so strong that the reverse rotation limiter unit 10 is caused to be operated by which the supply of power to the brushless motor 1 is interrupted, or in such a case that the movable member of the brushless motor 1 is forcibly locked. As those difficulties, the brushless motor 1 is driven by a relatively large drive current for a long time period in the rotation speed range lower than in the range of the vicinity of the operating point e, and both the brushless motor 1 and the drive circuit 3 are brought into the overheat conditions.

It should also be noted that although the reverse rotation limiter unit 10 is employed in the brushless motor protection apparatus according to this fourth embodiment, as previously explained in the third embodiment, this reverse rotation limiter unit 10 may be omitted therefrom under such a condition that even if the brushless motor 1 is forcibly accelerated along the reverse direction by receiving the reverse wind, the increase of this drive current is slightly stopped.

(FIFTH EMBODIMENT MODE)

Figure 10:
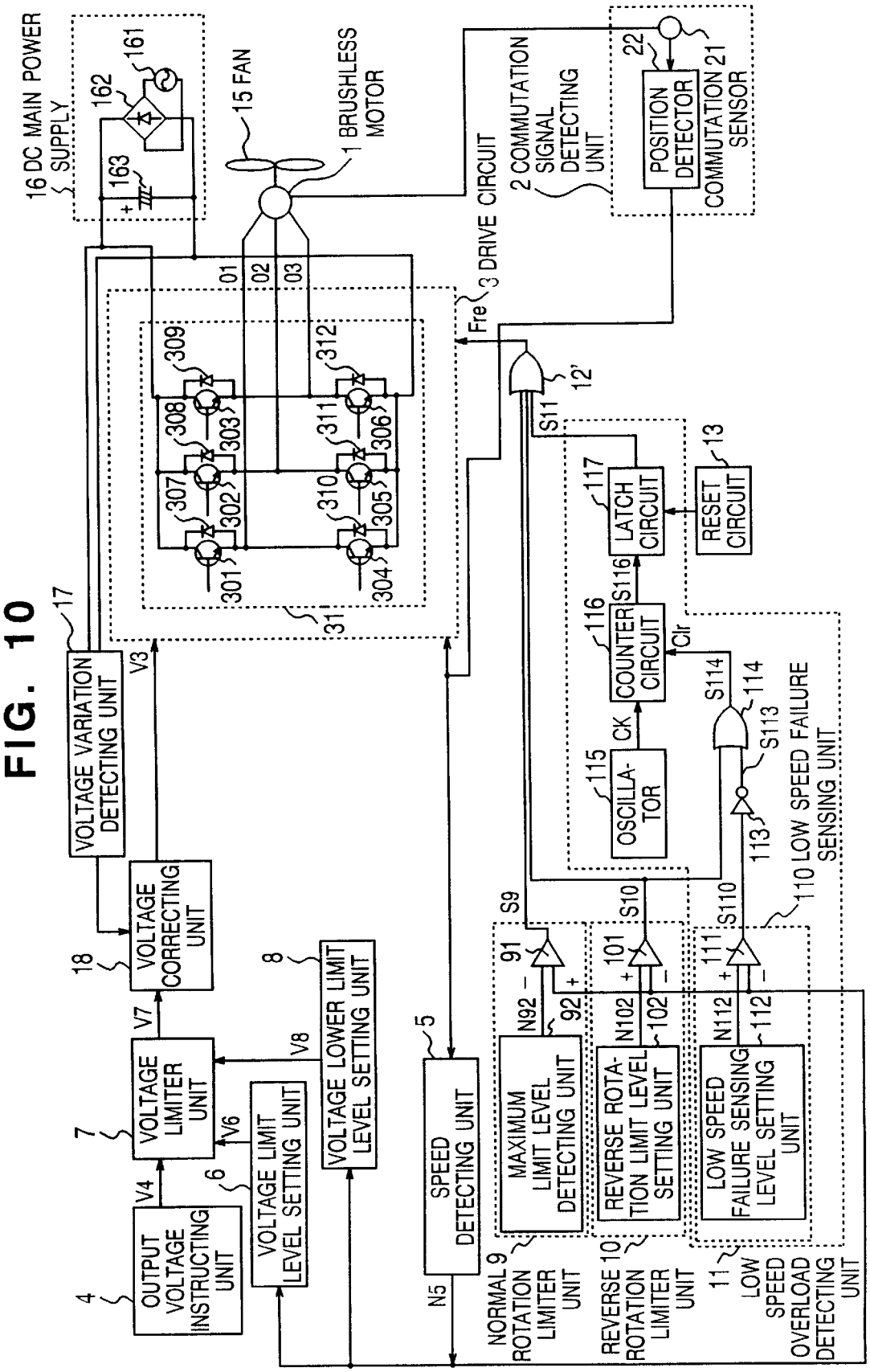
FIG. 10 is a circuit diagram for indicating a protection apparatus of a brushless motor according to a fifth embodiment mode of the present invention.

As represented in FIG. 10, a protection apparatus for a brushless motor, according to a fifth embodiment mode of the present invention, owns a different structure, as compared with the protection apparatus for the brushless motor according to the fourth embodiment mode of the present invention as shown in FIG. 7. That is, this protection apparatus includes a voltage lower limit level setting unit 8 provided between the voltage limiter unit 7 and the speed detecting unit 5, and a voltage limiter unit 7 produces an output signal V7 also in response to the output signal V8 of the voltage lower limit level setting unit 8. In this embodiment mode, the voltage lower limit level setting unit 8 calculates a setting value for lower limit values of the output voltages O1, O2, O3 from the drive circuit 3 in response to the output signal N5 of the speed detecting unit 5, and also outputs to the voltage limiter unit 7 the output signal V8 indicative of the calculated setting value. When the output signal V4 of the output voltage instructing unit 4 is lower than, or equal to the output signal V6 of the voltage limit level setting unit 6 and also higher than, or equal to the output signal V8 of the voltage lower limit level setting unit 8, this voltage limiter unit 7 outputs the output signal V4 as an output signal V7. When the output signal V4 is larger than the output signal V6, this voltage limiter unit 7 outputs the output signal V6 as the output signal V7. When the output signal V4 is smaller than the output signal V8, this voltage limiter unit 7 outputs the output signal V8 as the output signal V7.

In this case, the setting value of the voltage lower level setting unit 8 is set in response to the output signal N5 of the speed detecting unit 5 in such a manner that this setting value becomes smaller than the setting value of the voltage limit level setting unit 6. Also, the setting value of the voltage lower level setting unit 8 is set in response to the output signal N5 of the speed detecting unit 5 in such a manner that this setting value becomes a value larger than a value corresponding to an induced voltage internally produced from the brushless motor 1. Furthermore, in order to avoid an unstable characteristic in a low rotation speed in connection with lowering of speed detecting precision of the output signal N5 of the speed detecting unit 5, the setting value of the voltage limit level setting unit 8 is set to a constant value.

Referring now FIG. 11A and FIG. 11B, operations of the brushless motor protection apparatus with employment of the above-described arrangement, according to this fifth embodiment, will be explained.

Figure 11:
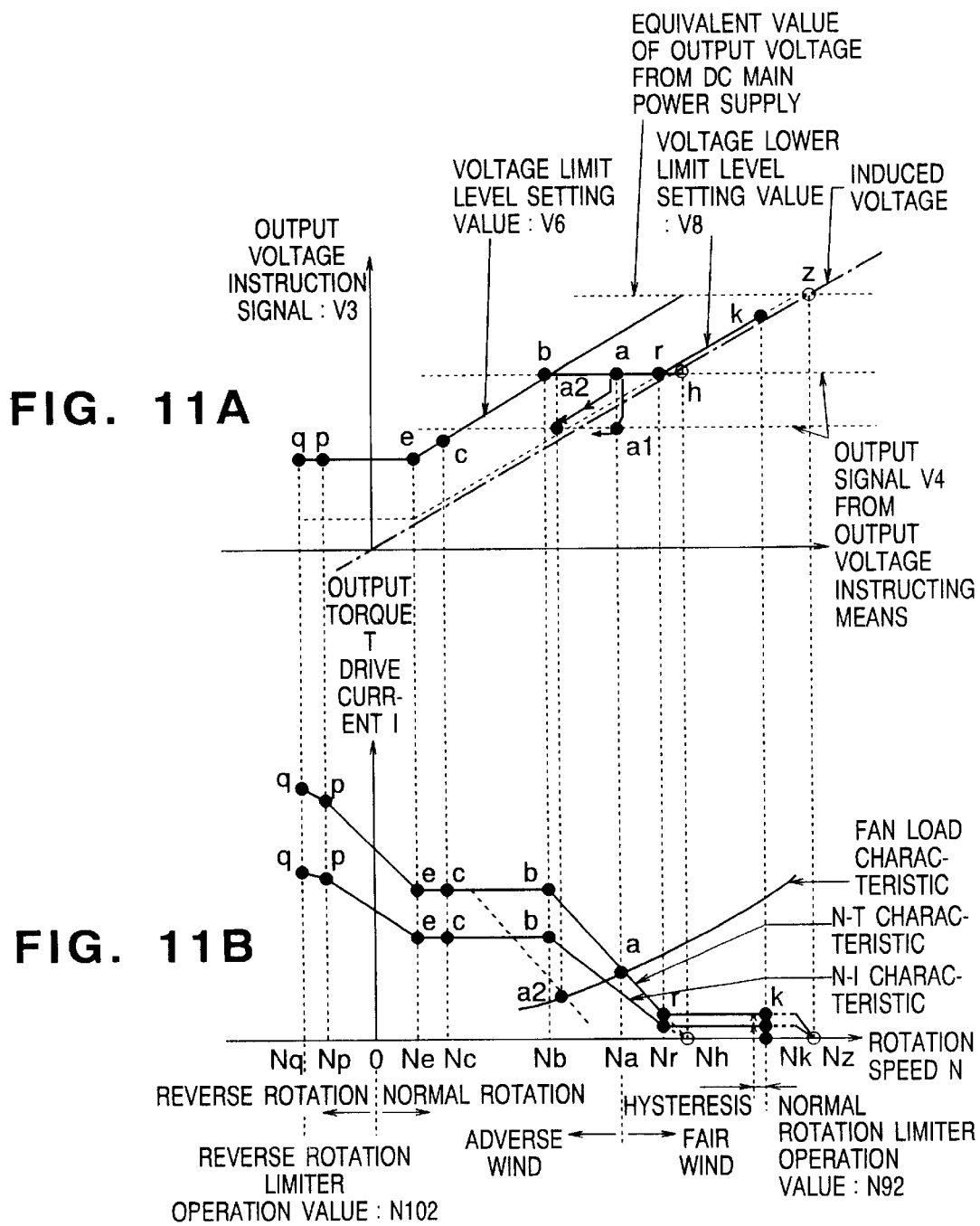
FIG. 11A and FIG. 11B are explanatory diagrams for explaining operations of the protection apparatus for the brushless motor denoted in FIG. 10.

It should be understood that since operating points "a", "b", "c", "e", "p", "q", "k" and "z" indicated in operation diagrams of FIG. 11A and FIG. 11B are completely the same as those of FIG. 2A, FIG. 2B, FIG. 6A, FIG. 6B, and FIG. 8 indicated by the same symbols, and also operations thereof, a detailed description thereof is omitted. It should also be noted that since the operations of the voltage correcting unit 18 have already been described in connection with the second embodiment, the descriptions thereof are omitted.

For the sake of simple explanation, the following description is made by such an assumption that the output voltage from the DC main power supply 16 is under stable, and the signal identical to the output signal V7 of the voltage limiter unit 7 is outputted from the voltage correcting unit 18.

In FIG. 11A and FIG. 11B, the following case is considered. That is, a strong fair wind is blown onto the fan 15 under condition of the operating point "a", and then the brushless motor 1 is forcibly accelerated by receiving external force along the same direction as the drive direction thereof.

Normally, under such a state of the operating point "a" where no external force is forcibly applied to the brushless motor 1, the output voltages O1, O2, O3 of the drive circuit 3, which are outputted in response to the output voltage instruction signal V3, become higher than the induced voltage internally produced from the brushless motor 1. Under this state, there is no problem.

However, when the brushless motor 1 is forcibly accelerated by receiving the strong fair wind, the induced voltage internally produced from the brushless motor 1 is increased. Thereafter, when this increased induced voltage exceeds the output voltages O1, O2, O3 of the drive circuit 3 outputted in response to the output voltage instruction signal V3, regenerative power is generated. The operating point "h" shown in FIG. 11A and FIG. 11B corresponds to an operating point such that when the output signal V4 of the output voltage instruction unit 4 is supplied as the output voltage instruction signal V3 to the drive circuit 3, the production of the regenerative power is commenced. When the brushless motor 1 is forcibly accelerated from this operating point "h", the regenerative power is produced.

In the case that the output signal V4 of the output voltage instructing unit 4 is lowered from the present value, the operating point is moved from the point "a" via a point "a1" to another point "a2". When the operating point becomes "a1", the induced voltage of the brushless motor 1 exceeds the output voltages O1, O2, O3 of the drive circuit 3, so that the generative power is produced in a similar manner to that of the above-described case. When the brushless motor 1 produces the regenerative power, the power is conversely supplied to the drive circuit 3 which originally should supply the power to the brushless motor 1. As a consequence, there is a problem that both the drive circuit 3 and the DC main power supply 16 are electrically destroyed due to either an overvoltage or an overcurrent.

Therefore, in order not to produce such a problem, the voltage lower limit level setting unit 8 is provided in accordance with this fifth embodiment mode.

In FIG. 11A and FIG. 11B, the operating point "a" is such a state that a strong fair wind does not yet blow, and the brushless motor 1 is stably driven at the rotation speed "Na" where the output torque of the brushless motor 1 is balanced with the fan load of the fan 15. Under this condition, when the strong fair wind is produced and therefore, the brushless motor 1 is forcibly accelerated, since the setting value of the voltage lower limit level setting unit 8 is set in response to the output signal N5 of the speed detecting unit 5, this output signal V8 is increased in connection with the acceleration of the brushless motor 1. Then, in the case that the brushless motor 1 is accelerated up to such an operating point "r" where the output signal V8 equal to the setting value of the voltage lower limit level setting unit 8 reaches the output signal V4 of the output voltage instructing unit 4, and thereafter this brushless motor 1 is further accelerated, the output signal V8 of the voltage lower limit level setting unit 8 is entered as the output voltage instruction signal V3 into the drive circuit 3 on the boundary of the operating point "r". As a consequence, the output voltages O1, O2, O3 of the drive circuit 3 can be increased in conjunction with the increase of the rotation speed of the brushless motor 1. Accordingly, the lower limit value of the output voltage instruction signal V3 is acquired by way of, for example, executing of an experience in order that the value of the induced voltage internally produced from the brushless motor 1 in response to the rotation speed thereof is grasped, and the output voltages O1, O2, O3 of the drive circuit 3 do not become below this induced voltage. Then, this acquired lower limit value is used as the setting value of the voltage lower limit level setting unit 8, so that the induced voltage produced from the brushless motor 1 does not exceed the output voltages O1, O2, O3 of the drive circuit 3. As a consequence, it is possible to prevent the above-explained regenerative power from being produced.

Considering such a case that the output signal V4 of the output voltage instructing unit 4 is further lowered, the output voltage V8 of the voltage lower limit level setting unit 8 is used as a lower limit value, and the output voltage instruction signal V3 is applied to the drive circuit 3 while this output voltage instruction signal V3 does not become below this value. As a consequence, when the output signal V4 is lowered, the brushless motor protection apparatus is moved from the operating point "a" to the operating point "a2" along the output signal V8 equal to the setting value of the voltage lower limit level setting unit 8. At this time, the induced voltage internally produced from the brushless motor 1 does not exceed the output voltages O1, O2, O3 of the drive circuit 3, but also the regenerative power cannot be generated.

As previously described in detail, in accordance with this fifth embodiment mode, since the voltage lower limit level setting unit 8 is employed, even when the brushless motor 1 is forcibly and externally driven by receiving the strong wind (fair wind) such as typhoon, and therefore this brushless motor 1 is excessively accelerated, the output voltages O1, O2, O3 are increased in connection with the rotation speed of the brushless motor 1 in such a manner that the induced voltage internally produced from the brushless motor 1 does not exceed these output voltages O1, O2, O3 of the drive circuit 3. As a result, it is possible to avoid that the brushless motor 1 produces the regenerative power. Even when the output signal V4 of the output voltage instructing unit 4 is lowered to be a lower value, the lower limit value of the output voltage instruction signal V3 is limited in such a way that the output voltages O1, O2, O3 do not become below the induced voltage. Accordingly, it is possible to realize such a brushless motor protection apparatus capable of preventing the regenerative power from being generated from the brushless motor 1, and also capable of avoiding the overvoltage which is caused by conversely supplying the power to the drive circuit 3 and the DC main power supply 16.

As previously described in the third embodiment with reference to FIG. 5 and FIG. 6A and FIG. 6B, since the normal rotation limit unit 9 is employed, it is possible to prevent the regenerative power from being produced from the brushless motor 1 by opening the electrical connection between the drive circuit 3 and the brushless motor 1, even in such a case that the brushless motor 1 is forcibly and externally driven up to the rotation speed Nk in the operating point "k".

In this fifth embodiment mode, even when this normal rotation limiter unit 9 is omitted, it is also possible to prevent the regenerative power by the brushless motor 1 from being produced. Alternatively, the normal rotation limiter unit 9 may be provided in order to realize a more safety brushless motor protection apparatus with respect to the regenerative power. In other words, the output voltage instruction signal V3 is used as the output signal V8 of the voltage lower limit level setting unit 8 until the brushless motor protection apparatus reaches the operating point "k". In connection with the increase of the rotation speed of the brushless motor 1, the output voltages O1, O2, O3 of the drive circuit 3 are increased in such a way that the brushless motor 1 does not produce the regenerative power. When the brushless motor protection apparatus reaches the operating point "k", the normal rotation limiter unit 9 is operated, so that the brushless motor 1 is electrically opened from the drive circuit 3. In this case, when the normal rotation limiter unit 9 is operated, since the supply of the drive current to the brushless motor 1 is interrupted, as previously explained in the third embodiment, no regenerative power is produced up to the operating point "3". Even when the brushless motor 1 is forcibly driven at a further high rotation speed than the operating point "z", there is no risk that both the drive circuit 3 and the brushless motor 1 are not electrically destroyed by the overcurrent caused by the regenerative power produced from the brushless motor 1. As a consequence, it is possible to achieve a more safety brushless motor protection apparatus. Similar to the third embodiment, this normal rotation limiter unit 9 may be provided with the hysteresis operation.

(SIXTH EMBODIMENT MODE)

Figure 12:
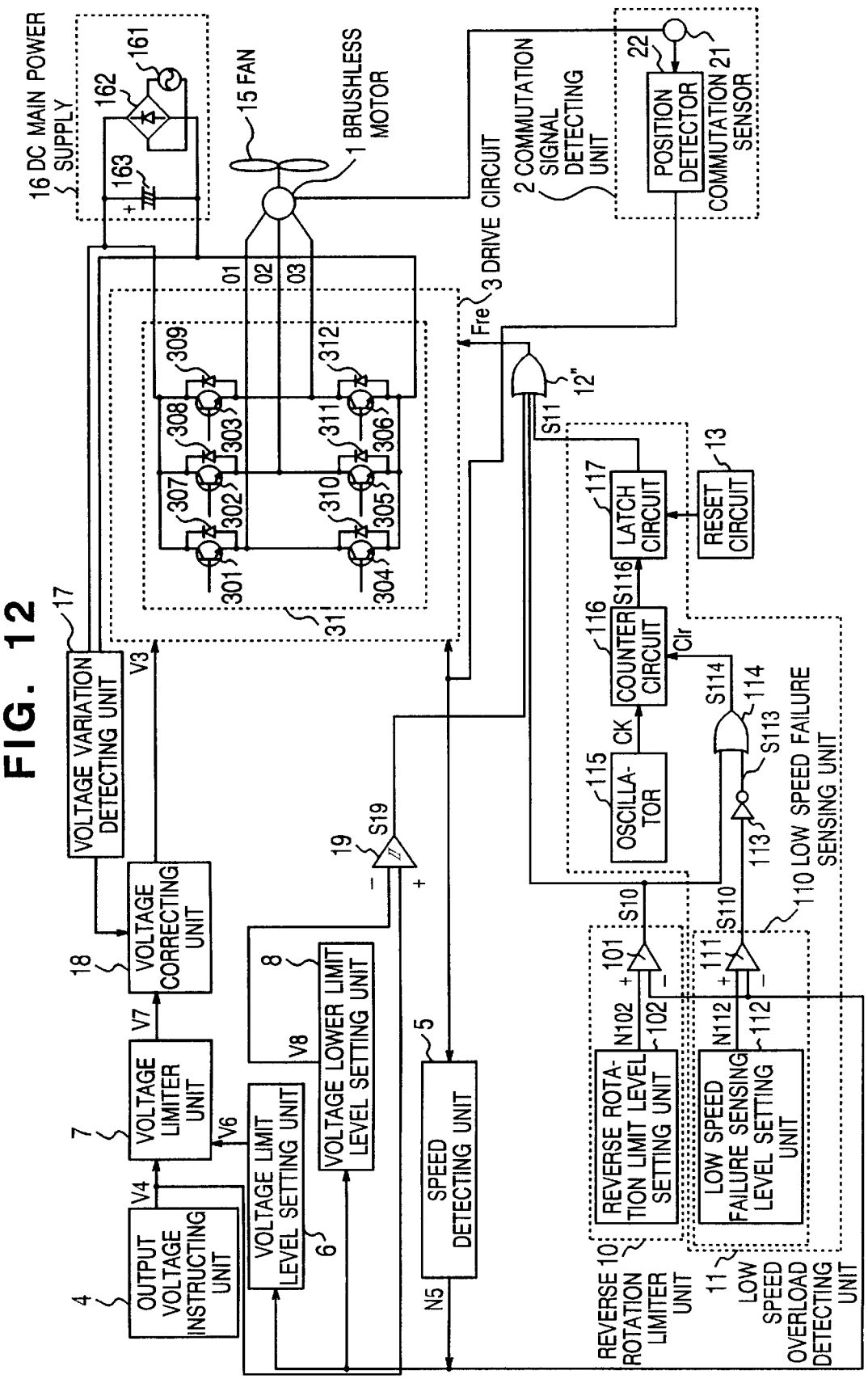
FIG. 12 is a circuit diagram for representing a protection apparatus of a brushless motor according to a sixth embodiment mode of the present invention.

As indicated in FIG. 12, a protection apparatus for a brushless motor, according to a sixth embodiment mode of the present invention, mainly owns the following different circuit arrangement from that of the protection apparatus for the brushless motor according to the fifth embodiment mode of the present invention. That is, this protection apparatus for the brushless motor according to the sixth embodiment includes a comparator 19 having a hysteresis characteristic, for comparing an output signal V8 of a voltage lower limit level setting unit 8 with an output signal V4 of an output voltage instructing unit 4. Also, when the output signal V8 of the voltage lower limit level setting unit 8 becomes larger than the output signal V4 of the output voltage instructing unit 4, a power supply interrupting signal S19 having a high level outputted from the comparator 19 having the hysteresis characteristic is outputted to an OR gate circuit 12", and no normal rotation limiter unit 9 is employed.

Figure 13:
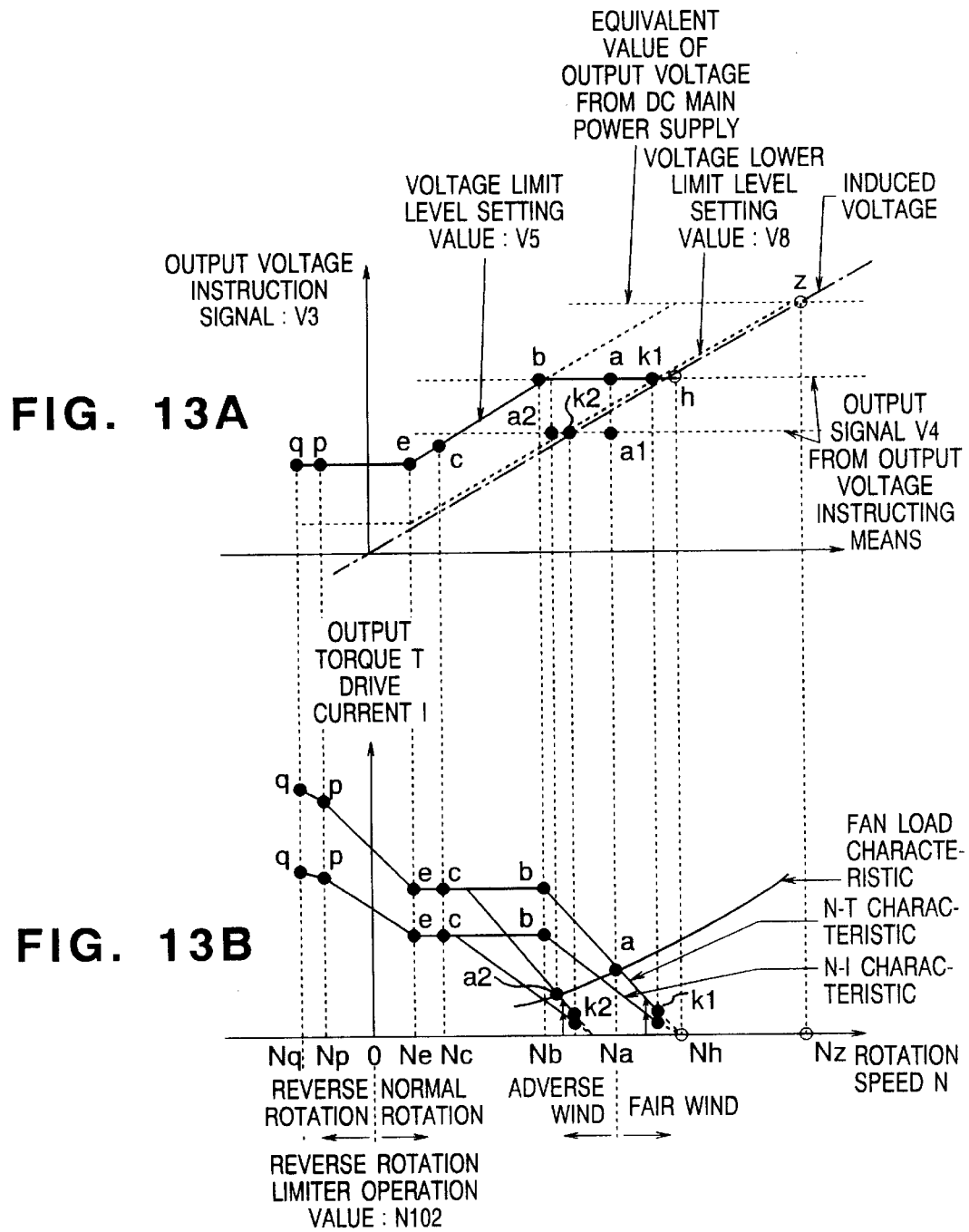
FIG. 13A and FIG. 13B are explanatory diagrams for explaining operations of the protection apparatus for the brushless motor shown in FIG. 12.

Referring now to FIG. 13A and FIG. 13B, operations of the brushless motor protection apparatus with employment of the above-explained arrangement according to this sixth embodiment mode will be described.

It should be understood that since operating points "a", "a1", "a2", "b", "c", "e", "p", "q", "h" and "z" indicated in operation diagrams of FIG. 13A and FIG. 13B are completely the same as those of FIG. 2A, FIG. 2B, FIG. 6A, FIG. 6B, FIG. 8, FIG. 11A and FIG. 11B indicated by the same symbols, and also operations thereof, a detailed description thereof is omitted.

For the sake of simple explanation, the following description is made by such an assumption that the output voltage from the DC main power supply 16 is under stable, and the signal identical to the output signal V7 of the voltage limiter unit 7 is outputted from the voltage correcting unit 18. It should also be noted that since the operations of the voltage correcting unit 18 have already been described in connection with the second embodiment, the description thereof is omitted.

In FIG. 13A and FIG. 13B, the following case is considered. That is, a strong fair wind is blown onto the fan 15 under condition of the operating point "a", and then the brushless motor 1 is forcibly accelerated by receiving external force along the same direction as the drive direction thereof. In this case, when the output signal V4 of the output voltage instructing unit 4 is supplied as the output voltage instruction signal V3 to the drive circuit 3, the operating point of the brushless motor protection apparatus is moved from the operating point "a" to the operating point "h" in connection with the acceleration of the brushless motor 1, and then reaches the operating point "h". At this time, the brushless motor 1 starts to generate the regenerative power, as previously explained in connection with the fifth embodiment with reference to FIG. 11A to FIG. 11B.

In the case that the output signal V4 of the output voltage instructing unit 4 is lowered from the present value, the operating point is moved from the point "a" via the point "a1" to another point "a2". When the operating point becomes "a1", the generative power is produced in a similar manner to that of the above-described fifth embodiment mode. When the brushless motor 1 produces the regenerative power, the power is conversely supplied to the drive circuit 3 which originally should supply the power to the brushless motor 1. As a consequence, there is a problem that both the drive circuit 3 and the DC main power supply 16 is electrically destroyed due to either an overvoltage or an overcurrent.

Therefore, in order not to produce such a problem, the comparator 19 having the hysteresis characteristic is provided in accordance with this sixth embodiment mode. This comparator 19 compares the output signal V8 of the voltage lower limit level setting unit 8 with the output signal v4 of the output voltage instructing unit 4. When the output signal V8 exceeds the output signal V4, a high-leveled signal outputted from the comparator 19 having the hysteresis characteristic is outputted as the power supply interrupting signal S19 to the OR gate circuit 12".

In FIG. 13A and FIG. 13B, the operating point "a" is such a state that a strong fair wind does not yet blow, and the brushless motor 1 is stably driven at the rotation speed "Na" where the output torque of the brushless motor 1 is balanced with the fan load of the fan 15. Under this condition, when the strong fair wind is produced and therefore, the brushless motor 1 is forcibly accelerated, since the setting value of the voltage lower limit level setting unit 8 is set in response to the output signal N5 of the speed detecting unit 5, this output signal V8 is increased in connection with the acceleration of the brushless motor 1. Then, in the case that the brushless motor 1 is accelerated up to such an operating point "k1" where the output signal V8 equal to the setting value of the voltage lower limit level setting unit 8 reaches the output signal V4 of the output voltage instructing unit 4, the comparator 19 having the hysteresis characteristic outputs the power supply interrupting signal S19 having the high level. This power supply interrupting signal S19 having the high level causes the free run instruction signal Fre of the drive circuit 3 to becomes a high level via the OR gate circuit 12". As a consequence, the brushless motor 1 is electrically opened from the output of the drive circuit 3, so that the supply of power is interrupted. When the supply of power to the brushless motor 1 is interrupted, the drive current becomes zero. Thus, there is no risk that the semiconductor components for constituting the drive circuit 3 are electrically destroyed due to the overcurrent.

On the other hand, as to the induced voltage internally produced from the brushless motor 1, this induced voltage is applied to the output voltages O1, O2, O3 of the drive circuit 3. When all of semiconductor switching elements such as power transistors 301 to 306 which constitute the drive circuit 3 are turned OFF so as to be electrically opened, it is possible to produce no regenerative power until an operating point "z" where a voltage peak value of this induced voltage exceeds the output voltage of the DC main power supply 16 to thereby conduct flywheel diode 307 to 312, because of effects of these flywheel diodes 307 to 312. Normally, these flywheel diodes 307 to 312 are parallel-connected to the semiconductor switching elements such as power transistors 301 to 306 along the direction opposite to the conducting direction of the semiconductor switching elements, and are connected along the direction opposite to the applying direction of the output voltage of the DC main power supply 16.

Also, when the output signal V4 of the output voltage instructing unit 4 is decreased lower than the present value, for instance, considering such a case that the operating point is moved from the point "a" to the point "a1", the output voltage instruction signal V3 becomes below the output signal V8 of the voltage lower limit level setting unit 8, so that the comparator 19 having the hysteresis characteristic is operated, and then the signal level of the power supply interrupt signal S19 becomes a high level. As a consequence, when the output signal V4 is decreased, the drive circuit 3 and the brushless motor 1 are brought into the electrically open conditions, so that it is possible to set that the brushless motor 1 does not produce the regenerative power.

After both the drive circuit 3 and the brushless motor 1 are brought into the open states, the rotation speed of the brushless motor 1 is gradually decreased, and then the output signal V8 equal to the setting value of the voltage lower limit level setting unit 8 is also lowered in response to the decreased rotation speed. Subsequently, when the rotation speed of the brushless motor 1 is decreased to the operating point "k2" where the output signal V8 becomes below the output signal V4 of the output voltage instructing unit 4 which has been decreased to the low value, and furthermore, the rotation speed of this brushless motor 1 is decreased by a value corresponding to the hysteresis width of the comparator 19 having the hysteresis characteristic, the drive circuit 3 is electrically connected to the brushless motor 1. At this time, since the output voltages O1, O2, O3 of the drive circuit 3 are outputted based upon the setting value of the voltage lower limit level setting unit 8 in such a manner that these output voltages O1, O2, O3 are not lower than the induced voltage internally produced in the brushless motor 1, the brushless motor 1 does not generate the regenerative power, but the drive current is supplied from the drive circuit to this brushless motor. Then, the operation of the brushless motor protection apparatus is finally maintained at the operating point "a2" where the output torque of the brushless motor 1 is balanced with the fan load.

As previously explained in detail, according to this sixth embodiment, the comparator 19 having the hysteresis characteristic for comparing the output signal V8 of the voltage lower limit level setting unit 8 with the output signal V4 of the output voltage instructing unit 4 is employed, and when the output signal V8 exceeds the output signal V4, the high-leveled signal which is outputted from the comparator 19 having the hysteresis is outputted to the OR gate circuit 12" as the power supply interrupting signal S19. Even when the brushless motor 1 is forcibly and externally driven by receiving the strong wind (fair wind) such as typhoon to thereby be excessively accelerated, the drive circuit 3 is electrically opened from the brushless motor 1 before the induced voltage internally generated from the brushless motor 1 exceeds the output voltages O1, O2, O3 of the drive circuit 3. As a consequence, it is possible to prevent the regenerative power from being produced from the brushless motor 1. Also, when the output signal V4 of the output voltage instructing unit 4 is decreased lower than the present value, if the output voltages O1, O2, O3 become below the induced voltage, then the drive circuit 3 is immediately and electrically opened from the brushless motor 1. Thus, it is possible to realize the brushless motor protection apparatus capable of preventing the regenerative power from being produced from the brushless motor 1, and also capable of avoiding the overcurrent and the overvoltage, which are caused by conversely supplying the power to the drive circuit 3 and the DC main power supply 16.

Although a detail description is not made in this specification, since the comparator 19 is made of the comparator with the hysteresis characteristic, similar effects and operations to those of the above-explained comparator 91 with the hysteresis characteristic employed in the normal rotation limiter unit 9 according to the third embodiment can be achieved.

(SEVENTH EMBODIMENT MODE)

Figure 14:
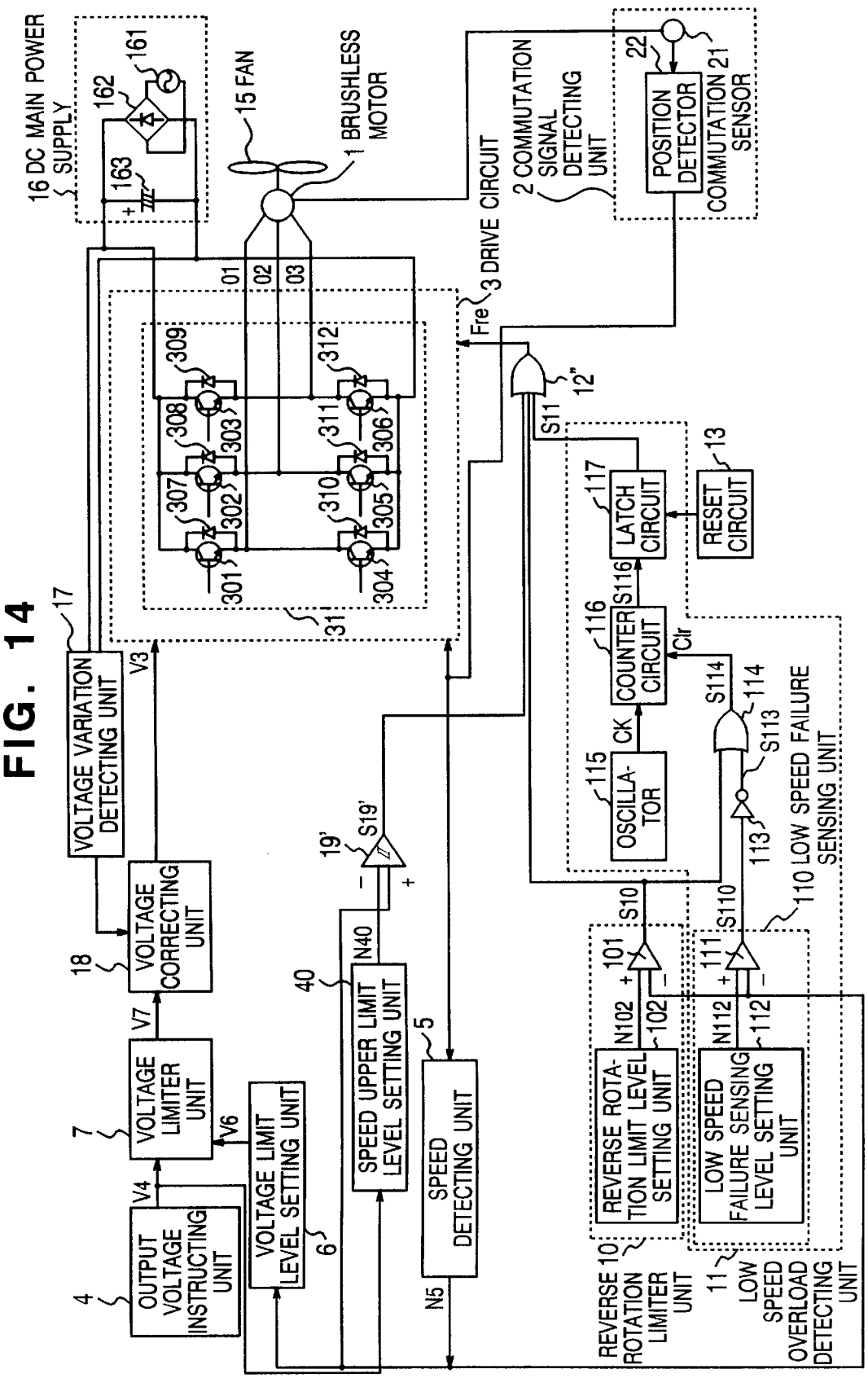
FIG. 14 is a circuit diagram for representing a protection apparatus of a brushless motor according to a seventh embodiment mode of the present invention.

As indicated in FIG. 14, a protection apparatus for a brushless motor, according to a seventh embodiment mode of the present invention, mainly owns the following different circuit arrangement from that of the protection apparatus for the brushless motor shown in FIG. 12 according to the sixth embodiment mode of the present invention. That is, this protection apparatus for the brushless motor according to the seventh embodiment includes a speed upper limit level setting unit 40 instead of the speed lower limit level setting unit 8, a comparator 19' with a hysteresis characteristic instead of the above-described comparator 9 with the hysteresis characteristic, and also an OR gate circuit 12''' instead of the above-explained OR gate circuit 12''. That is, this speed upper limit level setting unit 40 outputs as an output signal N40, a setting value used to limit an upper limit value of the rotation speeds of the brushless motor 1 in response to the output signal V4 of the output voltage instructing unit 4. Also, the comparator 19' with the hysteresis characteristic compares the output signal N4 of the speed upper limit level setting unit 40 with the output signal N5 of the speed detecting unit 5. The OR gate circuit 12''' is to receive a power supply interrupting signal S19' outputted from the comparator 19' having the hysteresis characteristic, the output signal S10 derived from the reverse rotation limiter unit 10, and the output signal S11 derived from the low speed overload detecting unit 11.

The setting value of the speed upper limit level setting unit 40 is set to such a value corresponding to a maximum rotation speed of the brushless motor 1 under which the induced voltage produced from the brushless motor 1 becomes lower than the output voltages O1, O2, O3 produced by the drive circuit 3 when the output signal V4 of the voltage instructing unit 4 is supplied as the output voltage instruction signal V3 to the drive circuit 3. Since such a speed upper limit level setting unit 40 is provided, similar effects and operations to those of the above-explained sixth embodiment mode can be achieved.

Figure 15:
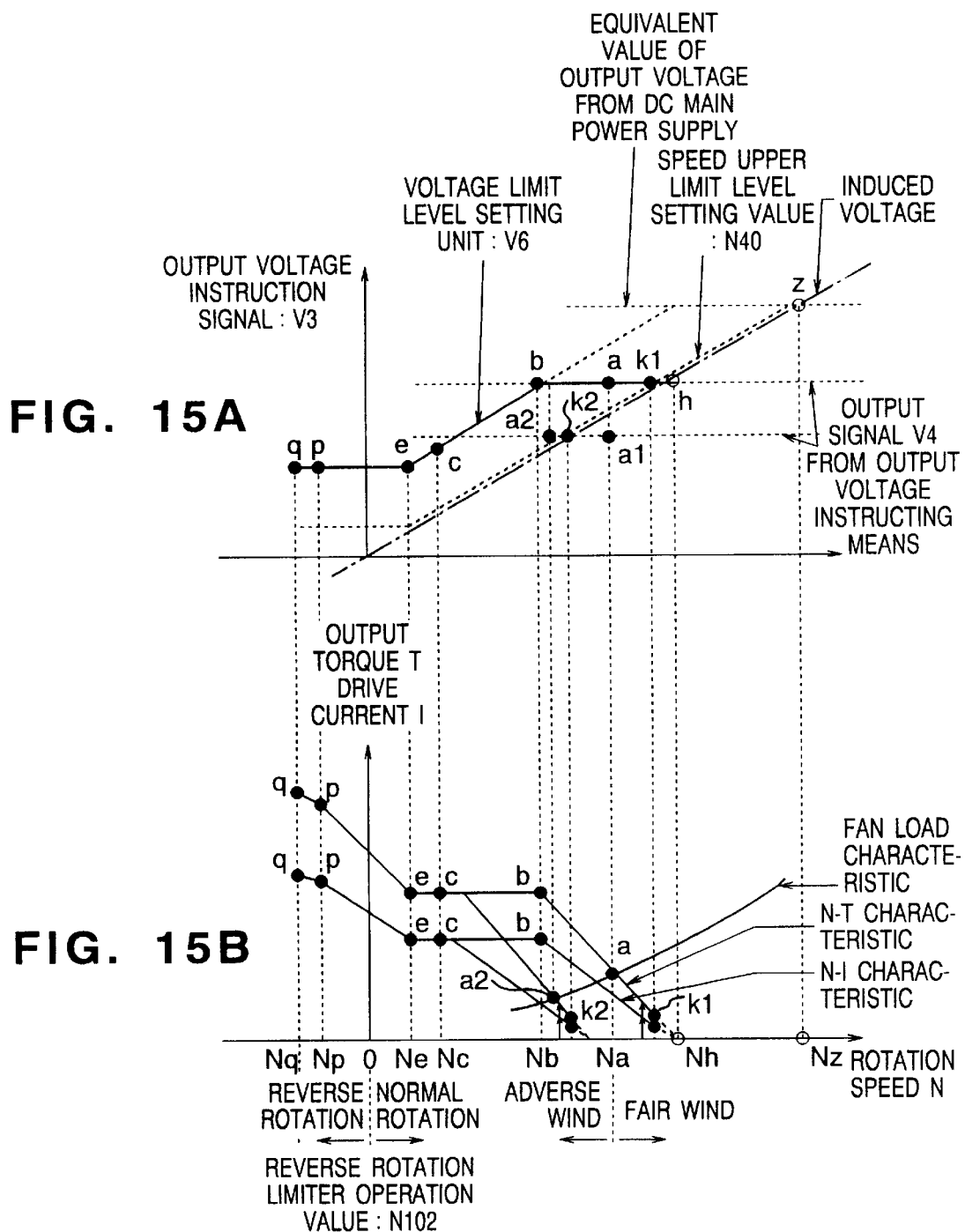
FIG. 15A and FIG. 15B are explanatory diagrams for explaining operations of the protection apparatus for the brushless motor shown in FIG. 14.

FIG. 15A and FIG. 15B represent operation diagrams of the brushless motor protection apparatus according to the seventh embodiment. These operation diagrams of FIG. 15A and FIG. 15B are similar to those of the brushless motor protection apparatus shown in FIG. 13A and FIG. 13B according to the sixth embodiment except that both the operating points "k1" and "k2" where the power supply interrupting signal S19 is produced are determined based on the setting value of the voltage lower limit level setting unit 8 in accordance with the sixth embodiment mode, whereas both the operating points "k1" and "k2" where the power supply interrupting signal S19' is produced are determined based upon the setting value of the speed upper limit level setting unit 40 in accordance with this seventh embodiment mode.

(EIGHTH EMBODIMENT MODE)

Figure 16:
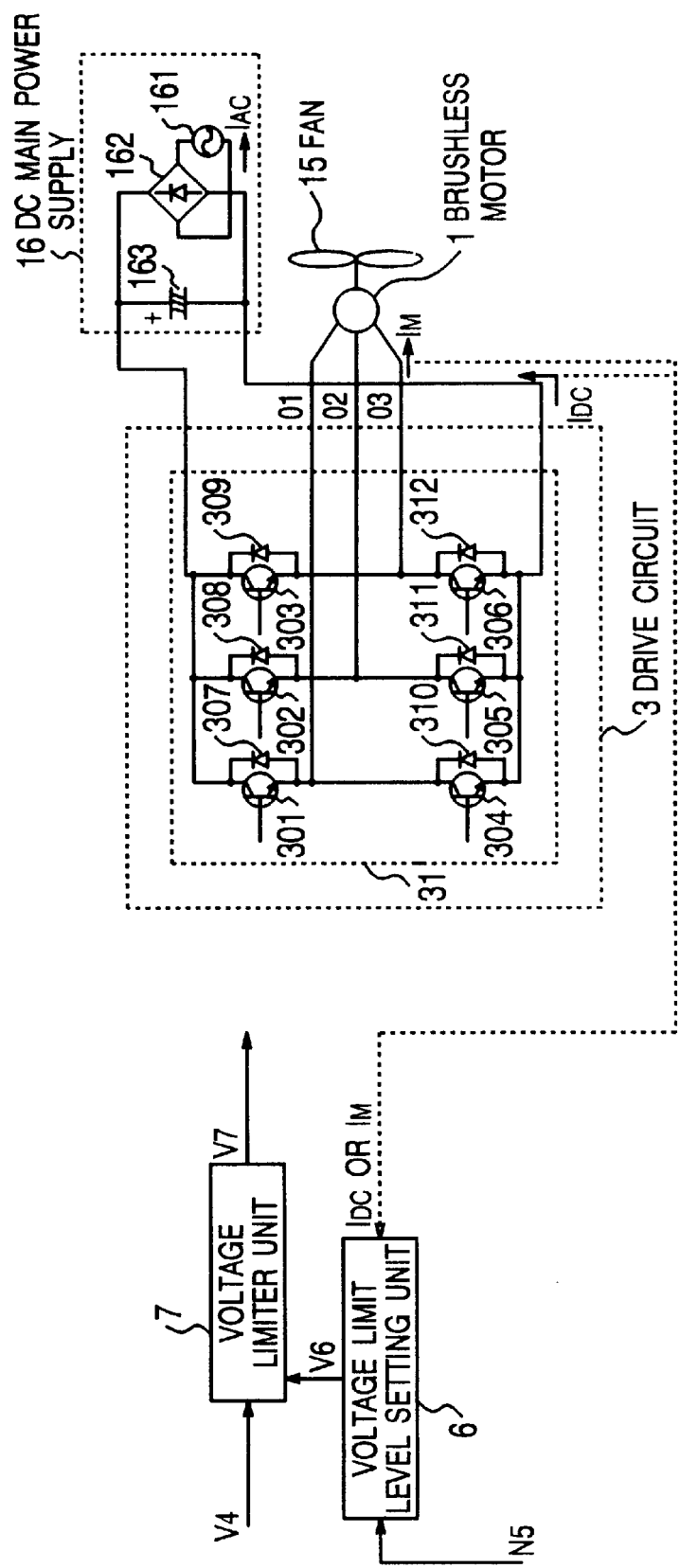
FIG. 16 is a schematic circuit diagram for indicating a protection apparatus for a brushless motor according to an eighth embodiment mode of the present invention.

As indicated in FIG. 16, a protection apparatus for a brushless motor, according to an eighth embodiment mode of the present invention, mainly owns the following operation from that of the protection apparatus for the brushless motor according to the first to fourth and seventh embodiment modes of the present invention as shown in FIG. 1, FIG. 4, FIG. 5, FIG. 7 and FIG. 14. That is, in this protection apparatus for the brushless motor according to the eighth embodiment, the setting value which is set by the voltage limit level setting unit 6 in response to the output signal N5 of the speed detecting unit 5 is corrected base upon either a value of an output current IDC of the DC main power supply 16 or a value of a drive current IM of the brushless motor 1.

Now, operations of the brushless motor protection apparatus will be explained. As previously explained in the first embodiment shown in FIG. 1, FIG. 2A and FIG. 2B, the voltage limit level setting unit 6 outputs the setting value for limiting the upper limit values of the output voltages O1, O2, O3 of the drive circuit 3 as the output signal V6 even when the brushless motor 1 is forcibly driven by receiving the strong wind (adverse wind) such as typhoon, and therefore, may suppress the increase of the drive current of the brushless motor 1.

The value when the drive current of the brushless motor 1 is suppressed is determined by a relationship among the value of the output signal V6, the value of the induced voltage internally produced from the brushless motor 1, and the value of the output voltage of the DC main power supply 16.

In general, there is a large fluctuation in a value of an induced voltage caused by a motor, and the value of the output voltage of the DC main power supply 16 is largely varied caused by the output current thereof. As a result, even when the voltage limit level setting unit 6 outputs the output signal V6 in high precision, there is a risk that either the fluctuation or the variation in the values when the drive current of the brushless motor 1 is suppressed would become large. For instance, in such a case that a motor with a low induced voltage is employed as this brushless motor 1, and otherwise, the output voltage of the DC main power supply 16 is varied to become high, the value when the drive current of the brushless motor 1 is suppressed becomes large. At this time, either the output current IDC of the DC main power supply 16 or the drive current IM of the brushless motor 1 is apparently increased. Since the setting value of the voltage limit level setting unit 6 is corrected in response to the value of the output current IDC, or the value of the drive current IM, and also the output signal V6 is outputted in such a manner that the output voltages O1, O2, O3 of the drive circuit 3 are decreased, it is possible to correct the fluctuation or the variation in the values when the drive current of the brushless motor 1 is suppressed.

As previously described in detail, in accordance with this eighth embodiment mode, the setting value of the voltage limit level setting unit 6 is corrected based upon either the output current IDC of the DC main power supply 16 or the drive current IM of the brushless motor 1. Even when the strong wind (adverse wind) such as typhoon would blow to forcibly and externally drive the brushless motor 1, increasing of the drive current can be suppressed. In particular, it is also possible to suppress the increase in the drive current in a stable condition with respect to the fluctuation in the induced voltage of the brushless motor 1 and the variation contained in the output voltage of the DC main power supply 16. As a consequence, the amounts of heat generations of the brushless motor 1 and the drive circuit 3 are low, and also the compact electronic components with the small power capacity can be used in the power semiconductor components for constituting the drive circuit 3. Further, it is possible to realize the protection apparatus for the brushless motor suitable to drive the outdoor fan of the air conditioner, while this outdoor fan is not stopped by the overcurrent trip every time the strong winds blow.

Alternatively, it should be understood that the setting value of the voltage limit level setting unit 6 may be corrected based on the output current IAC of the commercial power supply 161 for constituting the DC main power supply 16.

(NINTH EMBODIMENT MODE)

Figure 17:
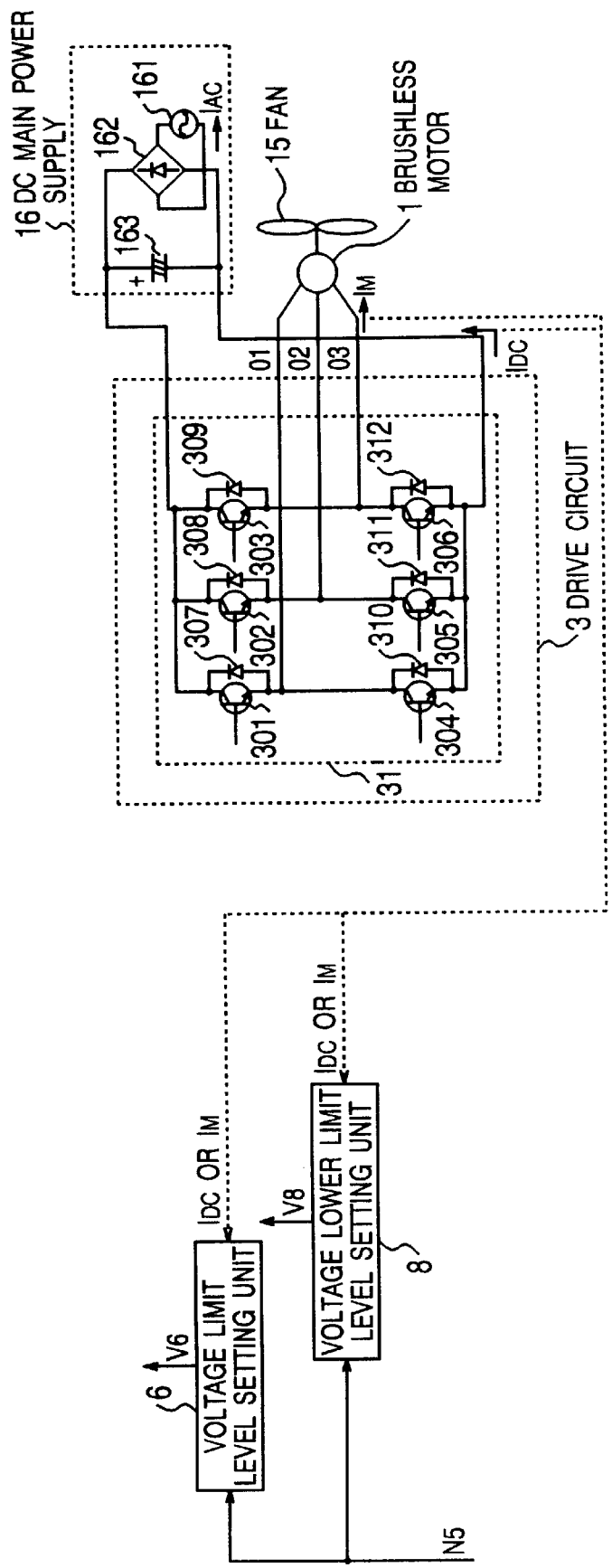
FIG. 17 is a schematic circuit diagram for indicating a protection apparatus for a brushless motor according to a ninth embodiment mode of the present invention.

As indicated in FIG. 17, a protection apparatus for a brushless motor, according to a ninth embodiment mode of the present invention, mainly owns the following different operation from that of the protection apparatus for the brushless motor according to the fifth and sixth embodiment modes of the present invention as shown in FIG. 10 and FIG. 12. That is, in this protection apparatus for the brushless motor according to the ninth embodiment, the setting values, which are set by the voltage limit level setting unit 6 and the voltage lower limit level setting unit 8 in response to the output signal N5 of the speed detecting unit 5, are corrected based upon either a value of an output current IDC of the DC main power supply 16 or a value of a drive current IM of the brushless motor 1.

Now, operations of the brushless motor protection apparatus will be explained. As previously explained in the eighth embodiment shown in FIG. 16, as to the correction of the setting value of the voltage limit level setting unit 6, this correction is similar to that of the eighth embodiment, and therefore explanations thereof are omitted.

As previously described in the fifth and sixth embodiment modes, the voltage lower limit level setting unit 8 outputs the lower limit setting values of the output voltages O1, O2, O3 of the drive circuit 3 as the output signal V8 in order that the voltage lower limit values are not below the induced voltage internally produced from the brushless motor 1. Then, in accordance with the fifth embodiment, the lower limit values of the output voltages O1, O2, O3 of the drive circuit 3 are limited based upon the output signal V8 of the voltage lower limit level setting unit 8 in coincident with the rotation speed of the brushless motor 1. Even when the brushless motor 1 is forcibly driven by receiving the strong wind (fair wind) such as typhoon to thereby be excessively accelerated, it is possible to prevent the regenerative force of the brushless motor 1 from being produced therefrom. Also, according to the sixth embodiment, the output voltages O1, O2, O3 of the drive circuit 3 reach the values defined based on the output signal V8 of the voltage lower limit level setting unit 8, and before the induced voltage of the brushless motor 1 exceeds the output voltages O1, O2, O3, the drive circuit 3 is electrically opened from the brushless motor 1. Thus, even when the brushless motor 1 is forcibly driven by receiving the strong wind (fair wind) such as typhoon to thereby be excessively accelerated, it is possible to prevent the regenerative force of the brushless motor 1 from being produced therefrom.

As previously explained, in order to prevent the regenerative power by the brushless motor 1 from being produced therefrom, it is required that the output voltages O1, O2, O3 of the drive circuit 3 are not below the induced voltage internally produced from the brushless motor 1. Therefore, the voltage lower limit level setting unit 8 sets the lower limit values of the output voltages O1, O2, O3 of the drive circuit 3.

In general, there is a large fluctuation in a value of an induced voltage caused by the brushless motor 1, and also, the output voltages O1, O2, O3 are greatly varied by the variation contained in the output voltage from the DC main power supply 16. As a result, even when the voltage lower limit level setting unit 8 outputs the output signal V8 in high precision as the setting value thereof, there is a risk that the generation of the regenerative power of the brushless motor 1 could not be prevented, since there are fluctuations contained in the induced voltage of the brushless motor 1 and the output voltages of the DC main power supply 16. In the worst case, the output voltages O1, O2, O3 of the drive circuit 3 become below the induced voltage of the brushless motor 1. For instance, if such a motor producing a high induced voltage is used as the brushless motor 1, or the output voltage of the DC main power supply 16 is varied to be low, even when the output signal V8 is outputted in high precision, then the output voltages O1, O2, O3 of the drive circuit 3 become below the induced voltage of the brushless motor 1. Accordingly, there is such a risk that the regenerative power is produced by the brushless motor 1.

In such a case, namely, when either the induced voltage of the brushless motor 1 is high or the output voltage of the DC main power supply 16 is low, the output current IDC of the DC main power supply 16, or the drive current IM of the brushless motor 1 becomes small. When this phenomenon is utilized, the magnitude of the induced voltage of the brushless motor 1, or the magnitude of the output voltage from the DC main power supply 16 can be grasped. As a consequence, the setting value of the voltage lower limit level setting unit 8 is corrected in response to the value of the output current IDC, or the value of the drive current IM in such a manner that, for instance, when either the output current IDC or the drive current IM becomes small, the output voltages O1, O2, O3 of the drive circuit 3 are increased. Then, when the output signal V8 is outputted, it is possible to prevent he regenerative power by the brushless motor 1 from being generated without receiving the adverse influences caused by the fluctuations contained in the induced voltage of the brushless motor 1, and the variations contained in the output voltage of the DC main power supply 16.

As previously described in detail, in accordance with this ninth embodiment mode, the setting value of the voltage lower limit level setting unit 8 is corrected based upon either the output current IDC of the DC main power supply 16 or the drive current IM of the brushless motor 1. Even when the strong wind (fair wind) such as typhoon would blow to forcibly drive and excessively accelerate the brushless motor 1, it is possible to prevent the regenerative power of the brushless motor 1 from being produced. In particular, it is also possible to realize such a brushless motor protection apparatus capable of surely preventing the above-described regenerative power from being produced with respect to the fluctuations contained in the induced voltage of the brushless motor 1, and the variations contained in the output voltage of the DC main power supply 16.

Alternatively, it should be understood that the setting value of the voltage lower limit level setting unit 8 may be corrected based on the output current IAC of the commercial power supply 161 for constituting the DC main power supply 16.

(TENTH EMBODIMENT MODE)

Figure 18:
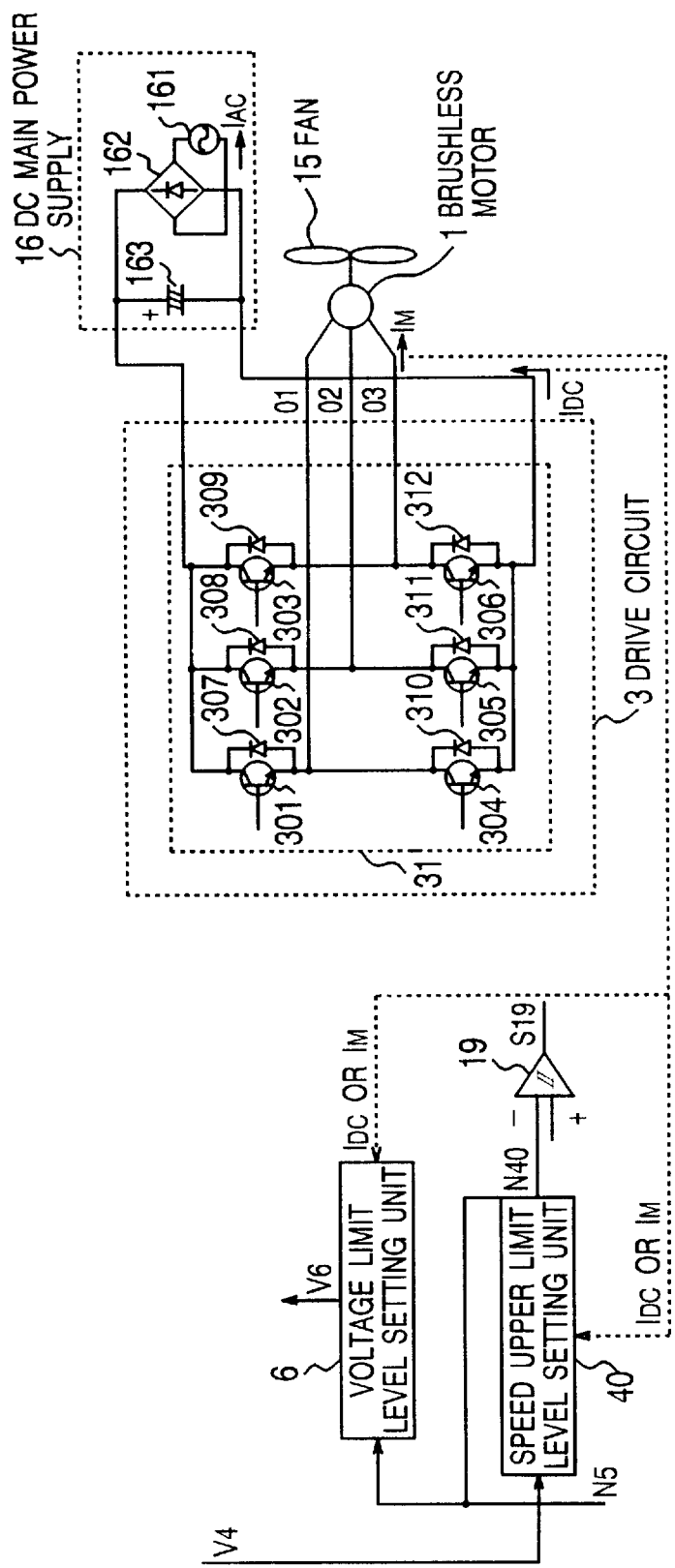
FIG. 18 is a schematic circuit diagram for indicating a protection apparatus for a brushless motor according to a tenth embodiment mode of the present invention.

As indicated in FIG. 18, a protection apparatus for a brushless motor, according to a tenth embodiment mode of the present invention, mainly owns the following different operation from that of the protection apparatus for the brushless motor according to the seventh embodiment mode of the present invention as shown in FIG. 14. That is, in this protection apparatus for the brushless motor according to the tenth embodiment, the setting value which is set by the voltage limit level setting unit 6 in response to the output signal N5 of the speed detecting unit 5, and also the setting value which is set by the speed upper limit level setting unit 40 in response to the output signal V4 of the output voltage instructing unit 4 are corrected base upon either a value of an output current IDC of the DC main power supply 16 or a value of a drive current IM of the brushless motor 1.

Now, operations of the brushless motor protection apparatus according to this tenth embodiment will be explained. The correction for the setting value of the voltage limit level setting unit 6 is similar to that executed in the eighth embodiment of FIG. 16, and therefore, descriptions thereof are omitted.

As previously described in connection with the seventh embodiment mode with reference to FIG. 14, FIG. 15A and FIG. 15B, the speed upper limit level setting unit 40 may achieve the similar effects and operations as those of the voltage lower limit level setting unit 8 in the sixth embodiment of FIG. 12. Therefore, even when the setting value of the speed upper limit level setting unit 40 is corrected, it is possible to achieve similar operations and effects to those obtained when the setting value of the voltage lower limit level setting unit 8 shown in the ninth embodiment mode is corrected.

Alternatively, it should be understood that the setting value of the speed upper limit level setting unit 40 may be corrected based on the output current IAC of the commercial power supply 161 for constituting the DC main power supply 16.

While the present invention has been described in detail, there are various advantages as follows.

As a first advantage, since both the voltage limit level setting unit and the voltage limiter unit are employed, even when the strong wind (adverse wind) such as typhoon would blow to forcibly and externally drive the brushless motor, increasing of the drive current can be suppressed. As a consequence, the amounts of heat generations of the brushless motor and the drive circuit are low, and also the compact electronic components with the small power capacity can be used in the power semiconductor components for constituting the drive circuit. Further, it is possible to realize the protection apparatus for the brushless motor suitable to drive the outdoor fan of the air conditioner, while this outdoor fan is not stopped by the overcurrent trip every time the strong winds blow.

As a second advantage, since the voltage variation detecting unit and the voltage correcting unit are employed in addition to the voltage limit level setting unit and the voltage limiter unit, even when the strong wind (adverse wind) such as typhoon would blow to forcibly and externally drive the brushless motor, and even when the output voltage of the DC main power supply is varied, it is possible to suppress the increase of the drive current without receiving the adverse influences by the DC main power supply, and in combination therewith, possible to prevent lowering of the fan drive capability and generation of the regenerative power of the brushless motor in response to the output voltage variation of the DC main power supply. As a consequence, the amounts of heat generations of the brushless motor and the drive circuit are low, and also the compact electronic components with the small power capacity can be used in the power semiconductor components for constituting the drive circuit. Further, it is possible to realize the safety protection apparatus for the brushless motor suitable to drive the outdoor fan of the air conditioner, while this outdoor fan is not stopped by the overcurrent trip, but also the regenerative power is not produced even when the strong wind and the DC main power supply voltage are varied.

As a third advantage, since the reverse rotation limiter unit is employed, in such a case that the brushless motor is forcibly and externally driven by receiving the strong wind (adverse wind) such as typhoon, and in particular, the set value of the voltage limit level setting unit becomes constant, and also the further strong adverse wind is blown even after the output voltage instruction signal is fixed to a constant value, the supply of power to the brushless motor is interrupted, so that the increase of this drive current can be prevented. Then, when blowing of the strong adverse wind stops, the supply of power to the brushless motor is restarted. As a consequence, the amounts of heat generations of the brushless motor and the drive circuit are low, and also the compact electronic components with the small power capacity can be used in the power semiconductor components for constituting the drive circuit. Further, it is possible to realize the protection apparatus for the brushless motor suitable to drive the outdoor fan of the air conditioner, while this outdoor fan is not stopped by the overcurrent trip, every time the strong wind is blown to the fan of the brushless motor.

It should be noted that even when the brushless motor is forcibly accelerated by the adverse wind (against wind) along the reverse direction, if increasing of this drive current is slightly stopped, then this brushless motor protection apparatus may be arranged without employing the reverse rotation limiter unit.

Also, since the normal rotation limiter unit is employed, it is possible to prevent the regenerative power from being produced from the brushless motor by interrupting the supply of power to the brushless motor before the induced voltage internally produced from the brushless motor exceeds the output voltages of the drive circuit even in such a case that the brushless motor is forcibly and externally driven by receiving the strong wind (fair wind) such as typhoon to thereby be excessively accelerated. Thus, it is also possible to realize the protection apparatus of the brushless motor capable of preventing the occurrence of overcurrent, or overvoltage which is caused by supplying the power to the drive circuit and the DC main power supply along the reverse direction.

Furthermore, since the comparator having the hysteresis characteristic is employed as the comparator for constituting the normal limiter unit, there is no possibility that starting and stopping operations of the brushless motor are not repeated even when the normal rotation limiter unit is operated to thereby interrupt the supply of power to the brushless motor and thus the rotation speed is lowered. Accordingly, the starting current is not interruptedly produced, and such a protection apparatus of the brushless motor can be realized which can avoid the heat generations of the brushless motor and the drive circuit and also the occurrence of noise, and further can stably interrupt the supply of power.

When blowing of such a strong wind stops, since the supply of power to the brushless motor is restarted, it is possible to realize the protection apparatus for the brushless motor suitable to drive the outdoor fan of the air conditioner without such a problem that the brushless motor is tripped to stop every time the strong wind is blown to this fan.

As a fourth advantage, since the low speed overload detecting unit is employed in the brushless motor protection apparatus, it is possible to realize such a brushless motor protection apparatus capable of avoiding the following difficulties in the case that the adverse wind flowing onto the fan is not so strong that the reverse rotation limiter unit is caused to be operated by which the supply of power to the brushless motor is interrupted, or in such a case that the movable member of the brushless motor is forcibly locked. As those difficulties, the brushless motor is driven by a large drive current for a long time period in the rotation speed range, and both the brushless motor and the drive circuit are brought into the overheat conditions.

It should also be noted that as previously described, if the reverse rotation limiter unit can be eliminated, then this reverse rotation limiter unit may be excluded from the above-described brushless motor protection apparatus. As a consequence, no adverse influence is given to the above-described effects.

As a fifth advantage, since the voltage lower limit level setting unit is employed, even when the brushless motor is forcibly and externally driven by receiving the strong wind (fair wind) such as typhoon, and therefore this brushless motor is excessively accelerated, the output voltages are increased in connection with the rotation speed of the brushless motor in such a manner that the induced voltage internally produced from the brushless motor does not exceed these output voltages of the drive circuit. As a result, it is possible to avoid that the brushless motor produces the regenerative power. Even when the output signal of the output voltage instructing unit is lowered to be a lower value, the lower limit value of the output voltage instruction signal is limited in such a way that the output voltages do not become below the induced voltage. Accordingly, it is possible to realize such a brushless motor protection apparatus capable of preventing the regenerative power from being generated from the brushless motor, and also capable of avoiding the overvoltage or the overcurrent which is caused by conversely supplying the power to the drive circuit and the DC main power supply.

As a sixth advantage, the comparator having the hysteresis characteristic for comparing the output signal of the voltage lower limit level setting unit with the output signal of the output voltage instructing unit is employed, and the electric connection between the drive circuit and the brushless motor is opened in response to the output signal derived from the comparator having the hysteresis characteristic. Accordingly, when the brushless motor is forcibly and externally driven by receiving the strong wind (fair wind) such as typhoon to thereby be excessively accelerated, the drive circuit is electrically opened from the brushless motor before the induced voltage internally generated from the brushless motor exceeds the output voltages of the drive circuit. As a consequence, it is possible to prevent the regenerative force from being produced from the brushless motor. Also, when the output signal of the output voltage instructing unit is decreased lower than the present value, if the output voltages become below the induced voltage, then the drive circuit is immediately and electrically opened from the brushless motor. Thus, it is possible to realize the brushless motor protection apparatus capable of preventing the regenerative power from being produced from the brushless motor, and also capable of avoiding the overcurrent and the overvoltage, which are caused by conversely supplying the power to the drive circuit and the DC main power supply.

As a seventh advantage, since the speed upper limit level setting unit is employed, even when the brushless motor is forcibly and externally driven by receiving the strong wind (fair wind) such as typhoon to thereby be excessively accelerated, the drive circuit is electrically opened from the brushless motor before the induced voltage internally generated from the brushless motor are increased in connection with this acceleration exceeds the output voltage of the drive circuit. As a consequence, it is possible to prevent the regenerative power from being produced from the brushless motor. Also, when the output signal of the output voltage instructing unit is decreased lower than the present value, if the output voltage of the drive circuit becomes below the induced voltage of the brushless motor, then the drive circuit is immediately and electrically opened from the brushless motor. Thus, it is possible to realize the brushless motor protection apparatus capable of preventing the regenerative power from being produced from the brushless motor, and also capable of avoiding the overcurrent and the overvoltage, which are caused by conversely supplying the power to the drive circuit and the DC main power supply.

As an eighth advantage, the setting value of the voltage limit level setting unit is corrected based upon either the output current of the DC main power supply or the drive current of the brushless motor. Even when the strong wind (adverse wind) such as typhoon would blow to forcibly and externally drive the brushless motor, increasing of the drive current can be suppressed. In particular, it is also possible to suppress the increase in the drive current in a stable condition with respect to the fluctuation in the induced voltage of the brushless motor and the variation contained in the output voltage of the DC main power supply. As a consequence, the amounts of heat generations of the brushless motor and the drive circuit are low, and also the compact electronic components with the small power capacity can be used in the power semiconductor components for constituting the drive circuit. Further, it is possible to realize the protection apparatus for the brushless motor suitable to drive the outdoor fan of the air conditioner, while this outdoor fan is not stopped by the overcurrent trip every time the strong winds blow.

As a ninth advantage, the setting value of the voltage lower limit level setting unit is corrected based upon either the output current of the main power supply or the drive current of the brushless motor. Even when the strong wind (fair wind) such as typhoon would blow to forcibly drive and excessively accelerate the brushless motor, it is possible to prevent the regenerative power of the brushless motor from being produced. In particular, it is also possible to realize such a brushless motor protection apparatus capable of surely preventing the above-described regenerative power from being produced with respect to the fluctuations contained in the induced voltage of the brushless motor, and the variations contained in the output voltage of the DC main power supply.

As a tenth advantage, the setting value of the speed upper limit level setting unit is corrected by either the output current of the DC main power supply or the drive current of the brushless motor. Even when the strong wind (fair wind) such as typhoon would blow to forcibly drive and excessively accelerate the brushless motor, it is possible to prevent the regenerative power of the brushless motor from being produced. In particular, it is also possible to realize such a brushless motor protection apparatus capable of surely preventing the above-described regenerative power from being produced with respect to the fluctuations contained in the induced voltage of the brushless motor, and the variations contained in the output voltage of the DC main power supply.

It should also be noted that although the output of the drive circuit and the brushless motor are the 3-phase mode in the respective embodiments of the present invention, the present invention is not limited thereto, but may be applied to, for instance, a single phase mode and a 2-phase mode.

Furthermore, there are plural hardware circuits as the respective structural elements of the various embodiment modes. Alternatively, these structural elements may be realized in the form of a software having the same functions.

What is claimed is:

1. A protection apparatus of a brushless motor comprising:
   a brushless motor;
   commutation signal detecting means for detecting a position of a movable member of said brushless motor;
   speed detecting means for detecting a rotation speed of the movable member of said brushless motor, involving a rotation direction thereof, in response to the detection signal outputted from said commutation signal detecting means;
   a drive circuit for producing a commutation signal used to drive the movable member of said brushless motor in response to the detection signal outputted from said commutation signal detecting means and for driving said brushless motor based upon said commutation signal;
   output voltage instructing means for supplying to said drive circuit, an output voltage instruction signal for instructing an output voltage of said drive circuit, which constitutes a drive voltage when said brushless motor is driven;
   voltage limit level setting means for setting an upper limit value of the output voltage of said drive circuit; and
   voltage limiter means for limiting the output signal of said output voltage instructing means based on the setting value of said voltage limit level setting means to thereby limit an upper limit value of the output voltage of said drive circuit; wherein:
   the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value.

2. A protection apparatus of a brushless motor as claimed in claim 1, wherein:
   the setting value of said voltage limit level setting means is corrected in such a manner that a fluctuation and a variation contained in the induced voltage internally produced from said brushless motor are grasped based upon the drive current of the brushless motor in order to compensate for the fluctuation and the variation contained in the induced voltage of said brushless motor.

3. A protection apparatus of a brushless motor comprising:
   a DC (direct current) main power supply;
   a brushless motor;
   commutation signal detecting means for detecting a position of a movable member of said brushless motor;
   speed detecting means for detecting a rotation speed of the movable member of said brushless motor, involving a rotation direction thereof, in response to the detection signal outputted from said commutation signal detecting means;
   a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;
   output voltage instructing means for supplying said output voltage instruction signal to said drive circuit;
   voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

4. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit; and voltage limiter means for limiting the output signal of said output voltage instructing means based on the setting value of said voltage limit level setting means to thereby limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level; and reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and also when said first power supply interrupting signal outputted from said normal rotation limiter means is produced, or said second power supply interrupting signal outputted from said reverse rotation limiter means is produced, said drive circuit is electrically opened from said brushless motor.

5. A protection apparatus for a brushless motor as claimed in claim 4 wherein:

said normal rotation limiter means includes hysteresis means operable in such a manner that the first power supply interrupting signal is outputted when the rotation speed of the brushless motor reaches the preset maximum limit level; outputting of said first power supply interrupting signal is maintained during a time period such that after said first power supply interrupting signal is outputted, the rotation speed of said brushless motor reaches a power supply interrupting signal release level equal to a rotation speed slightly lower than said maximum limit level; outputting of said first power supply interrupting signal is released when the rotation speed of said brushless motor reaches said power supply interrupting signal release level; and thereafter said first power supply interrupting signal is not outputted until the rotation speed of said brushless motor reaches said maximum limit level.

6. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level; in which when said first power supply interrupting signal outputted from said normal rotation limiter means or said second power supply interrupting signal outputted from said reverse rotation limiter means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

7. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage limiter means for limiting the output signal of said output voltage instructing means based on the setting value of said voltage limit level setting means to thereby limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and also when said first power supply interrupting signal outputted from said normal rotation limiter means, said second power supply interrupting signal outputted from said reverse rotation limiter means, or said third power supply interrupting signal outputted from said low speed overload detecting means is produced, said drive circuit is electrically opened from said brushless motor.

8. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level;

reverse rotation limiter means for detecting as to whether or not a reverse rotation speed of said brushless motor reaches a preset reverse rotation limit level based upon the detecting signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period;

voltage variation detecting means for detecting a variation contained in the output voltage of said DC main power supply in a direct manner, or based upon any one of an output current of said DC main power supply and a drive current of said brushless motor, in which when said first power supply interrupting signal outputted from said normal rotation limiter means, said second power supply interrupting signal outputted from said reverse rotation limiter means, or the third power supply interrupting signal outputted from said low speed overload detecting means is produced, said drive circuit is electrically opened from said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

9. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit value of the output voltage of said drive circuit;

voltage limiter means for limiting the output signal of said output voltage instructing means based on the setting value of said voltage limit level setting means to thereby limit an upper limit value of the output voltage of said drive circuit, and also for limiting the output signal of said output voltage instructing means based upon the setting value of said voltage lower limit level setting means to thereby limit the lower limit value of the output voltage of said drive circuit; and reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level; wherein, when said second power supply interrupting signal outputted from said reverse rotation limiter means is produced, the connection between said drive circuit and said brushless motor is electrically opened, and also the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value and further the setting value of said voltage lower limit level setting means is set in response to the output signal of said speed detecting means in such a manner that said setting value is such a value lower than the setting value of said voltage limit level setting means, and also such a value higher than a value corresponding to an induced voltage internally produced from said brushless motor.

10. A protection apparatus of a brushless motor as claimed in claim 9, wherein:

either one or both the setting value of said voltage limit level setting means and said setting value of said voltage lower limit level setting means is corrected in such a manner that a fluctuation and a variation contained in the induced voltage internally produced from said brushless motor are grasped based upon the drive current of the brushless motor in order to compensate for the fluctuation and the variation contained in the induced voltage of said brushless motor.

11. A protection apparatus of a brushless motor comprising:

a DC (direct current) main power supply;

a brushless motor;

commutation signal detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detectiong means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage linit level setting means for setting an upper limit value of the output voltage of said drive circuit, the setting value of said voltage limit level setting means being set inaccordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset value;

voltage lower limit level setting means for setting a lower limit value of the output voltage of said drive circuit, the setting value of said voltage lower limit level setting means being set in response to the output signal of said speed detecting means in such a manner that said setting value fo this voltage lower limit level setting means becomes a value lower than the setting value of said voltage limit level setting means and also a value higher than a value corresponding to the induced voltage internally produced from said brushless motor;

voltage limiter means for limiting the output signal of said output voltage instucting means based on the setting value of said voltage limit level setting means and the setting value of said voltage lower limit level setting means to thereby supply said output voltage instruction signal to said drive circuit, and for limiting the upper limit value and the lower limit value of the output voltage of said drive circuit;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limiter means is produced, the connection between said drive circuit and said brushless motor is electrically opened;

voltage variation detecting means for detecting a variation contained in the output voltage of said DC main power supply in a direct manner, or based upon anyd one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

12. A protection apparatus of a brushless motor as claimed in claim 11 wherein:

either one or both the setting value of said voltage limit level setting means and said setting value of said voltage lower limit level setting means is corrected in such a manner that both a fluctuation and a variation contained in the induced voltage internally produced from said brushless motor, or a variation contained in the output voltage of said DC main power supply is grasped based upon either the output current of said DC main power supply, or the drive current of said brushless motor in order to compensate for the fluctuation and the variation contained in the induced voltage of said brushless motor, or the variation contained in the output voltage of said DC main power supply.

13. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit value of the output voltage of said drive circuit;

voltage limiter means for limiting the output signal of said output voltage instructing means based on the setting value of said voltage limit level setting means to thereby limit an upper limit value of the output voltage of said drive circuit, and also for limiting the output signal of said output voltage instructing signal based on the setting value of said voltage lower limit level setting means to thereby limit the lower limit value of the output voltage of said drive circuit;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

the setting value of said voltage lower limit level setting means is set in response to the output signal of said speed detecting means in such a manner that said setting value of this voltage lower limit level setting means becomes a value lower than the setting value of said voltage limit level setting means, and also a value higher than a value corresponding to the induced voltage internally produced from the brushless motor; and also;

when said second power supply interrupting signal outputted from said reverse rotation limiter means, or said third power supply interrupting signal outputted from said reverse rotation limiter means is produced, said drive circuit is electrically opened from said brushless motor.

14. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage lower limit level setting means for setting a lower limit value of the output voltage of said drive circuit, in which the setting value of said voltage lower limit level setting means is set in response to the output signal of said speed detecting means in such a manner that said setting value of this voltage lower limit level setting means becomes a value lower than the setting value of said voltage limit level setting means, and also becomes a value higher than a value corresponding to the induced voltage internally produced from the brushless motor;

voltage limiter means for limiting the output signal of said output voltage instructing means based upon the setting value of said voltage limit level setting means and the setting value of said voltage lower limit level setting means to thereby supply said output voltage instruction signal to said drive circuit;

reverse rotation limiter means for detecting as to whether or not a reverse rotation speed of said brushless motor reaches a preset reverse rotation limit level based upon the detecting signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period, in which when said second power supply interrupting signal outputted from said reverse rotation limiter means, or said third power supply interrupting signal outputted from said low speed overload detecting means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

15. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit value of the output voltage of said drive circuit;

voltage limiter means for limiting the output signal of said output voltage instructing means based on the setting value of said voltage limit level setting means to thereby limit an upper limit value of the output voltage of said drive circuit; and reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level; wherein when said second power supply interrupting signal outputted from said reverse rotation limiter means is produced, the connection between said drive circuit and said brushless motor is electrically opened, the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value, and the setting value of said voltage lower limit level setting means is set in response to the output signal of said speed detecting means in such a manner that said setting value is such a value lower than the setting value of said voltage limit level setting means, and also such a value higher than a value corresponding to an induced voltage internally produced from said brushless motor, when the output voltage of said output voltage instructing means reaches the setting value of said voltage lower level setting means, the connection between said drive circuit and said brushless motor is electrically opened.

16. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage lower limit level setting means for setting a lower limit value of the output voltage of said drive circuit, the setting value of said voltage lower limit level setting means being set in response to the output signal of said speed detecting means in such a manner that said setting value of this voltage lower limit level setting means becomes a value lower than the setting value of said voltage limit level setting means and also a value higher than a value corresponding to the induced voltage internally produced from said brushless motor;

voltage limiter means for limiting the output signal of said output voltage instructing means based on the setting value of said voltage limit level setting means and the setting value of said voltage lower limit level setting means to thereby supply said output voltage instruction signal to said drive circuit, and for limiting the upper limit value and the lower limit value of the output voltage of said drive circuit;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level, in which when said second power supply interrupting signal outputted from said reverse rotation limiter means is produced, the connection between said drive circuit and said brushless motor is electrically opened;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

17. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

voltage lower limit level setting means for setting a lower limit value of the output voltage of said drive circuit, in which the setting value of said voltage lower limit level setting means is set in response to the output signal of said speed detecting means in such a manner that said setting value of this voltage lower limit level setting means becomes a value lower than the setting value of said voltage limit level setting means, and also becomes a value higher than a value corresponding to the induced voltage internally produced from the brushless motor, and further when the output signal of said output voltage instructing means reaches the setting value of said voltage lower limit level setting means, the connection between said drive circuit and said brushless motor is electrically opened;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level, in which when said second power supply interrupting signal outputted from said reverse rotation limiter means is produced, the connection between said drive circuit and said brushless motor is electrically opened;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

18. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit vale of the output voltage of said drive circuit;

voltage limiter means for limiting the output signal of said output voltage instructing means based on the setting value of said voltage limit level setting means to thereby limit an upper limit value of the output voltage of said drive circuit;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

the setting value of said voltage lower limit level setting means is set in response to the output signal of said speed detecting means in such a manner that said setting value of this voltage lower limit level setting means becomes a value lower than the setting value of said voltage limit level setting means and also becomes a value higher than such a value corresponding to the induced voltage internally produced from said brushless motor; and when the output signal of said output voltage instructing means reaches the setting value of said voltage lower limit level setting means, the connection between said drive circuit and said brushless motor is electrically opened; and when said second power supply interrupting signal outputted by said reverse rotation speed limiter means, or said third power supply interrupting signal outputted by said low speed overload detecting means is produced, the connection between said drive circuit and said brushless motor is electrically opened.

19. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

voltage lower limit level setting means for setting a lower limit value of the output voltage of said drive circuit, in which the setting value of said voltage lower limit level setting means is set in response to the output signal of said speed detecting means in such a manner that said setting value of this voltage lower limit level setting means becomes a value lower than the setting value of said voltage limit level setting means and also becomes a value higher than such a value corresponding to the induced voltage internally produced from said brushless motor; and when the output signal of said output voltage instructing means reaches the setting value of said voltage lower limit level setting means, the connection between said drive circuit and said brushless motor is electrically opened;

reverse rotation limiter means for detecting as to whether or not a reverse rotation speed of said brushless motor reaches a preset reverse rotation limit level based upon the detecting signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period;

voltage variation detecting means for detecting a variation contained in the output voltage of said DC main power supply in a direct manner, or based upon any one of an output current of said DC main power supply and a drive current of said brushless motor, said second power supply interrupting signal outputted from said reverse rotation limiter means, or said third power supply interrupting signal outputted from said low speed overload detecting means is produced, said drive circuit is electrically opened from said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

20. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

speed upper limit level setting means for setting an upper limit value of the rotation speed of said brushless motor;

voltage limiter means for limiting the output signal of said output voltage instructing means based on the setting value of said voltage limit level setting means to thereby limit an upper limit value of the output voltage of said drive circuit; and reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level;

wherein:

when said second power supply interrupting signal outputted by said reverse rotation limiter means is produced, the connection between said drive circuit and said brushless motor is electrically interrupted;

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit, and further when the output signal of said speed detecting means reaches the setting value of said speed upper limit level setting means, the connection between said drive circuit and said brushless motor is electrically opened.

21. A protection apparatus for a brushless motor as claimed in claim 20, wherein:

said protection apparatus is comprised of hysteresis means such that after the output signal of the speed detecting means reaches the setting value of said speed upper limit level setting means to thereby electrically open the connection between the drive circuit and the brushless motor, until the output signal of said speed detecting means becomes a value slightly lower than the setting value of said speed upper limit level setting means, said drive circuit is electrically and continuously opened from said brushless motor; when the output signal of said speed detecting means becomes such a value slightly lower than the setting value of said speed upper limit level setting means, electric opening of said drive circuit with said brushless motor is released; and thereafter the connection between said drive circuit and said brushless motor is not electrically opened until the output signal of said speed detecting means reaches the setting value of said speed upper level setting means.

22. A protection apparatus of a brushless motor as claimed in claim 20 wherein:

either one or both the setting value of said voltage limit level setting means and said setting value of said speed upper limit level setting means is corrected in such a manner that a fluctuation and a variation contained in the induced voltage internally produced from said brushless motor are grasped based upon the drive current of the brushless motor in order to compensate for the fluctuation and the variation contained in the induced voltage of said brushless motor.

23. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage limiter means for limiting the output signal of said output voltage instructing means based on the setting value of said voltage limit level setting means to thereby supply the limited output signal to said drive circuit and limit an upper limit value of the output voltage of said drive circuit;

speed upper limit level setting means for setting an upper limit value of the rotation speed of said brushless motor, in which the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit, and further when the output signal of said speed detecting means reaches the setting value of said speed upper limit level setting means, the connection between said drive circuit and said brushless motor is electrically opened;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level; in which when said second power supply interrupting signal outputted from said reverse rotation limiter means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

24. A protection apparatus of a brushless motor as claimed in claim 23 wherein:

either one or both the setting value of said voltage limit level setting means and said setting value of said speed upper limit level setting means is corrected in such a manner that both a fluctuation and a variation contained in the induced voltage internally produced from said brushless motor, or a variation of said DC main power supply is grasped based upon either the output current of said DC main power supply or the drive current of said brushless motor in order to compensate for the fluctuation and the variation contained in the induced voltage of said brushless motor, or the variation contained in the output voltage of said DC main power supply.

25. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

speed upper limit level setting means for setting an upper limit value of the rotation speed of said brushless motor;

voltage limiter means for limiting the output signal of said output voltage instructing means based on the setting value of said voltage limit level setting means to thereby limit an upper limit value of the output voltage of said drive circuit;

reverse rotation limiter means for detecting as to whether or not a reverse rotation speed of said brushless motor reaches a preset reverse rotation limit level based upon the detection signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit; and further when the output signal of said speed detecting means reaches the setting value of said speed upper limit level setting means, the connection between said drive circuit and said brushless motor is electrically opened; and when said second power supply interrupting signal outputted from said reverse rotation limiter means, or said third power supply interrupting signal outputted from said low speed overload detecting means is produced, the drive circuit is electrically opened from said brushless motor.

26. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

speed upper limit level setting means for setting an upper limit value of the rotation speed of said brushless motor, the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit; and further when the output signal of said speed detecting means reaches the setting value of said speed upper limit level setting means, the connection between said drive circuit and said brushless motor is electrically opened;

reverse rotation limiter means for detecting as to whether or not a reverse rotation speed of said brushless motor reaches a preset reverse rotation limit level based upon the detecting signal of said speed detecting means, and for outputting a second power supply interrupting signal when said reverse rotation speed reaches said preset reverse rotation limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period, in which when either said second power supply interrupting signal outputted by said reverse rotation limier means or said third power supply interrupting signal outputted by said low speed overload detecting means is produced, the connection between said drive circuit and said brushless motor is electrically opened;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

27. A protection apparatus of a brushless motor as claimed in claim 3, 6, 8, 23 or 26, wherein:

the setting value of said voltage limit level setting means is corrected in such a manner that both a fluctuation and a variation contained in the induced voltage internally produced from said brushless motor, or a variation contained in the output voltage of said DC main power supply is grasped based upon either the output current of said DC main power supply of the drive current of said brushless motor in order to compensate for the fluctuation and the variation contained in the induced voltage of said brushless motor, or the variation contained in the output voltage of said DC main power supply.

28. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage limiter means for limiting the output signal of said output voltage instructing means based on the setting value of said voltage limit level setting means to thereby limit an upper limit value of the output voltage of said drive circuit; and normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and when said first power supply interrupting signal outputted from said normal rotation limiter means is produced, said drive circuit is electrically opened from said brushless motor.

29. A protection apparatus for a brushless motor as claimed in claim 28 wherein:

said normal rotation limiter means includes hysteresis means operable in such a manner that the first power supply interrupting signal is outputted when the rotation speed of the brushless motor reaches the preset maximum limit level; outputting of said first power supply interrupting signal is maintained during a time period such that after said first power supply interrupting signal is outputted, the rotation speed of said brushless motor reaches a power supply interrupting signal release level equal to a rotation speed slightly lower than said maximum limit level; outputting of said first power supply interrupting signal is released when the rotation speed of said brushless motor reaches said power supply interrupting signal release level; and thereafter said first power supply interrupting signal is not outputted until the rotation speed of said brushless motor reaches said maximum limit level.

30. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage limiter means for limiting the output signal of said output voltage instructing means based on the setting value of said voltage limit level setting means to thereby supply the limited output signal to said drive circuit and limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level, in which when said first power supply interrupting signal outputted from said normal rotation limiter means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

31. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushiess motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage limiter means for limiting the output signal of said output voltage instructing means based on the setting value of said voltage limit level setting means to thereby limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and when said first power supply interrupting signal outputted from said normal rotation limiter means is produced, or said third power supply interrupting signal outputted from said low speed overload detecting means is produced, said drive circuit is electrically opened from said brushless motor.

32. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage limiter means for limiting the output signal of said output voltage instructing means based on the setting value of said voltage limit level setting means to thereby supply the limited output signal to said drive circuit and limit an upper limit value of the output voltage of said drive circuit;

normal rotation limiter means for detecting as to whether or not the rotation speed of said brushless motor reaches a preset maximum limit level based upon the detection signal of said speed detecting means, and for outputting a first power supply interrupting signal when said rotation speed reaches said preset maximum limit level;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means from said reverse rotation limiter means is continued for a predetermined time period, in which when said first power supply interrupting signal outputted from said normal rotation limiter means, or said third power supply interrupting signal outputted from said low speed overload detecting means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

33. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit value of the output voltage of said drive circuit; and voltage limiter means for limiting the output signal of said output voltage instructing means based on the setting value of said voltage limit level setting means to thereby limit an upper limit value of the output voltage of said drive circuit, and also for limiting the output signal of said output voltage instructing means based upon the setting value of said voltage lower limit level setting means to thereby limit the lower limit value of the output voltage of said drive circuit;

wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and the setting value of said voltage lower limit level setting means is set in response to the output signal of said speed detecting means in such a manner that said setting value is such a value lower than the setting value of said voltage limit level setting means, and also such a value higher than a value corresponding to an induced voltage internally produced from said brushless motor.

34. A protection apparatus of a brushless motor as claimed in claim 33, wherein:

either one or both the setting value of said voltage limit level setting means and said setting value of said voltage lower limit level setting means is corrected in such a manner that a fluctuation and a variation contained in the induced voltage internally produced from said brushless motor are grasped based upon the drive current of the brushless motor in order to compensate for the fluctuation and the variation contained in the induced voltage of said brushless motor.

35. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage lower limit level setting means for setting a lower limit value of the output voltage of said drive circuit, the setting value of said voltage lower limit level setting means being set in response to the output signal of said speed detecting means in such a manner that said setting value of this voltage lower limit level setting means becomes a value lower than the setting value of said voltage limit level setting means and also a value higher than a value corresponding to the induced voltage internally produced from said brushless motor;

voltage limiter means for limiting the output signal of said output voltage instructing means based on the setting value of said voltage limit level setting means and the setting value of said voltage lower limit level setting means to thereby supply said output voltage instruction signal to said drive circuit, and for limiting the upper limit value and the lower limit value of the output voltage of said drive circuit;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

36. A protection apparatus of a brushless motor as claimed in claim 35, wherein:

either one or both the setting value of said voltage limit level setting means and said setting value of said voltage lower limit level setting means is corrected in such a manner that both a fluctuation and a variation contained in the induced voltage internally produced from said brushless motor, or a variation contained in the output voltage of said DC main power supply is grasped based upon either the output current of said DC main power supply, or the drive current of said brushless motor in order to compensate for the fluctuation and the variation contained in the induced voltage of said brushless motor, or the variation contained in the output voltage of said DC main power supply.

37. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit value of the output voltage of the drive circuit;

voltage limiter means for limiting the output signal of said output voltage instructing means based on the setting value of said voltage limit level setting means to thereby limit an upper limit value of the output voltage of said drive circuit, and also for limiting the output signal of said output voltage instructing signal based on the setting value of said voltage lower limit level setting means to thereby limit the lower limit value of the output voltage of said drive circuit;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means and also said second power supply interrupting signal is not outputted from said reverse rotation limiter means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

the setting value of said voltage lower limit level setting means is set in response to the output signal of said speed detecting means in such a manner that said setting value of this voltage lower limit level setting means becomes a value lower than the setting value of said voltage limit level setting means, and also a value higher than a value corresponding to the induced voltage internally produced from the brushless motor; and when said third power supply interrupting signal outputted from said reverse rotation limiter means is produced, said drive circuit is electrically opened from said brushless motor.

38. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage lower limit level setting means for setting a lower limit value of the output voltage of said drive circuit, in which the setting value of said voltage lower limit level setting means is set in response to the output signal of said speed detecting means in such a manner that said setting value of this voltage lower limit level setting means becomes a value lower than the setting value of said voltage limit level setting means, and also becomes a value higher than a value corresponding to the induced voltage internally produced from the brushless motor;

voltage limiter means for limiting the output signal of said output voltage instructing means based upon the setting value of said voltage limit level setting means and the setting value of said voltage lower limit level setting means to thereby supply said output voltage instruction signal to said drive circuit;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means is continued for a predetermined time period, in which when said third power supply interrupting signal outputted from said low speed overload detecting means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

39. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit value of the output voltage of said drive circuit; and voltage limiter means for limiting the output signal of said output voltage instructing means based on the setting value of said voltage limit level setting means to thereby limit an upper limit value of the output voltage of said drive circuit; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and the setting value of said voltage lower limit level setting means is set in response to the output signal of said speed detecting means in such a manner that said setting value is such a value lower than the setting value of said voltage limit level setting means, and also such a value higher than a value corresponding to an induced voltage internally produced from said brushless motor, when the output voltage of said output voltage instructing means reaches the setting value of said voltage lower level setting means, the connection between said drive circuit and said brushless motor is electrically opened.

40. A protection apparatus of a brushless motor as claimed in claim 39 wherein:

said protection apparatus is comprised of hysteresis means such that during a time period defined by that after the output signal of the output voltage instructing means reaches the setting value of the voltage lower limit level setting means set in response to the output signal of said speed detecting means to thereby electrically open the connection between the drive circuit and the brushless motor, until the setting value of said voltage lower limit level setting means becomes a value slightly lower than the output signal of said output voltage instructing means, said drive circuit is electrically and continuously opened from said brushless motor; when the setting value of said voltage lower limit level setting means becomes such a value slightly lower than the output signal of said output voltage instructing means, electric opening of said drive circuit with said brushless motor is released; and thereafter the connection between said drive circuit and said brushless motor is not electrically opened until the output signal of said output voltage instructing means reaches the setting value of said voltage lower level setting means.

41. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage limiter means for limiting the output signal of said output voltage instructing means based on the setting value of said voltage limit level setting means to thereby supply the limited output signal to said drive circuit and limit an upper limit value of the output voltage of said drive circuit;

voltage lower limit level setting means for setting a lower limit value of the output voltage of said drive circuit, in which the setting value of said voltage lower limit level setting means is set in response to the output signal of said speed detecting means in such a manner that said setting value of this voltage lower limit level setting means becomes a value lower than the setting value of said voltage limit level setting means, and also becomes a value higher than a value corresponding to the induced voltage internally produced from the brushless motor, and further when the output signal of said output voltage instructing means reaches the setting value of said voltage lower limit level setting means, the connection between said drive circuit and said brushless motor is electrically opened;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

42. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

voltage lower limit level setting means for setting a lower limit vale of the output voltage of said drive circuit;

voltage limiter means for limiting the output signal of said output voltage instructing means based on the setting value of said voltage limit level setting means to thereby limit an upper limit value of the output voltage of said drive circuit;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

the setting value of said voltage lower limit level setting means is set in response to the output signal of said speed detecting means in such a manner that said setting value of this voltage lower limit level setting means becomes a value lower than the setting value of said voltage limit level setting means and also becomes a value higher than such a value corresponding to the induced voltage internally produced from said brushless motor; and when the output signal of said output voltage instructing means reaches the setting value of said voltage lower limit level setting means, the connection between said drive circuit and said brushless motor is electrically opened; and when said third power supply interrupting signal outputted by said low speed overload detecting means is produced, the connection between said drive circuit and said brushless motor is electrically opened.

43. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage limiter means for limiting the output signal of said output voltage instructing means based on the setting value of said voltage limit level setting means to thereby supply the limited output signal to said drive circuit and limit an upper limit value of the output voltage of said drive circuit;

voltage lower limit level setting means for setting a lower limit value of the output voltage of said drive circuit, in which the setting value of said voltage lower limit level setting means is set in response to the output signal of said speed detecting means in such a manner that said setting value of this voltage lower limit level setting means becomes a value lower than the setting value of said voltage limit level setting means and also becomes a value higher than such a value corresponding to the induced voltage internally produced from said brushless motor; and when the output signal of said output voltage instructing means reaches the setting value of said voltage lower limit level setting means, the connection between said drive circuit and said brushless motor is electrically opened;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means is continued for a predetermined time period, and said third power supply interrupting signal outputted from said low speed overload detecting means is produced, said drive circuit is electrically opened from said brushless motor;

voltage variation detecting means for detecting a variation contained in the output voltage of said DC main power supply in a direct manner, or based upon any one of an output current of said DC main power supply and a drive current of said brushless motor, said second power supply interrupting signal outputted from said reverse rotation limiter means; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

44. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

speed upper limit level setting means for setting an upper limit value of the rotation speed of said brushless motor; and voltage limiter means for limiting the output signal of said output voltage instructing means based on the setting value of said voltage limit level setting means to thereby limit an upper limit value of the output voltage of said drive circuit; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; and the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit, and further when the output signal of said speed detecting means reaches the setting value of said speed upper limit level setting means, the connection between said drive circuit and said brushless motor is electrically opened.

45. A protection apparatus for a brushless motor as claimed in claim 44 wherein:

said protection apparatus is comprised of hysteresis means such that after the output signal of the speed detecting means reaches the setting value of said speed upper limit level setting means to thereby electrically open the connection between the drive circuit and the brushless motor, until the output signal of said speed detecting means becomes a value slightly lower than the setting value of said speed upper limit level setting means, said drive circuit is electrically and continuously opened from said brushless motor; when the output signal of said speed detecting means becomes such a value slightly lower than the setting value of said speed upper limit level setting means, electric opening of said drive circuit with said brushless motor is released; and thereafter the connection between said drive circuit and said brushless motor is not electrically opened until the output signal of said speed detecting means reaches the setting value of said speed upper level setting means.

46. A protection apparatus of a brushless motor as claimed in claim 44 wherein:

either one or both the setting value of said voltage limit level setting means and said setting value of said speed upper limit level setting means is corrected in such a manner that a fluctuation and a variation contained in the induced voltage internally produced from said brushless motor are grasped based upon the drive current of the brushless motor in order to compensate for the fluctuation and the variation contained in the induced voltage of said brushless motor.

47. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

voltage limiter means for limiting the output signal of said output voltage instructing means based on the setting value of said voltage limit level setting means to thereby supply the limited output signal to said drive circuit and limit an upper limit value of the output voltage of said drive circuit;

speed upper limit level setting means for setting an upper limit value of the rotation speed of said brushless motor, in which the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit, and further when the output signal of said speed detecting means reaches the setting value of said speed upper limit level setting means, the connection between said drive circuit and said brushless motor is electrically opened;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

48. A protection apparatus of a brushless motor as claimed in claim 47 wherein:

either one or both the setting value of said voltage limit level setting means and said setting value of said speed upper limit level setting means is corrected in such a manner that both a fluctuation and a variation contained in the induced voltage internally produced from said brushless motor, or a variation of said DC main power supply is grasped based upon either the output current of said DC main power supply or the drive current of said brushless motor in order to compensate for the fluctuation and the variation contained in the induced voltage of said brushless motor, or the variation contained in the output voltage of said DC main power supply.

49. A protection apparatus of a brushless motor comprising:

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal;

output voltage instructing means for supplying to said drive circuit, an output voltage instruction signal for instructing an output voltage of said drive circuit, which constitutes a drive voltage when said brushless motor is driven;

voltage limit level setting means for setting an upper limit value of the output voltage of said drive circuit;

speed upper limit level setting means for setting an upper limit value of the rotation speed of said brushless motor;

voltage limiter means for limiting the output signal of said output voltage instructing means based on the setting value of said voltage limit level setting means to thereby limit an upper limit value of the output voltage of said drive circuit;

low speed failure detecting means for detecting as to whether or not the rotation speed of said brushless motor becomes below a preset low speed failure sensing level, and for outputting a low speed failure signal when said rotation speed becomes below said preset low speed failure sensing level; and low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means is continued for a predetermined time period; wherein:

the setting value of said voltage limit level setting means is set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value;

the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit; and further when the output signal of said speed detecting means reaches the setting value of said speed upper limit level setting means, the connection between said drive circuit and said brushless motor is electrically opened; and when said third power supply interrupting signal outputted from said low speed overload detecting means is produced, the drive circuit is electrically opened from said brushless motor.

50. A protection apparatus of a brushless motor comprising:

a DC (direct current) main power supply;

a brushless motor;

commutation signal detecting means for detecting a position of a movable member of said brushless motor;

speed detecting means for detecting a rotation speed of the movable member of said brushless motor, involving a rotation direction thereof, in response to the detection signal outputted from said commutation signal detecting means;

a drive circuit for producing a commutation signal used to drive the movable member of said brushless motor in response to the detection signal outputted from said commutation signal detecting means and for driving said brushless motor based upon said commutation signal, said drive circuit outputting the output voltage of said DC main power supply in a ratio responding to an output voltage instruction signal as a drive voltage used when said brushless motor is driven;

output voltage instructing means for supplying said output voltage instruction signal to said drive circuit;

voltage limit level setting means for setting an upper limit value of the output voltage of said drive circuit, the setting value of said voltage limit level setting means being set in accordance with the detecting signal outputted from said speed detecting means in such a manner that the higher the rotation speed of the movable member of said brushless motor, said setting value becomes a large value; the lower the rotation speed of the movable member of said brushless motor, said setting value becomes a small value; and when the rotation speed becomes near zero and the rotation direction is reversed, said setting value becomes a preset constant value; voltage limiter means for limiting the output signal of said output voltage instructing means based on the setting value of said voltage limit level setting means to thereby supply the limited output signal to said drive circuit and limit an upper limit value of the output voltage of said drive circuit;

speed upper limit level setting means for setting an upper limit value of the rotation speed of said brushless motor, the setting value of said speed upper limit level setting means is set in response to the output signal of said output voltage instructing means, equal to a value corresponding to a maximum rotation speed of said brushless motor in which the induced voltage internally produced by said brushless motor can become lower than the output voltage of said drive circuit when the output signal of said output voltage instructing means is supplied as said output voltage instruction signal to said drive circuit; and further when the output signal of said speed detecting means reaches the setting value of said speed upper limit level setting means, the connection between said drive circuit and said brushless motor is electrically opened;

low speed failure detecting means for detecting as to whether or not the rotation speed of said brushless motor becomes below a preset low speed failure sensing level, and for outputting a low speed failure signal when said rotation speed becomes below said preset low speed failure sensing level;

low speed overload detecting means containing said low speed failure sensing means, for latch-processing a third power supply interrupting signal to thereby output the latch-processed third power supply interrupting signal in the case that such a condition that said low speed failure signal is outputted from said low speed failure sensing means is continued for a predetermined time period, in which when said third power supply interrupting signal outputted by said low speed over- load detecting means is produced, the connection between said drive circuit and said brushless motor is electrically opened;

voltage variation detecting means for detecting a variation contained in the output voltage of said DC main power supply in a direct manner, or based upon any one of an output current of said DC main power supply and a drive current of said brushless motor; and voltage correcting means for applying said output voltage instruction signal to said drive circuit by conversely changing the output signal of said voltage limiter means in order to compensate for the variation contained in the output voltage of said DC main power supply based upon the detection output from said voltage variation detecting means.

51. A protection apparatus of a brushless motor as claimed in claim 1, 28, 31, 44 or 49, wherein:

the setting value of said voltage limit level setting means is corrected in such a manner that a fluctuation and a variation contained in the induced voltage internally produced from said brushless motor are grasped based upon the drive current of the brushless motor in order to compensate for the fluctuation and variation contained in the induced voltage of said brushless motor.

52. A protection apparatus of a brushless motor as claimed in claim 3, 30, 32, 47 or 50, wherein:

the setting value of said voltage limit level setting means is corrected in such a manner that both a fluctuation and a variation contained in the induced voltage internally produced from said brushless motor, or a variation contained in the output voltage of said DC main power supply is grasped based upon either the output current of said DC main power supply or the drive current of said brushless motor in order to compensate for the fluctuation and variation contained in the induced voltage of said brushless motor, or the variation contained in the output voltage of said DC main power supply.

* * * * *

UNITED STATES PATENT AND TRADEMARK OFFICE
CERTIFICATE OF CORRECTION

PATENT NO. : 5,929,576
DATED : July 27, 1999
INVENTOR(S) : Yasohara et al.

It is certified that error appears in the above-identified patent and that said Letters Patent is hereby corrected as shown below:

Column 42,
Line 34, after "1" insert -- , 4, 7, 20 or 25 --.

Column 44,
Line 23, after "4" insert -- 6, 7, or 8, --.

Column 46,
Line 27, after "and" begin "low" with a new paragraph.

Column 49,
Line 13, after "9" insert -- 13, 15 or 18 --;
Line 27, after "a" insert -- position of a movable member of said brushless motor; speed detecting means for detecting a--;
Line 36, change "detectiong" to -detecting--;
Line 44, change "linit" to -- limit --;
Line 47, change "inaccordance"' to -- in accordance --;
Line 56, after "preset" insert – constant --; and
Line 62, change "fo" to – of --.

Column 50,
Line 15, after "rotation" insert -- limit level, in which when said second power supply interrupting signal outputted from said reverse rotation --;
Line 20, change "anyd" to -- any --; and
Line 31, after "11" insert -- 14, 17 or 19, --.

UNITED STATES PATENT AND TRADEMARK OFFICE
CERTIFICATE OF CORRECTION

PATENT NO.   : 5,929,576
DATED        : July 27, 1999
INVENTOR(S)  : Yasohara et al.

It is certified that error appears in the above-identified patent and that said Letters Patent is hereby corrected as shown below:

Column 54,
Line 19, delete claim 16 in its entirety and substitute the following:
-- A protection apparatus of a brushless motor as claimed in claim 12, 13, 14 or 15, wherein:
   said protection apparatus is comprised of hysteresis means such that during a time period defined by that after the output signal of the output voltage instructing means reaches the setting value of the voltage lower limit level setting means set in response to the output signal of said speed detecting means to thereby electrically open the connection between the drive circuit and the brushless motor, until the setting value of said voltage lower limit level setting means becomes a value slightly lower than the output signal of said output voltage instructing means, said drive circuit is electrically and continuously opened from said brushless motor; when the setting value of said voltage lower limit level setting means becomes such a value slightly lower than the output signal of said output voltage instructing means, electric opening of said drive circuit with said brushless motor is released; and thereafter the connection between said drive circuit and said brushless motor is not electrically opened until the output signal of said output voltage instructing means reaches the setting value of said voltage lower level setting means. --

Column 57,
Line 2, change "vale" to – value --.

Column 60,
Line 29, after "20" insert -- 23, 25, or 26, --; and
Line 50, after "20" insert -- or 25, --.

Column 62,
Line 7, after "23" insert -- or 26, --.

Column 64,
Line 56, change "limier" to -- limiter --.

Column 66,
Line 6, after "28" insert -- , 30, 31 or 32, --.

Column 67,
Line 36, change "brushiess" to – brushless--.

Column 70,
Line 27, after "33," insert -- 37, 39 or 42, --.

UNITED STATES PATENT AND TRADEMARK OFFICE
CERTIFICATE OF CORRECTION

PATENT NO. : 5,929,576
DATED : July 27, 1999
INVENTOR(S) : Yasohara et al.

It is certified that error appears in the above-identified patent and that said Letters Patent is hereby corrected as shown below:

Column 71,
Line 38, after "35" insert -- 38, 41 or 43, --.

Column 74,
Line 65, after "39" insert -- 41, 42 or 43, --.

Column 76,
Line 48, change "vale" to -- value --.

Column 79,
Line 43, after "44" insert -- 47, 49 or 50 --; and
Line 64, after "44" insert -- or 49, --.

Column 81,
Line 12, after "47" insert -- or 50, --.

Signed and Sealed this

Sixth Day of August, 2002

*Attest:*

JAMES E. ROGAN
*Attesting Officer*   *Director of the United States Patent and Trademark Office*